US012581418B2

(12) United States Patent (10) Patent No.: US 12,581,418 B2
Zhang et al. (45) Date of Patent: Mar. 17, 2026

(54) TERMINAL DEVICE AND WIRELESS COMMUNICATIONS METHOD

(71) Applicant: HUAWEI TECHNOLOGIES CO., LTD., Shenzhen (CN)

(72) Inventors: Kunpeng Zhang, Xi'an (CN); Zhengbin Tan, Xi'an (CN); Weigang Wang, Xi'an (CN); Yanzhao He, Shenzhen (CN); Liwei Cui, Xi'an (CN); Qingfeng Xue, Xi'an (CN); Hongyang Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 691 days.

(21) Appl. No.: 17/778,300

(22) PCT Filed: Nov. 9, 2020

(86) PCT No.: PCT/CN2020/127418
§ 371 (c)(1),
(2) Date: May 19, 2022

(87) PCT Pub. No.: WO2021/098540
PCT Pub. Date: May 27, 2021

(65) Prior Publication Data
US 2022/0346019 A1 Oct. 27, 2022

(30) Foreign Application Priority Data

Nov. 20, 2019 (CN) .......................... 201911141103.9

(51) Int. Cl.
*H04W 52/02* (2009.01)
*H04W 76/15* (2018.01)
*H04W 76/34* (2018.01)

(52) U.S. Cl.
CPC ....... *H04W 52/0251* (2013.01); *H04W 76/15* (2018.02); *H04W 76/34* (2018.02)

(58) Field of Classification Search
CPC . H04W 52/0251; H04W 76/15; H04W 76/34; H04W 52/0229; H04W 52/028;
(Continued)

(56) References Cited

U.S. PATENT DOCUMENTS 11,337,264 B2 * 5/2022 Chang ................... H04W 24/10
11,546,968 B2 * 1/2023 Zhang ................... H04W 76/15
(Continued)

FOREIGN PATENT DOCUMENTS

CN 1981472 B 4/2011
CN 110178433 A 8/2019
(Continued)

OTHER PUBLICATIONS

R2-1803001, revision of R2-1800636, Huawei et al, High data rate impact on packet discard in NR, 3GPP TSG-RAN WG2 #101, Athens, Greece, Feb. 26-Mar. 2, 2018, 3 pages.
(Continued)

*Primary Examiner* — Jay P Patel
(74) *Attorney, Agent, or Firm* — Rimon PC

(57) ABSTRACT

This application provides a terminal device and a wireless communications method. When the terminal device is in a dual connectivity network including an LTE link and an NR link, the terminal device determines, based on a service transmission rate related to an actual transmission rate, whether to disconnect the NR link. If the service transmission rate is relatively low, the terminal device disconnects the NR link. If the service transmission rate is relatively high, the terminal device does not disconnect a first link, and uses both the NR link and the LTE link for communication. In this way, power consumption of the terminal device can
(Continued)

be effectively reduced without affecting the user experience on transmission rate, the user experience on power consumption is improved, and the user experiences on transmission rate and power consumption are balanced to some extent.

20 Claims, 41 Drawing Sheets

(58) Field of Classification Search
CPC . H04W 76/16; H04W 88/06; H04W 52/0209; Y02D 30/70
See application file for complete search history.

(56) References Cited

U.S. PATENT DOCUMENTS

| | | | | |
|---|---|---|---|---|
| 11,659,474 B2* | 5/2023 | Kwok | ................... | H04W 76/15 |
| | | | | 370/329 |
| 12,369,215 B2* | 7/2025 | Bergström | ............ | H04W 76/19 |
| 2019/0289513 A1 | 9/2019 | Jeon et al. | | |
| 2019/0342890 A1 | 11/2019 | Tong et al. | | |
| 2020/0008069 A1* | 1/2020 | Zhu | ....................... | H04W 76/16 |
| 2020/0137609 A1* | 4/2020 | Jung | .................... | H04W 24/10 |
| 2020/0337054 A1* | 10/2020 | Kwok | ................... | H04W 48/18 |
| 2020/0359282 A1* | 11/2020 | da Silva | ......... | H04W 36/00835 |
| 2021/0051767 A1* | 2/2021 | Zhang | ................... | H04W 76/34 |
| 2021/0076441 A1* | 3/2021 | Guha | .................... | H04W 40/20 |
| 2021/0227376 A1* | 7/2021 | Jha | ......................... | H04W 8/183 |
| 2021/0289430 A1* | 9/2021 | Hwang | ................. | H04W 48/16 |
| 2022/0007171 A1* | 1/2022 | Wang | ................... | H04W 76/15 |
| 2022/0264680 A1* | 8/2022 | Kim | ...................... | H04W 76/15 |
| 2023/0122107 A1* | 4/2023 | Zhang | .................. | H04W 88/10 |
| | | | | 370/329 |

FOREIGN PATENT DOCUMENTS

| | | | | | |
|---|---|---|---|---|---|
| CN | 110191461 | A | 8/2019 | | |
| CN | 110267245 | A | 9/2019 | | |
| CN | 110300461 | A * | 10/2019 | ........... | H04W 76/16 |
| CN | 110505675 | A * | 11/2019 | ........... | H04W 48/18 |
| CN | 111526607 | A | 8/2020 | | |
| CN | 111669805 | A | 9/2020 | | |
| CN | 112243300 | A * | 1/2021 | ........... | H04W 76/10 |
| CN | 115622601 | A * | 1/2023 | ........... | H04B 7/0602 |
| CN | 117098122 | A * | 11/2023 | ........ | H04W 36/0069 |
| EP | 3923636 | A1 | 12/2021 | | |
| JP | 7752182 | B2 * | 10/2025 | ........ | H04W 52/0229 |
| WO | 2019184788 | A1 | 10/2019 | | |

OTHER PUBLICATIONS

R2-1914364, Qualcomm Incorporated, Further discussion on suspension of SCG, 3GPP TSG RAN WG2 Meeting #108, Reno, Nevada, US, Nov. 18-22, 2019, 10 pages.

* cited by examiner

200

Antenna 1                               Antenna 2

| Mobile communications module<br>2G/3G/4G/5G<br>[220] | Wireless communications module<br>BT/WLAN/GNSS/NFC/IR/FM<br>[230] |

| Displays 1 to N<br>[260] | Processor<br>[210] | Memory [240] |

Charging management module [250]

Power management module [251]

Battery [252]

300

331

Start a timer N                                        S3311

No        Determine, within
duration of the timer N, whether to restore        S3312
an NR link Yes

801

China Mobile 4G      📶 ▭ 10:10

802

Discovery

| Moments | ⟩ |

| Scan | ⟩ |

| Shake | ⟩ |

| Nearby | ⟩ |

| Gaming | ⟩ |

Chats     Contacts     Discover     Me

TERMINAL DEVICE AND WIRELESS COMMUNICATIONS METHOD

CROSS-REFERENCE TO RELATED APPLICATIONS

This application is a national stage of International Application No. PCT/CN2020/127418, filed on Nov. 9, 2020, which claims priority to Chinese Patent Application No. 201911141103.9, filed on Nov. 20, 2019. Both of the aforementioned applications are hereby incorporated by reference in their entireties.

TECHNICAL FIELD

This application relates to the field of electronic devices, and more specifically, to a terminal device and a wireless communications method.

BACKGROUND

In an existing communications system, a terminal device may be communicatively connected to a plurality of access network devices at the same time to implement data transmission, thereby increasing its data transmission rate. For example, existing 5G non-standalone (NSA) can support a terminal device in communicative connection to two access network devices at the same time. One access network device supports a new radio (NR) network, and the other access network device supports a long term evolution (LTE) network. Uplink transmission is used as an example. A terminal device needs to send data to a core network device through two access network devices. Compared with a conventional manner in which one terminal device is communicatively connected to one access network device, this manner in which one terminal device communicates with a plurality of access network devices inevitably increases the power consumption of the terminal device.

Based on this, this application needs to provide a technology to reduce the power consumption of a terminal device without affecting the user experience on transmission rate as much as possible.

SUMMARY

This application provides a terminal device and a wireless communications method. When the terminal device is in a dual connectivity network including an LTE link and an NR link, the terminal device may determine, based on a service transmission rate related to an actual transmission rate, whether to disconnect the NR link. If the service transmission rate is relatively low, the terminal device disconnects the NR link. If the service transmission rate is relatively high, the terminal device does not disconnect a first link, and uses both the NR link and the LTE link for communication. In this way, the power consumption of the terminal device can be effectively reduced without affecting the user experience on transmission rate, the user experience on power consumption is improved, and the user experiences on transmission rate and power consumption are balanced to some extent.

According to a first aspect, a terminal device is provided. The terminal device includes:

a processor; and a computer storage medium, where the computer storage medium includes instructions, and when the processor executes the instructions, the terminal device is enabled to perform the following actions:

camping on a dual connectivity network, where the dual connectivity network includes a long term evolution (LTE) link and a new radio (NR) link;

sending a first instruction when detecting that a service transmission rate of the terminal device is less than a first switch threshold, where the first instruction is used to release the NR link, and the service transmission rate is related to an actual transmission rate; and performing communication by using the LTE link after the NR link is disconnected.

The LTE link may also be referred to as a 4G link, and the NR link may also be referred to as a 5G link.

The dual connectivity network in this application represents a network in which communication is performed in a dual connectivity mode. The dual connectivity mode indicates that the terminal device is communicatively connected to two access network devices, a link between the terminal device and a 4G access network device supporting an LTE technology is the LTE link, and a link between the terminal device and a 5G access network device supporting an NR technology is the NR link.

The camping on a dual connectivity network may be understood as that the terminal device is communicatively connected to the 4G access network device and the 5G access network device, and uses the LTE link and the NR link for communication.

In a possible implementation, the service transmission rate may be the actual transmission rate of the terminal device.

In another possible implementation, the service transmission rate may alternatively be a rate obtained after the actual transmission rate is processed. For example, the service transmission rate may be a rate obtained after smoothing the actual transmission rate.

Optionally, the terminal device may send the first instruction when detecting that one or a plurality of service transmission rates of the terminal device is or are less than the first switch threshold.

For example, the plurality of service transmission rates may be N consecutive service transmission rates.

For example, N=5.

In a possible implementation, the terminal device may send the first instruction to the 4G access network device, the 4G access network device sends the first instruction to the 5G access network device, and the 5G access network device releases the NR link according to the first instruction.

For example, the first instruction may be secondary cell group (SCG) failure information.

In another possible implementation, the terminal device may send the first instruction to the 5G access network device, and the 5G access network device releases the NR link according to the first instruction.

Therefore, according to the terminal device provided in this application, when the terminal device is in the dual connectivity network, the terminal device may determine, based on the service transmission rate related to the actual transmission rate, whether to disconnect the NR link, and when the service transmission rate of the terminal device is less than the first switch threshold, send the first instruction to disconnect the NR link. In this way, the power consumption of the terminal device can be effectively reduced without affecting the user experience on transmission rate, the user experience on power consumption is improved, and the user experiences on transmission rate and power consumption are balanced to some extent.

Optionally, when the processor executes the instructions, the terminal device is enabled to further perform the following action:

running a first application in the foreground before sending the first instruction, where the first application is a preset application.

In other words, when the first application running in the foreground is the preset application, the terminal device detects the service transmission rate, and subsequently sends the first instruction when detecting that the service transmission rate is less than the first switch threshold.

Correspondingly, when the first application running in the foreground is a non-preset application, the terminal device does not detect the service transmission rate, and uses the LTE link and the NR link for communication.

For example, the service transmission rate of the preset application is less than the service transmission rate of the non-preset application.

For example, the service transmission rate of the preset application is relatively small and is less than a first threshold, and the service transmission rate of the non-preset application is relatively large and is greater than the first threshold.

In this way, the preset application is set, and when the first application is the preset application, the service transmission rate of the terminal device is detected to determine whether to disconnect the NR link, to disconnect the NR link when the service transmission rate is less than the first switch threshold. This can effectively reduce the power consumption of the terminal device without affecting the user experience on transmission rate. Correspondingly, when the first application is the non-preset application, the service transmission rate of the terminal device may not be detected, and the LTE link and the NR link are used for communication. In this way, the transmission rate requirement of a user for the non-preset application is preferentially ensured as much as possible, and the user experience on 5G communication is not affected.

Optionally, the terminal device is not in a priority mode, and the priority mode includes at least one of the following: a call mode, a charging mode, a performance optimization mode, or a hotspot sharing mode.

In other words, when the first application running in the foreground is the preset application and the terminal device is not in the priority mode, the terminal device detects the service transmission rate, and subsequently sends the first instruction when detecting that the service transmission rate is less than the first switch threshold.

The call mode indicates that the terminal device is in a state of processing a call service. The charging mode indicates that the terminal device is being charged. The performance optimization mode indicates that the terminal device is set to be in a state in which the terminal device can be in optimal performance, and the optimal performance state may include a state in which a network transmission rate is relatively high. The hotspot sharing mode indicates that the terminal device is in a mode in which the mobile data traffic is shared with another device for use.

In this way, the preset application and the priority mode are set, and when the first application running in the foreground is the preset application and the terminal device is not in the priority mode, the terminal device detects the service transmission rate to disconnect the NR link, so that the terminal device does not need to disconnect the NR link in the priority mode, thereby meeting the transmission rate requirement as much as possible.

Optionally, when the processor executes the instructions, the terminal device is enabled to further perform the following actions:

exiting the first application from the foreground before sending the first instruction;

accessing a cell configured by a network device for the terminal device, to restore the NR link; and performing communication by using the LTE link and the NR link after the NR link is restored.

In other words, after the first application is exited from the foreground, the terminal device restores the NR link, and uses the LTE link and the NR link for communication.

The network device is the 5G access network device.

A process of restoring the NR link by the terminal device may include the following two implementations.

In a possible implementation, the 4G access network device periodically sends signaling to indicate to the terminal device to measure a plurality of 5G cells to establish the NR link. For example, the signaling may be RRC connection reconfiguration information, where the RRC connection reconfiguration information is used to configure the 5G cell that the terminal device needs to measure, or may be denoted as measure configuration. If the terminal device determines that the NR link does not need to be restored, the terminal device does not need to measure the 5G cell based on the signaling. If the terminal device determines that the NR link needs to be restored, the terminal device may measure the plurality of 5G cells based on the signaling, and report, to the 4G access network device, a measurement report of a 5G cell that meets a condition. The condition may be, for example, the signal strength of the measured cell meets a requirement. The 4G access network device sends the measurement report of the 5G cell that meets the condition to the 5G access network device. The 5G access network device configures a cell for the terminal device based on the measurement report, and sends cell configuration information to the terminal device through the 4G access network device. For example, the cell configuration information may be the RRC connection reconfiguration information, where the RRC connection reconfiguration information is used to configure a cell accessed by the terminal device, or may be denoted as an SCG configuration. The terminal device accesses, based on the cell configuration information, the cell configured by the 5G access network device for the terminal device, to complete establishment of the NR link.

In another possible implementation, the 4G access network device periodically sends signaling to indicate to the terminal device to measure a plurality of 5G cells to establish the NR link. If the terminal device determines that the NR link does not need to be restored, the terminal device does not need to measure the 5G cell based on the signaling. If the terminal device determines that the NR link needs to be restored, the terminal device sends a second instruction to the 4G access network device. The second instruction is used to indicate to the 5G access network device to restore the NR link. The 4G access network device forwards the second instruction to the 5G access network device, and the 4G access network device starts to send the signaling to the terminal device, to indicate to the terminal device to measure the plurality of 5G cells to restore the NR link. Subsequent specific steps are the same as those in the first possible implementation, and details are not described again.

Optionally, when the processor executes the instructions, the terminal device is enabled to further perform the following actions:

running a second application in the foreground, where the second application is the non-preset application; and continuing to perform communication by using the LTE link and the NR link.

Optionally, when the processor executes the instructions, the terminal device is enabled to further perform the following actions:

starting a first timer after running the first application in the foreground; and detecting the service transmission rate of the terminal device after the first timer expires.

In other words, within the duration of the first timer, the terminal device continues to perform communication by using a link in a current status, does not perform any determining processing on the NR link, and detects the service transmission rate of the terminal device after the first timer expires.

For example, if the current status includes only the LTE link, the LTE link is used for communication within the duration of the first timer. For another example, if the current status includes the LTE link and the NR link, the LTE link and the NR link are used for communication within the duration of the first timer.

In this way, the first timer is set, the first timer is started after the first application is run in the foreground, and after the first timer expires, the service transmission rate of the terminal device is detected, to determine whether to disconnect the NR link. This can avoid a ping-pong effect caused by the user when disconnecting and restoring the NR link within a short time period before and after switching applications, to further improve the user experience.

Optionally, the first application is any one of the following applications: a navigation application, a reading application, a game application, and an application into which a video can be embedded.

Optionally, the first switch threshold is related to at least one of the following parameters of the terminal device in an LTE network, where the LTE network includes the LTE link:

signal strength of a cell in which the terminal device is located; or cell bandwidth of the cell in which the terminal device is located; or a duplex mode used by the terminal device for communication, where the duplex mode includes a time division duplex (TDD) mode or a frequency division duplex (FDD) mode; or a transmission mode used by the terminal device for communication, where the transmission mode includes uplink transmission or downlink transmission.

In other words, the first switch threshold may continuously change based on at least one of the foregoing parameters, to more properly disconnect or restore the NR link, thereby meeting a user requirement. For example, when the signal condition is poor, the first switch threshold is decreased, and the NR link may not need to be disconnected, to meet a rate requirement of the user as much as possible.

Optionally, when the processor executes the instructions, the terminal device is enabled to further perform the following actions:

after sending the first instruction, when detecting that the service transmission rate of the terminal device is greater than a second switch threshold, accessing the cell configured by the network device for the terminal device, to restore the NR link; and performing communication by using the LTE link and the NR link after the NR link is restored.

In other words, after the NR link is disconnected, the terminal device further determines, based on the service transmission rate and the second switch threshold, whether the NR link needs to be restored.

Optionally, when detecting that the one or the plurality of service transmission rates is or are greater than the second switch threshold, the terminal device may access the cell configured by the network device for the terminal device, to restore the NR link.

For example, the plurality of service transmission rates may be M consecutive service transmission rates.

For example, M=2.

Optionally, when the processor executes the instructions, the terminal device is enabled to further perform the following action:

sending the second instruction before accessing the cell configured by the network device for the terminal device, where the second instruction is used to restore the NR link.

Optionally, the second switch threshold is greater than the first switch threshold.

In this way, two switch thresholds are set. Compared with the manner of setting one switch threshold, in this manner, the interval between the two switch thresholds effectively alleviates a ping-pong effect caused by continuously disconnecting and restoring the NR link by the terminal device, and improves the stability of a communication process. In addition, the NR link may be retained as long as possible, to meet the user experience on 5G communication.

Optionally, when the processor executes the instructions, the terminal device is enabled to further perform the following actions:

before sending the first instruction, determining whether the NR link is disconnected; and detecting the service transmission rate of the terminal device when the NR link is not disconnected.

In this way, whether the NR link is disconnected is determined before the service transmission rate of the terminal device is detected. This can avoid a signaling waste because the terminal device still needs to detect the service transmission rate when the NR link is disconnected and the terminal device sends the first instruction to the network device when determining that the NR link needs to be disconnected, and can reduce signaling overheads.

According to a second aspect, a wireless communications method is provided, and is applied to a terminal device. The method includes:

camping on a dual connectivity network, where the dual connectivity network includes a long term evolution (LTE) link and a new radio (NR) link;

sending a first instruction when detecting that a service transmission rate of the terminal device is less than a first switch threshold, where the first instruction is used to release the NR link, and the service transmission rate is related to an actual transmission rate; and performing communication by using the LTE link after the NR link is disconnected.

Optionally, before the sending a first instruction, the method further includes:

running a first application in the foreground, where the first application is a preset application.

Optionally, the terminal device is not in a priority mode, and the priority mode includes at least one of the following: a call mode, a charging mode, a performance optimization mode, or a hotspot sharing mode.

Optionally, after the sending a first instruction, the method further includes:

exiting the first application from the foreground;

accessing a cell configured by a network device for the terminal device, to restore the NR link; and

performing communication by using the LTE link and the NR link after the NR link is restored.

Optionally, the method further includes:

running a second application in the foreground, where the second application is a non-preset application; and continuing to perform communication by using the LTE link and the NR link.

Optionally, the method further includes:

starting a first timer after running the first application in the foreground; and detecting the service transmission rate of the terminal device after the first timer expires.

Optionally, the first application is any one of the following applications: a navigation application, a reading application, a game application, and an application into which a video can be embedded.

Optionally, the first switch threshold is related to at least one of the following parameters of the terminal device in an LTE network, where the LTE network includes the LTE link:

signal strength of a cell in which the terminal device is located; or cell bandwidth of the cell in which the terminal device is located; or a duplex mode used by the terminal device for communication, where the duplex mode includes a time division duplex (TDD) mode or a frequency division duplex (FDD) mode; or a transmission mode used by the terminal device for communication, where the transmission mode includes uplink transmission or downlink transmission.

Optionally, the method further includes:

after sending the first instruction, when detecting that the service transmission rate of the terminal device is greater than a second switch threshold, accessing the cell configured by the network device for the terminal device, to restore the NR link; and performing communication by using the LTE link and the NR link after the NR link is restored.

Optionally, the method further includes:

sending a second instruction before accessing the cell configured by the network device for the terminal device, where the second instruction is used to restore the NR link.

Optionally, the second switch threshold is greater than the first switch threshold.

Optionally, before the sending a first instruction, the method further includes:

determining whether the NR link is disconnected; and detecting the service transmission rate of the terminal device when the NR link is not disconnected.

According to a third aspect, this application provides an apparatus. The apparatus is included in a terminal device, and the apparatus has a function of implementing behavior of the terminal device in the foregoing aspect and the possible implementations of the foregoing aspect. The function may be implemented by hardware, or may be implemented by hardware executing corresponding software. The hardware or the software includes one or more modules or units corresponding to the foregoing function, for example, a processing module or unit, or a communications module or unit.

According to a fourth aspect, this application provides a terminal device, including a touchscreen. The touchscreen includes a touch-sensitive surface, a display, a camera, one or more processors, one or more memories, a plurality of applications, and one or more computer programs. The one or more computer programs are stored in the memory. The one or more computer programs include instructions. When the instructions are executed by the one or more processors, the terminal device is enabled to perform the method in any possible implementation of any one of the foregoing aspects.

According to a fifth aspect, this application provides a terminal device, including one or more processors and one or more memories. The one or more memories are coupled to the one or more processors. The one or more memories are configured to store computer program code, and the computer program code includes computer instructions. When the one or more processors execute the computer instructions, the terminal device is enabled to perform the method in any possible implementation of any one of the foregoing aspects.

According to a sixth aspect, this application provides a computer storage medium, including computer instructions. When the computer instructions are run on a terminal device, the terminal device is enabled to perform the method in any possible implementation of any one of the foregoing aspects.

According to a seventh aspect, this application provides a computer program product. When the computer program product runs on a terminal device, the terminal device is enabled to perform the method in any possible implementation of any one of the foregoing aspects.

According to an eighth aspect, a chip is provided, includes a processor, and is configured to invoke, from a memory, and run the method in any possible implementation of any one of the foregoing aspects stored in the memory.

According to a ninth aspect, another chip is provided, including an input interface, an output interface, a processor, and a memory. The input interface, the output interface, the processor, and the memory are connected to each other through an internal connection path, and the processor is configured to perform the method in any possible implementation of any one of the foregoing aspects stored in the memory.

DESCRIPTION OF EMBODIMENTS

The following describes technical solutions of this application with reference to the accompanying drawings.

Technologies described in this application may be applied to various communications systems and a communications system integrating various communications systems. For example, the communications system may be a long term evolution (LTE) communications system (or referred to as a 4G communications system), a new radio (NR) system (or referred to as a 5G communications system), a wireless-fidelity (Wi-Fi) system, a cellular system related to the 3rd generation partnership project (3GPP), a future evolved communications system, or another communications system of this type.

Figure 1:
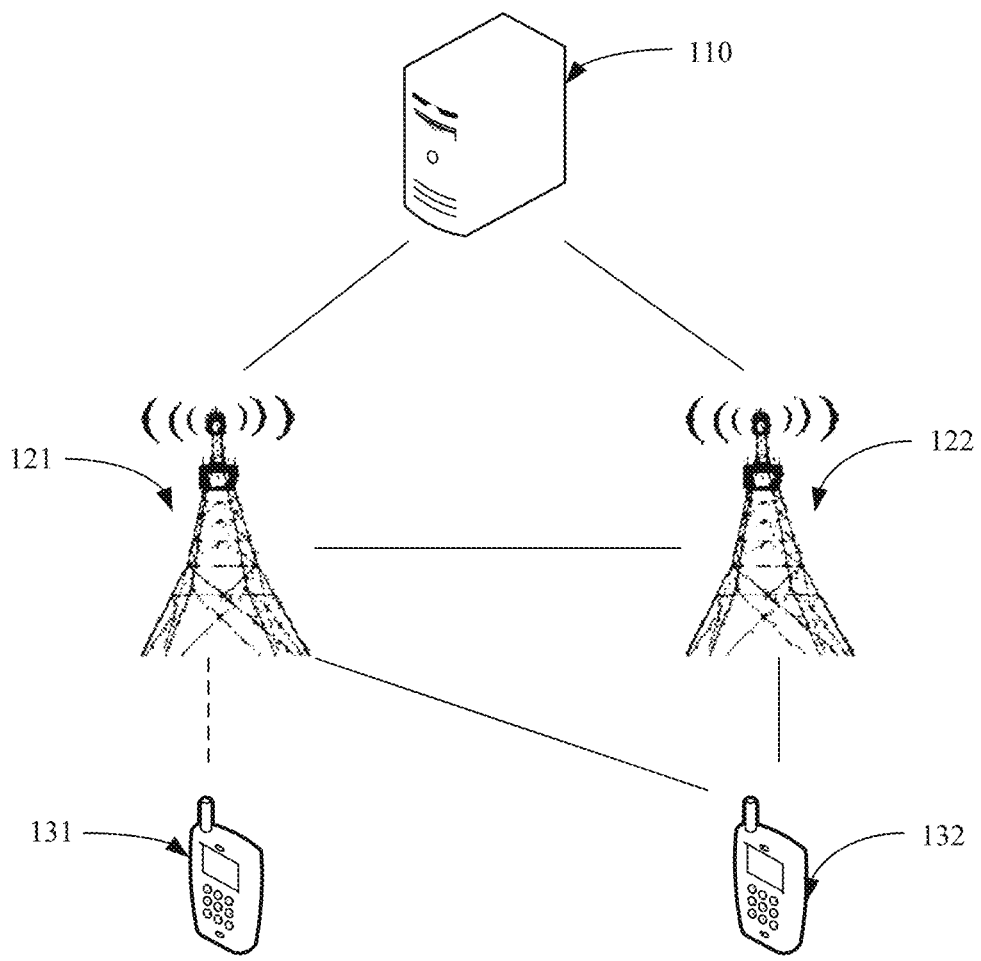
FIG. 1 is a schematic diagram of a possible architecture of a communications system according to this application.

FIG. 1 is a schematic diagram of a possible architecture of a communications system applicable to an embodiment of this application. As shown in FIG. 1, the communications system includes at least a core network device 110, an access network device 121, an access network device 122, and a terminal device 132. The terminal device 132 is communicatively connected to the access network device 121 and the access network device 122. The access network device 121 is communicatively connected to the access network device 122. The access network device 121 and the access network device 122 are communicatively connected to the core network device 110. Optionally, one of the access network device 121 and the access network device 122 may also be communicatively connected to the core network device 110 (not shown in FIG. 1). This is not limited in this application. Optionally, the communications system may further include a terminal device 131, and the terminal device 131 is communicatively connected to the access network device 121. FIG. 1 is only a schematic diagram. The communications system may further include another network device, for example, may further include a wireless relay device and a wireless backhaul device, which are not shown in FIG. 1. Quantities of core network devices, access network devices, and terminal devices included in the communications system are not limited in embodiments of this application. For example, the terminal device 132 may be further communicatively connected to one or more access network devices.

For example, the access network device 121 and the access network device 122 may be devices that support a same technology. Correspondingly, the terminal device 132 may be a device that supports the technology. For example, both the access network device 121 and the access network device 122 are devices that support an LTE network, and the terminal device 132 may be a device that supports the LTE network.

For example, the access network device 121 and the access network device 122 may be devices that support different technologies. Correspondingly, the terminal device 132 may be a device that supports a plurality of technologies. For example, the access network device 121 is a device that supports the LTE network, and the access network device 122 is a device that supports an NR network; or the access network device 121 is a device that supports the NR network, and the access network device 122 is a device that supports the LTE network. The terminal device 132 is a device that supports both the LTE network and the NR network. In this application, communication in which one terminal device is communicatively connected to two access network devices may be referred to as communication in a dual connectivity mode.

It should be noted that the communication connection between two devices may be implemented in a wireless or wired manner. The core network device and the access network device may be different physical devices that are independent of each other, or functions of the core network device and logical functions of the access network device may be integrated into a same physical device, or some functions of the core network device and some functions of the access network device may be integrated into one physical device.

The access network device in this application may be any device having a wireless transceiver function, including but not limited to: an evolved NodeB (or eNB or e-NodeB, evolved NodeB) in LTE, a gNodeB (gNB) or a transmission reception point (transmission receiving point/transmission reception point, TRP) in NR, a subsequent evolved NodeB, an access node in a Wi-Fi system, a wireless relay node, a wireless backhaul node, or the like. The base station may be a macro base station, a micro base station, a picocell base station, a small cell, a relay station, a balloon station, or the like. The base station may include one or more co-site or non-co-site TRPs.

The terminal device in this application is a device having a wireless transceiver function, and may be deployed on land, including an indoor or outdoor device, a handheld device, or a vehicle-mounted device, may be deployed on the water (for example, on a ship), or may be deployed in the air (for example, on an airplane, a balloon, or a satellite). The terminal device may be a mobile phone, a tablet computer (Pad), a computer having a wireless transceiver function, a virtual reality (VR) terminal device, an augmented reality (AR) terminal device, a wireless terminal in industrial control, a vehicle-mounted terminal device, a wireless terminal in self driving, a wireless terminal in remote medical, a wireless terminal in a smart grid, a wireless terminal in transportation safety, a wireless terminal in a smart city, a wireless terminal in a smart home, a wearable terminal device, or the like. An application scenario is not limited in embodiments of this application. The terminal device sometimes may also be referred to as a terminal, user equipment (UE), an access terminal device, a vehicle-mounted terminal, an industrial control terminal, a UE unit, a UE station, a mobile station, a mobile console, a remote station, a remote terminal device, a mobile device, a UE terminal device, a terminal device, a wireless communications device, a UE agent, a UE apparatus, or the like. The terminal device may be fixed or movable.

Figure 2:
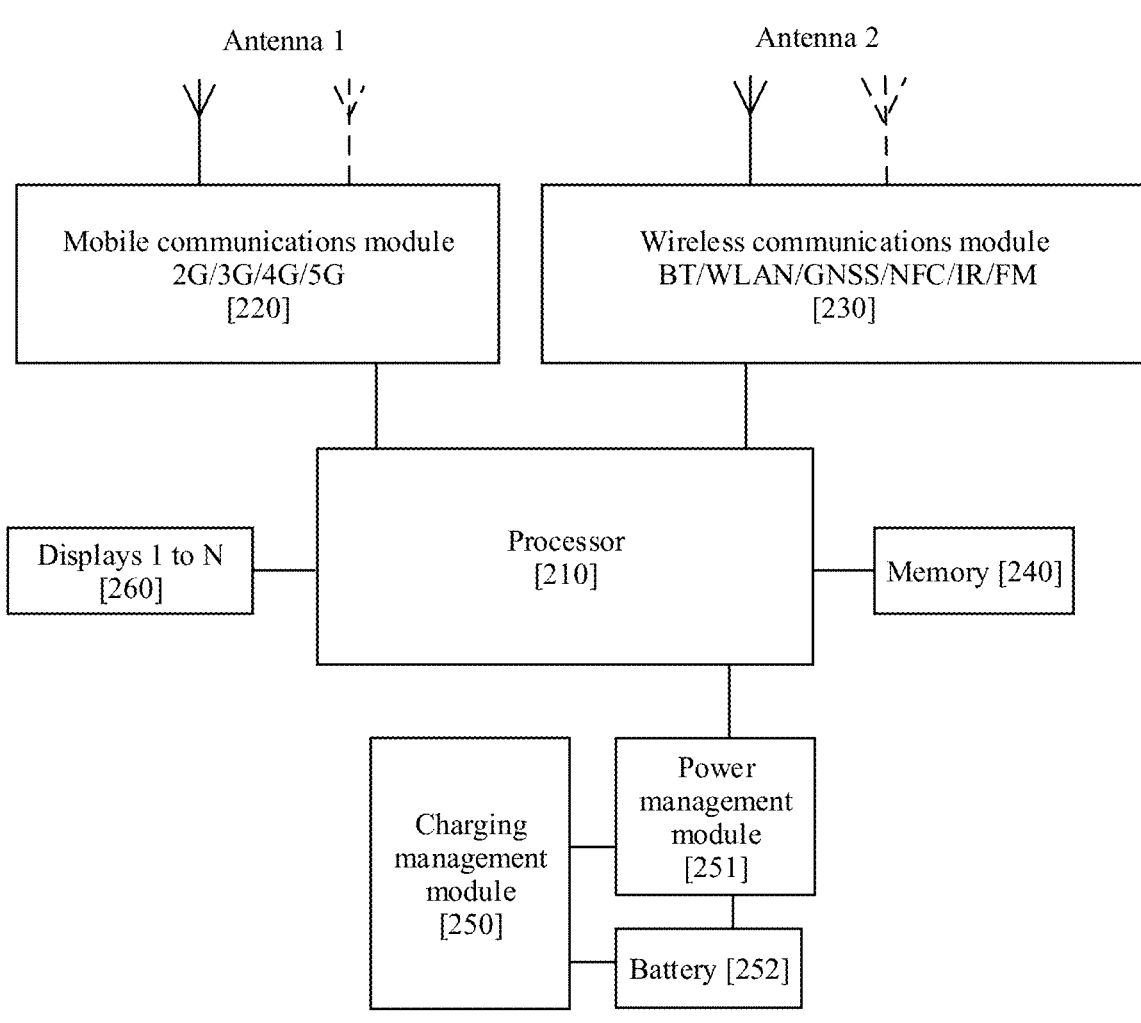
FIG. 2 is a schematic diagram of a structure of a terminal device according to this application.

In addition, the terminal device may alternatively be a terminal device in an internet of things (IoT) system. The IoT is an important part in development of future information technologies. A main technical feature of the IoT is to connect an object to a network by using a communications technology, to implement an intelligent network with man-machine interconnections and thing-thing interconnections. The terminal device in embodiments of this application may alternatively be a terminal device in machine type communication (MTC). The terminal device in this application may alternatively be a vehicle-mounted module, a vehicle-mounted module assembly, a vehicle-mounted component, a vehicle-mounted chip, or a vehicle-mounted unit that is built in a vehicle as one or more components or units. The vehicle may use the vehicle-mounted module, the vehicle-mounted module assembly, the vehicle-mounted component, the vehicle-mounted chip, or the vehicle-mounted unit that is built in the vehicle, to implement a method in this application. Therefore, embodiments of this application may be applied to an internet of vehicles, for example, vehicle-to-everything (V2X), long term evolution-vehicle (LTE-V), and vehicle-to-vehicle (V2V). FIG. 2 is a schematic diagram of a structure of a terminal device 200 according to this application. The terminal device 200 may correspond to the terminal device 131 or the terminal device 132 shown in FIG. 1. The terminal device 200 may include a processor 210, an antenna 1, an antenna 2, a mobile communications module 220, a wireless communications module 230, a memory 240, a charging management module 250, a power management module 251, a battery 252, and a display 260.

It may be understood that a structure shown in some embodiments of this application does not constitute a specific limitation on the terminal device 200. In some other embodiments of this application, the terminal device 200 may include more or fewer components than those shown in the figure, or combine some components, or split some components, or have different component arrangements. The components shown in the figure may be implemented by using hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent components, or may be integrated into one or more processors.

The controller may be a nerve center and a command center of the terminal device 200. The controller may generate an operation control signal based on instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces a waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The antenna 1 and the antenna 2 are configured to transmit and receive electromagnetic wave signals. Each antenna in the terminal device 200 may be configured to cover one or more communications frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The terminal device 200 may include a communications module, configured to communicate with an external device. For example, the communications module may include a mobile communications module 220 and a wireless communications module 230.

The mobile communications module 220 may provide a wireless communication solution that is applied to the terminal device 200 and that includes 2G, 3G, 4G, 5G, or the like. The mobile communications module 220 may include at least one filter, a switch, a power amplifier, a low noise amplifier (LNA), and the like. The mobile communications module 220 may receive an electromagnetic wave through the antenna 1, perform processing such as filtering or amplification on the received electromagnetic wave, and transmit a processed electromagnetic wave to the modem processor for demodulation. The mobile communications module 220 may further amplify a signal modulated by the modem processor, and convert the signal into an electromagnetic wave through the antenna 1 for radiation. In some embodiments, at least some function modules of the mobile communications module 220 may be disposed in the processor 210. In some embodiments, at least some function modules of the mobile communications module 220 and at least some modules of the processor 210 may be disposed in a same device.

The wireless communications module 230 may provide a solution, applied to the terminal device 200, to wireless communication including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communications module 230 may be one or more components integrating at least one communications processing module. The wireless communications module 230 receives an electromagnetic wave through the antenna 2, performs frequency modulation and filtering processing on an electromagnetic wave signal, and sends a processed signal to the processor 210. The wireless communications module 230 may further receive a to-be-sent signal from the processor 210, perform frequency modulation and amplification on the signal, and convert the signal into an electromagnetic wave for radiation through the antenna 2.

In some embodiments, the antenna 1 of the terminal device 200 is coupled to the mobile communications module 220, and the antenna 2 is coupled to the wireless communications module 230, so that the terminal device 200 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), a satellite based augmentation system (SBAS), and/or the like.

A memory 240 may be configured to store computer-executable program code. The executable program code includes instructions. The processor 210 runs the instructions stored in the memory 240 to perform various function applications and data processing of the terminal device 200. The memory 240 may include a program storage area and a data storage area. The program storage area may store an operating system, an application required by at least one function (for example, a sound playing function and an image playing function), and the like. The data storage area may store data (such as audio data and a phone book) and the like that are created during use of the terminal device 200. In addition, the memory 240 may include a high-speed random access memory, or may include a nonvolatile memory, for example, at least one magnetic disk storage component, a flash memory, or a universal flash storage (UFS).

The charging management module 250 is configured to receive a charging input from a charger. The charger may be a wireless charger or a wired charger. In some embodiments of wired charging, the charging management module 250 may receive a charging input from the wired charger through the USB interface. In some embodiments of wireless charging, the charging management module 250 may receive a wireless charging input through a wireless charging coil of the terminal device 200. The charging management module 250 may further supply power to the terminal device by using the power management module 251 while charging the battery 252.

The power management module 251 is configured to connect the battery 252, the charging management module 250, and the processor 210. The power management module 251 receives an input of the battery 252 and/or an input of the charging management module 250, and supplies power to the processor 210, the memory 221, the display 260, the mobile communications module 220, the wireless communications module 230, and the like. The power management module 251 may be further configured to monitor parameters such as a battery capacity, a quantity of battery cycles, and a battery health status (electric leakage or impedance). In some other embodiments, the power management module 251 may alternatively be disposed in the processor 210. In some other embodiments, the power management module 251 and the charging management module 250 may alternatively be disposed in a same device.

The terminal device 200 implements a display function by using the GPU, the display 260, the application processor, and the like. The GPU is a microprocessor for image processing, and is connected to the display 260 and the application processor. The GPU is configured to perform mathematical and geometric calculation, and render an image. The processor 210 may include one or more GPUs that execute program instructions to generate or change display information.

The display 260 is configured to display an image, a video, and the like. The display 260 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal device 200 may include one or N displays 260, where N is a positive integer greater than 1.

For ease of understanding, in this application, a terminal device having the structure shown in FIG. 2 is used as an example to describe in detail, with reference to the accompanying drawings and application scenarios, a wireless communications method provided in embodiments of this application.

In an existing communications system, a terminal device may be communicatively connected to a plurality of access network devices at the same time, to implement data transmission, thereby increasing a data transmission rate. The plurality of access network devices may be devices supporting a same technology, or may be devices supporting different technologies. In this communications method, for example, in uplink transmission, data needs to be simultaneously sent to a core network device through the plurality of access network devices. It can be learned that compared with a conventional manner in which one terminal device is communicatively connected to one access network device, this manner in which one terminal device communicates with a plurality of access network devices inevitably increases power consumption of the terminal device.

In a current communications system, communication in a dual connectivity mode in which a terminal device is communicatively connected to two access network devices at the same time is most common. For ease of description, the following describes an embodiment of this application by using an example in which the communications system shown in FIG. 1 includes at least one terminal device and two access network devices, and the terminal device can be communicatively connected to the two access network devices at the same time. In addition, the two access network devices in the communications system are respectively denoted as a first access network device and a second access network device, a link between the terminal device and the first access network device is denoted as a first link, and a link between the terminal device and the second access network device is denoted as a second link.

Based on a problem in the conventional technology that a terminal device has relatively high power consumption, this application provides the wireless communications method. In the communications system in which the terminal device is communicatively connected to two access network devices at the same time, the terminal device may determine, based on an actual transmission rate of the terminal device, whether to disconnect one of the links (for example, the first link). If the actual transmission rate is relatively low, the first link is disconnected; or if the actual transmission rate is relatively high, the first link is not disconnected, and both links are used for communication. In this method for flexibly processing a link between the terminal device and the access network device, power consumption of the terminal device can be effectively reduced without affecting the user experience on transmission rate, the user experience on power consumption is improved, and the user experiences on transmission rate and power consumption are balanced to some extent.

It should be understood that the first link is not disconnected in this application indicates that the first link is retained or restored. That the first link is retained in this application indicates that when the first link is not disconnected, if the actual transmission rate is relatively high, no processing is performed on the first link, and the first link continues to be retained. That the first link is restored in this application indicates that when the first link is disconnected, if the actual transmission rate is relatively high, the disconnected first link is restored.

It should be further understood that the actual transmission rate of the terminal device described in this application represents the actual rate of the terminal device during startup and running, and may be the actual transmission rate when the terminal device loads various types of services. The services described in this application may be various types of services, for example, may be services such as web page browsing, video (high-definition video and standard video) watching, game playing, reading, and music listening that are implemented by operating an application on the terminal device, or may be various services implemented by the terminal device in a standby state, for example, notifying a user by detecting a notification message.

For example, the first access network device and the second access network device respectively support different technologies. Optionally, a maximum transmission rate allowed by the first access network device is greater than a maximum transmission rate allowed by the second access network device.

In a possible scenario, existing 5G non-standalone (NSA) implements communication in a dual connectivity mode. In this networking, for example, the first access network device supports an NR network, and the second access network device supports an LTE network. A maximum transmission rate allowed in the NR network is greater than a maximum transmission rate allowed in the LTE network. For ease of description, the first access network device may be denoted as a 5G access network device (or may be denoted as a 5G base station), and the first link between the terminal device and the 5G access network device is denoted as an NR link. Similarly, the second access network device may be denoted as a 4G access network device (or may be denoted as a 4G base station), and the second link between the terminal device and the 4G access network device is denoted as an LTE link. There may be two dual connectivity modes in the NSA network. In a first mode, the terminal device may access the NR network through the 4G access network device, the 4G access network device serves as a primary base station, and the 5G access network device serves as a secondary base station. Such dual connectivity is referred to as LTE NR dual connectivity (ENDC). In a second mode, the terminal device may access the NR network through the 5G access network device, the 5G access network device serves as a primary base station, and the 4G access network device serves as a secondary base station. Such dual connectivity is referred to as NR LTE dual connectivity (NEDC).

In another possible scenario, a WLAN (for example, a Wi-Fi network) may also implement communication in a dual connectivity mode. In the WLAN, a station may be communicatively connected to two access points. The station is an example of the terminal device, and the access point is an example of the access network device.

As an example instead of a limitation, with reference to FIG. 3 to FIG. 17(d), the following describes in detail the wireless communications method provided in this application by using the 5G access network device and the 4G access network device as two examples of the access network device.

It should be noted that in this application, descriptions of LTE and 4G may be interchanged, and descriptions of NR and 5G may be interchanged. For example, the LTE network may be referred to as a 4G network, the LTE link may be referred to as a 4G link, and the 4G access network device may be referred to as an LTE access network device. For another example, the NR network may be referred to as a 5G network, the NR link may be referred to as a 5G link, and the 5G access network device may be referred to as an NR access network device.

First, a service transmission rate related to the actual transmission rate in this application is described.

As described above, in this application, whether to disconnect or restore the first link may be determined based on the actual transmission rate of the terminal device. Optionally, the terminal device may smooth the actual transmission rate to obtain a processed actual transmission rate, and determine, based on the processed actual transmission rate, whether to disconnect or restore the first link. In this manner, the actual transmission rate of the terminal device does not change greatly in consecutive periods of time, and a ping-pong effect caused by continuous disconnection and restoration of the first link by the terminal device in a short time period due to a sudden change in the actual transmission rate can be avoided, so as to improve stability of a communication process.

For ease of description, in this application, the actual transmission rate and the rate obtained after the actual transmission rate is processed may be collectively referred to as the service transmission rate, and the service transmission rate is related to the actual transmission rate. The following uses the service transmission rate to describe embodiments.

In a possible implementation, the terminal device may obtain the processed actual transmission rate according to the following formula: $V_{t2}=V_{t}*(1-\partial)+V_{t1}+\partial$, where $V_{t1}$ represents an actual transmission rate obtained by the terminal device in a current monitoring periodicity, $V_{t2}$ represents a rate obtained after smoothing the actual transmission rate, $V_{t}$ represents a rate obtained by the terminal device after smoothing is performed in a monitoring periodicity previous to the current monitoring periodicity, and $\partial$ represents a smoothing factor, which has a value range of [0.1,1]. For example, when the actual transmission rate decreases, a value of $\partial$ may be less than 0.5, and when the actual transmission rate increases, a value of $\partial$ may be greater than or equal to 0.5.

Figure 3:
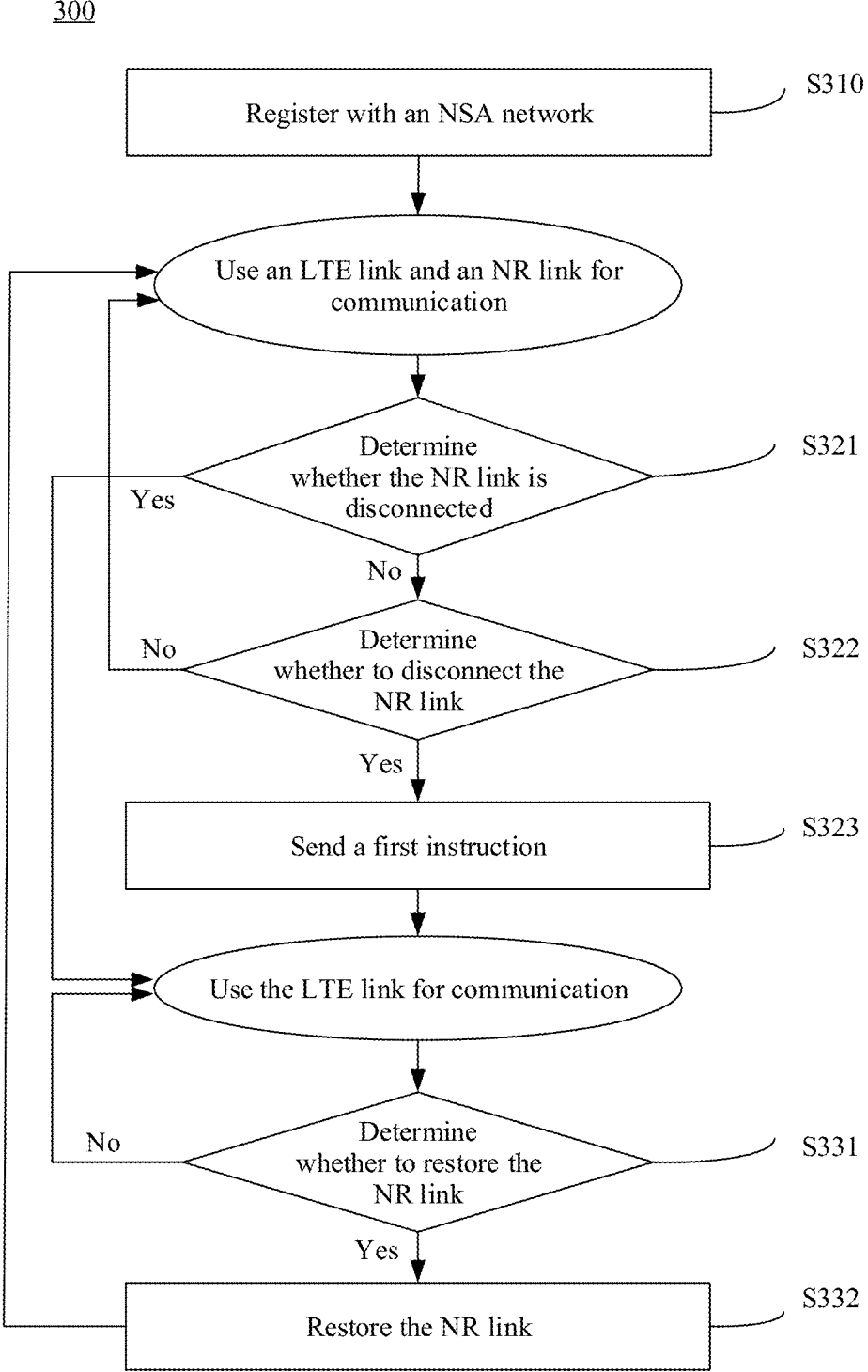
FIG. 3 is a schematic flowchart of a wireless communications method according to this application.
Figure 4:
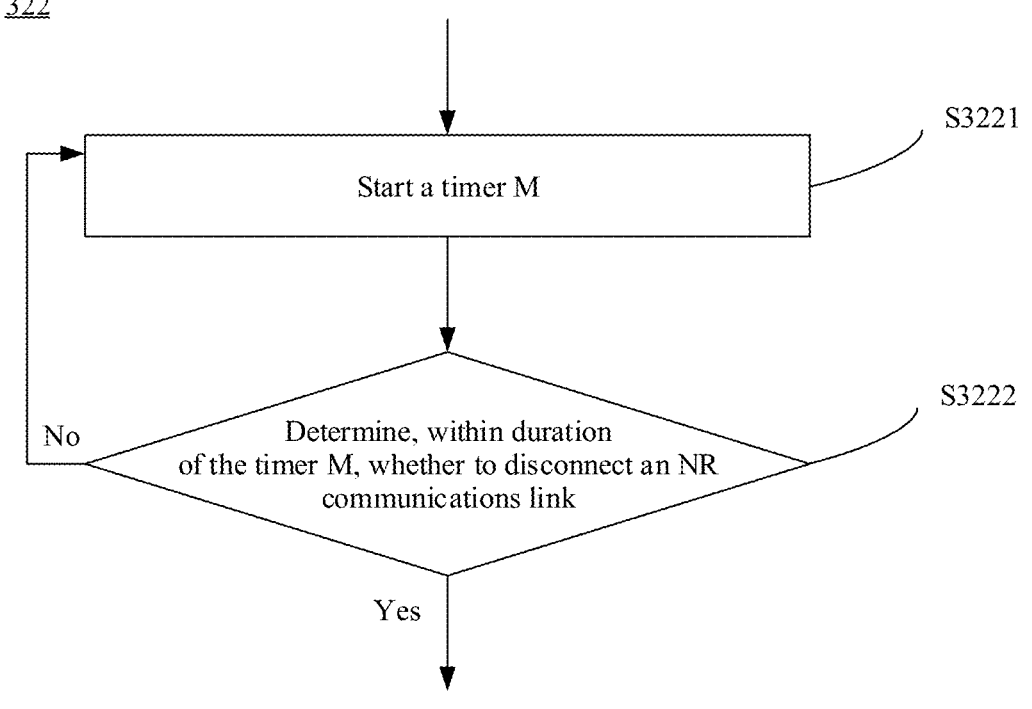
FIG. 4 is a schematic flowchart of a part of a wireless communications method according to this application.
Figure 5:
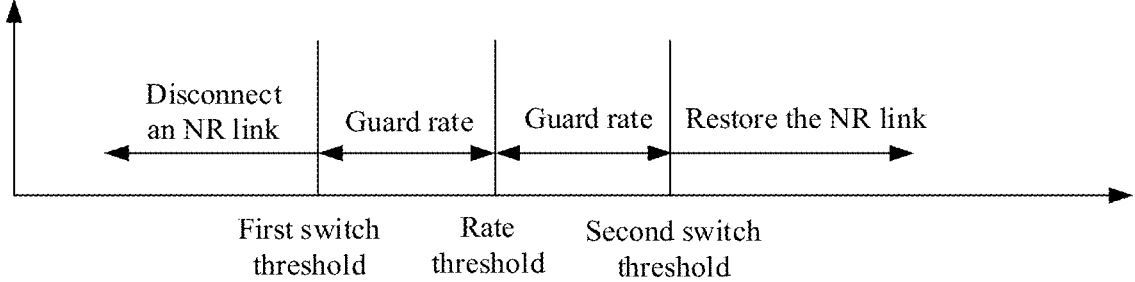
FIG. 5 is a schematic diagram of a switch threshold according to this application.
Figure 6:
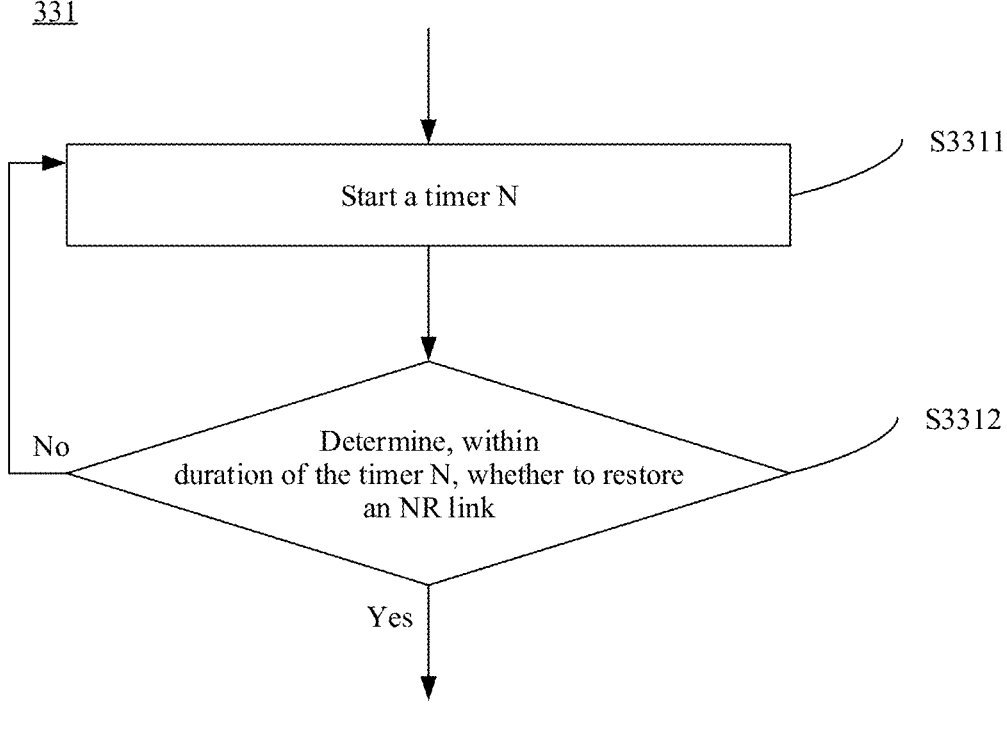
FIG. 6 is a schematic flowchart of another part of a wireless communications method according to this application.

FIG. 3 is a schematic flowchart of a wireless communications method 300 according to this application. FIG. 4 and FIG. 6 are schematic flowcharts of a part of the wireless communications method 300 according to this application. FIG. 5 is a schematic diagram of a switch threshold according to this application. The following describes in detail the method 300 in this application with reference to FIG. 3 to FIG. 6.

S310: A terminal device registers with an NSA network.

In this step, the terminal device establishes an LTE link to a 4G access network device and establishes an NR link to a 5G access network device, to register with the NSA network. It should be understood that the terminal device may directly connect the LTE link and the NR link after being powered on, or may first connect, after being powered on, the LTE link for a period of time and then connect the NR link. This is not limited in this application. The terminal device may connect the LTE link and the NR link in any time period after being powered on and running.

After the terminal device registers with the NSA network, a user may operate the terminal device to transmit service-related data, to meet a service requirement.

In the NSA network, the terminal device uses the NR link and the LTE link for communication. Uplink transmission is used as an example. Specifically, the terminal device may send a part of to-be-sent uplink data to the 4G access network device through the LTE link, and send the other part of the uplink data to the 5G access network device through the NR link. It is assumed that the 5G access network device is communicatively connected to a core network device, the 4G access network device sends the part of data received from the terminal device to the 5G access network device, and the 5G access network device processes the entire uplink data and sends the uplink data to the core network device, to complete an uplink data transmission process. A transmission process of downlink data of a service is similar to transmission of the uplink data. The core network device sends to-be-sent downlink data to the 5G access network device. The 5G access network device may send a part of the downlink data to the 4G access network device. The 4G access network device sends the part of data to the terminal device, and the 5G access network device sends remaining data to the terminal device, so that complete downlink data is sent to the terminal device, and the downlink data transmission process is completed.

In addition, to facilitate obtaining of a service transmission rate, during running of the terminal device, a service transmission rate of the terminal device may be monitored in real time, and a monitoring periodicity may be set, to periodically obtain a service transmission rate, that is, obtain a service transmission rate within each monitoring periodicity. For example, if duration of a monitoring periodicity is 2 s, the terminal device monitors the service transmission rate in real time, and obtains the service transmission rate every 2 s.

For ease of description, a service transmission rate within one monitoring periodicity is briefly denoted as one service transmission rate, and service transmission rates within a plurality of monitoring periodicities are briefly denoted as a plurality of service transmission rates.

For example, one service transmission rate is used as an example. One service transmission rate may be an average transmission rate of the terminal device within one monitoring periodicity, or may be a maximum value or a minimum value of a service transmission rate of the terminal device within one monitoring periodicity, or may be a service transmission rate of the terminal device at an end moment of one monitoring periodicity. This is not limited in this application.

S321: The terminal device determines whether the NR link is disconnected.

Considering that the NR link may be forcibly disconnected due to an exception (for example, excessively poor signal strength), optionally, in S321, the terminal device determines whether the NR link is disconnected. If the NR link is not disconnected, it indicates that the terminal device is in the NSA network, and S322 may be performed. If the NR link is disconnected, S322 is not performed, and the LTE link continues to be used for communication. In addition, S331 may be performed to determine whether to restore the NR link. When it is determined that the NR link can be restored, NR link is restored through interaction with an access network device.

In this way, this step can avoid a signaling waste because the terminal device still needs to determine, when the NR link is disconnected, whether to disconnect the NR link and the terminal device sends a first instruction to the 5G access network device when determining that the NR link needs to be disconnected, and can reduce signaling overheads.

It should be understood that the terminal device may not need to perform S321, but may directly perform S322. This may cause a signaling waste.

During implementation, this step may be performed by a processor (the processor 210 of the terminal device shown in FIG. 2) and a mobile communications module (the mobile communications module 250 of the terminal device shown in FIG. 2) of the terminal device. For example, the mobile communications module may send signaling to the processor to indicate whether the NR link is disconnected, and the processor determines, based on the signaling, whether the NR link is disconnected.

S322: The terminal device determines whether to disconnect the NR link.

The terminal device monitors the service transmission rate, and obtains a service transmission rate within each monitoring periodicity. The terminal device may set a switch threshold, and compare the service transmission rate with the switch threshold, to determine whether to disconnect the NR link. For ease of description, a switch threshold used to determine whether to disconnect the NR link is denoted as a first switch threshold.

Optionally, if N service transmission rates of the terminal device are less than the first switch threshold, the terminal device determines to disconnect the NR link, uses the LTE link for communication, and may perform S323, where N is an integer greater than or equal to 1. Correspondingly, it may be specified that if at least one of the N service transmission rates of the terminal device is greater than or equal to the first switch threshold, the terminal device determines not to disconnect the NR link, retains the NR link, maintains a current link status, and continues to perform communication by using the NR link and the LTE link. In addition, a case in which the N service transmission rates are the same as the first switch threshold may be set as a condition for determining to disconnect the NR link, or may be set as a condition for determining not to disconnect the NR link. This may be determined based on an actual situation, and is not limited in this application.

It should be understood that the N service transmission rates represent service transmission rates within N monitoring periodicities.

It should be noted that when the terminal device loads a service, the N service transmission rates may be service transmission rates for a same service, or may be service transmission rates for different services. This is not limited in this application. For example, if N is 5, service transmission rates within five monitoring periodicities are all service transmission rates for videos. For another example, if N is 5, service transmission rates within first four monitoring periodicities are all service transmission rates for web page browsing, and a service transmission rate within a fifth monitoring periodicity is a service transmission rate for high-definition videos.

In this step, the embodiment may be further described from the following two cases based on a value of N.

Case A1 (N=1)

In this case, N=1, the N service transmission rates represent one service transmission rate, and at least one of the N service transmission rates represents only one service transmission rate. In other words, if one service transmission rate is less than the first switch threshold, the terminal device determines to disconnect the NR link and uses the LTE link for communication. If one service transmission rate is greater than or equal to the first switch threshold, the terminal device determines not to disconnect the NR link, retains the NR link, maintains the current link status, and continues to perform communication by using the NR link and the LTE link.

In S322, the terminal device detects the service transmission rate, determines to disconnect the NR link provided that the terminal device detects that a service transmission rate within a monitoring periodicity is less than the first switch threshold, and determines to retain the NR link provided that the terminal device detects that a service transmission rate within a monitoring periodicity is greater than or equal to the first switch threshold.

Case A2 (N>1)

In this case, N is an integer greater than 1. For example, N may be 2, 3, 4, 5, or the like. At least one of the N service transmission rates represents one or more service transmission rates, or may represent some or all of the N service transmission rates.

Optionally, the N service transmission rates may be N consecutive service transmission rates. In other words, if N consecutive service transmission rates are less than the first switch threshold, the terminal device determines to disconnect the NR link and uses the LTE link for communication. Conversely, if at least one of the N consecutive service transmission rates is greater than or equal to the first switch threshold, the terminal device determines not to disconnect the NR link, retains the NR link, maintains the current link status, and continues to perform communication by using the NR link and the LTE link. It may be understood that the N consecutive service transmission rates represent service transmission rates within N consecutive monitoring periodicities. For example, N is 5, and the N consecutive service transmission rates may be understood as service transmission rates lasting from a first monitoring periodicity to a fifth monitoring periodicity.

In S322, the terminal device detects the service transmission rate, and determines to disconnect the NR link only when detecting that the N service transmission rates within the N consecutive monitoring periodicities are less than the first switch threshold; otherwise, if the foregoing condition is not met, the terminal device determines to retain the NR link.

In some possible embodiments, the service transmission rate of the terminal device may be based on a transmission rate of a foreground service or a background service currently run by the terminal device.

The following describes S322 in detail with reference to FIG. 4.

For example, a timer M may be set, and duration of the timer M is equal to a product of duration of a monitoring periodicity and N.

In S3221, the timer M is started.

In S3222, it is determined, within the duration of the timer M, whether to disconnect the NR link. Specifically, when timing is performed from a start moment of the timer M, if the N service transmission rates within the N consecutive monitoring periodicities are all less than the first switch threshold, the terminal device determines that the NR link may be disconnected, and performs S323. If at least one service transmission rate is greater than or equal to the first switch threshold within the duration of the timer M, S3221 and S3222 are performed again, the timer M is started, and whether to disconnect the NR link continues to be determined within the duration of the timer M. Such operations are repeatedly performed until the N consecutive service transmission rates are less than the first switch threshold, and S323 is performed.

It is assumed that N=5, the monitoring periodicity is 1 s, and the duration of the timer M is 5 s. For example, if timing starts from the start moment of the timer M, counting starts from 0, and first to fifth service transmission rates are all less than the first switch threshold, the terminal device determines to disconnect the NR link. For another example, if timing starts from the start moment of the timer M, counting starts from 0, the first to the fourth service transmission rates are all less than the first switch threshold, and the fifth service transmission rate is greater than the first switch threshold, the terminal device restarts the timer M, and continues to determine whether to disconnect the NR link.

As an example instead of a limitation, the N service transmission rates may alternatively be N inconsecutive service transmission rates. It may be understood that the N inconsecutive service transmission rates represent service transmission rates within N inconsecutive monitoring periodicities. For example, N=5, and the N inconsecutive service transmission rates may be understood as service transmission rates in a first monitoring periodicity, a third monitoring periodicity, a fifth monitoring periodicity, a seventh monitoring periodicity, and a ninth monitoring periodicity.

It should be understood that an execution sequence of S321 and S322 may be exchanged. This is not limited in this application.

During implementation, this step may be performed by the processor of the terminal device.

S323: The terminal device sends the first instruction.

If the terminal device determines to disconnect the NR link in S322, the terminal device may send the first instruction. The first instruction is used to indicate to the 5G access network device to release the NR link.

In a possible implementation, the terminal device may send the first instruction to the 4G access network device, the 4G access network device sends the first instruction to the 5G access network device, and the 5G access network device releases the NR link according to the first instruction.

For example, the first instruction may be secondary cell group (SCG) failure information.

In another possible implementation, the terminal device may send the first instruction to the 5G access network device, and the 5G access network device releases the NR link according to the first instruction.

Optionally, the 5G access network device may send signaling to the terminal device through the 4G access network device. The signaling is used to notify the terminal device that the NR link is disconnected.

In this step, the NR link is disconnected, and subsequently, the terminal device uses the LTE link for communication.

During implementation, this step may be performed by the processor and the mobile communications module of the terminal device. For example, after determining that the NR link needs to be disconnected, the processor sends the first instruction to the mobile communications module, and the mobile communications module sends the first instruction to the 5G access network device.

S331: The terminal device determines whether to restore the NR link.

The terminal device continues to detect the service transmission rate, obtains a service transmission rate within each monitoring periodicity, and determines, based on the service transmission rate and the switch threshold, whether to restore the NR link. For ease of description, a switch threshold used to determine whether to restore the NR link is denoted as a second switch threshold.

Optionally, if M service transmission rates of the terminal device are greater than the second switch threshold, the terminal device determines to restore the NR link, uses the LTE link and the NR link for communication, and may perform S332, where M is an integer greater than or equal to 1. Correspondingly, it may be specified that if at least one of the M service transmission rates is greater than or equal to the second switch threshold, the terminal device determines not to restore the NR link, maintains the current link status, and continues to perform communication by using the LTE link. In addition, a case in which the M service transmission rates are the same as the second switch threshold may be set as a condition for determining to restore the NR link, or may be set as a condition for determining not to restore the NR link. This may be specifically determined based on an actual situation, and is not limited in this application.

M and N may be the same or may be different. For descriptions of the M service transmission rates, refer to the foregoing related descriptions of the N service transmission rates. Details are not described herein again.

Optionally, N is greater than M. For example, M is 2, and N is 5.

In this way, a quantity N of service transmission rates used to determine whether to disconnect the NR link is set to be greater than a quantity M of service transmission rates used to determine whether to restore the NR link, so that the terminal device can be located in the NR network as much as possible while power consumption can be reduced, thereby meeting the user experience requirement on 5G communication.

In addition, the second switch threshold may be the same as or different from the first switch threshold. This is not limited in this application.

When the second switch threshold is different from the first switch threshold, the second switch threshold is greater than the first switch threshold.

Refer to FIG. 5. A horizontal coordinate represents the service transmission rate, and the service transmission rate gradually increases from left to right. When both the NR link and the LTE link exist, if the N service transmission rates are less than the first switch threshold (on a left side of the first switch threshold), it is determined to disconnect the NR link; or if at least one of the N service transmission rates is greater than or equal to the first switch threshold (on a right side of the first switch threshold), it is determined to not disconnect the NR link, maintain the current link status, and perform communication by using the LTE link and the NR link. When only the LTE link exists, if the M service transmission rates are greater than the second switch threshold (on a right side of the second switch threshold), it is determined to restore the NR link; or if at least one of the M service transmission rates is less than or equal to the second switch threshold (on a left side of the second switch threshold), it is determined to not restore the NR link, maintain the current link status, and perform communication by using the LTE link. It can be clearly learned that, because two switch thresholds are set, compared with a manner of setting one switch threshold, in this manner, the interval between the two switch thresholds effectively alleviates a ping-pong effect caused by continuously disconnecting and restoring the NR link by the terminal device, and improves the stability of a communication process. In addition, the NR link may be retained as long as possible, to meet the user experience requirement on 5G communication.

In this step, the embodiment may be further described from the following two cases based on a value of M.

Case B1 (M=1)

In this case, M=1, the M service transmission rates represent one service transmission rate, and at least one of the M service transmission rates represents only one service transmission rate. In other words, if one service transmission rate is greater than the second switch threshold, the terminal device determines to restore the NR link and uses the LTE link and the NR link for communication. If one service transmission rate is less than or equal to the second switch threshold, the terminal device determines not to restore the NR link, maintains the current link status, and continues to perform communication by using the LTE link.

In S331, the terminal device detects the service transmission rate, and restores the NR link provided that the terminal device detects that a service transmission rate within a monitoring periodicity is greater than the second switch threshold, or does not restore the NR link, maintains the current link status, and continues to perform communication by using the LTE link provided that the terminal device detects that a service transmission rate within a monitoring periodicity is less than or equal to the second switch threshold.

Case B2 (M>1)

In this case, M is an integer greater than 1. For example, M may be an integer such as 2, 3, or 4. At least one of the M service transmission rates represents one or more service transmission rates, or may represent some or all of the M service transmission rates.

Optionally, the M service transmission rates may be M consecutive service transmission rates. In other words, if the M consecutive service transmission rates are greater than the second switch threshold, the terminal device determines to restore the NR link and uses the LTE link and the NR link for communication. Conversely, if at least one of the M consecutive service transmission rates is less than or equal to the second switch threshold, the terminal device determines not to restore the NR link, maintains the current link status, and continues to perform communication by using the LTE link. It may be understood that the M consecutive service transmission rates represent service transmission rates within M consecutive monitoring periodicities. For example, M is 2, and the M consecutive service transmission rates may be understood as service transmission rates lasting from a first monitoring periodicity to a second monitoring periodicity.

In S331, the terminal device monitors the service transmission rate, and determines to restore the NR link only when detecting that the M service transmission rates within the M consecutive monitoring periodicities are greater than the second switch threshold; otherwise, if the foregoing condition is not met, the terminal device determines not to restore the NR link, and continues to use the LTE link for communication.

The following describes S331 in detail with reference to FIG. 6.

For example, a timer N may be set, and duration of the timer N is equal to a product of duration of a monitoring periodicity and M.

In S3311, the timer N is started.

In S3312, it is determined, within the duration of the timer N, whether to restore the NR link. Specifically, starting from a start moment of the timer N, if the M service transmission rates within the M consecutive monitoring periodicities are all greater than the second switch threshold, the terminal device determines that the NR link may be restored, and performs S332. If at least one service transmission rate is less than the second switch threshold within the duration of the timer N, S3311 and S3312 are performed again, the timer N is started, and whether to restore the NR link continues to be determined within the duration of the timer N. Such operations are repeatedly performed until the M consecutive service transmission rates are greater than the second switch threshold, and S332 is performed.

It is assumed that M=2, the monitoring periodicity is 1 s, and the duration of the timer N is 2 s. For example, if timing starts from the start moment of the timer N, counting starts from 0, and first and second service transmission rates are all greater than the second switch threshold, the terminal device determines to restore the NR link. For another example, if timing starts from the start moment of the timer N, counting starts from 0, the first service transmission rate is greater than the second switch threshold, and the second service transmission rate is less than the second switch threshold, the terminal device determines not to restore the NR link, and continues to use the LTE link for communication. In addition, the terminal device restarts the timer N, and continues to determine whether to restore the NR link.

As an example instead of a limitation, the M service transmission rates may alternatively be M inconsecutive service transmission rates. It may be understood that the M inconsecutive service transmission rates represent service transmission rates within M inconsecutive monitoring periodicities. For example, M=2, and the M inconsecutive service transmission rates may be understood as service transmission rates within a first monitoring periodicity and a third monitoring periodicity.

During implementation, this step may be performed by the processor of the terminal device.

S332: The terminal device restores the NR link.

In this step, the NR link may be restored in two manners, which are separately described in detail below.

In a possible implementation, the 4G access network device periodically sends signaling to indicate to the terminal device to measure a plurality of 5G cells to establish the NR link. For example, the signaling may be RRC connection reconfiguration information, where the RRC connection reconfiguration information is used to configure the 5G cell that the terminal device needs to measure, or may be denoted as measure configuration. If the terminal device determines that the NR link does not need to be restored, the terminal device does not need to measure the 5G cell based on the signaling. If the terminal device determines that the NR link needs to be restored, the terminal device may measure the plurality of 5G cells based on the signaling, and report, to the 4G access network device, a measurement report of a 5G cell that meets a condition. The condition may be, for example, signal strength of the measured cell meets a requirement. The 4G access network device sends the measurement report of the 5G cell that meets the condition to the 5G access network device. The 5G access network device configures a cell for the terminal device based on the measurement report, and sends cell configuration information to the terminal device through the 4G access network device. For example, the cell configuration information may be the RRC connection reconfiguration information, where the RRC connection reconfiguration information is used to configure a cell accessed by the terminal device, or may be denoted as an SCG configuration. The terminal device accesses, based on the cell configuration information, the cell configured by the 5G access network device for the terminal device, to complete establishment of the NR link.

In another possible implementation, the 4G access network device periodically sends signaling to indicate to the terminal device to measure a plurality of 5G cells to establish the NR link. If the terminal device determines that the NR link does not need to be restored, the terminal device does not need to measure the 5G cell based on the signaling. If the terminal device determines that the NR link needs to be restored, the terminal device sends a second instruction to the 4G access network device. The second instruction is used to indicate to the 5G access network device to restore the NR link. The 4G access network device forwards the second instruction to the 5G access network device, and the 4G access network device starts to send the signaling to the terminal device, to indicate to the terminal device to measure the plurality of 5G cells to restore the NR link. Subsequent specific steps are the same as those in the first possible implementation, and details are not described again.

During implementation, this step may be performed by the processor and the mobile communications module of the terminal device. For example, after determining that the NR link needs to be restored, the processor exchanges information with the 4G access network device and the 5G access network device through the mobile communications module, to restore the NR link.

After the NR link is restored, the terminal device continues to detect the service transmission rate, and performs S321 to determine whether to disconnect the NR link. This process is repeated, so that the NR link is disconnected and restored without affecting user experience on the service transmission rate.

It should be understood that, sequence numbers of the foregoing processes in the method 300 do not mean execution sequences. The execution sequences of the processes should be determined based on functions and internal logic of the processes, and should not be construed as any limitation on the implementation processes of the embodiments of this application. For example, an execution sequence of S321 and S322 may be exchanged.

It should be further understood that a process of each step in the method 300 is merely an example for description. During implementation, functions and internal logic of some or all of the foregoing steps may be performed based on an actual situation. For example, the method 300 may include steps S310, S322, S323, S331, and S332.

The following uses an example to describe two manners of determining the first switch threshold and the second switch threshold in this application.

Manner 1

Optionally, the terminal device determines the first switch threshold and the second switch threshold based on at least one parameter of signal strength, a cell bandwidth, a duplex mode, and a transmission mode of an LTE network in which the terminal device is located.

The cell bandwidth represents a bandwidth occupied by a cell in which the terminal device is located. For example, the cell bandwidth may be 20 MHz, 60 MHz, or the like.

The duplex mode includes a time-division duplex (TDD) mode or a frequency-division duplex (FDD) mode.

The transmission mode includes uplink transmission or downlink transmission.

In a possible implementation, the terminal device may determine a rate threshold based on at least one parameter of the signal strength, the cell bandwidth, the duplex mode, and the transmission mode of the LTE network in which the terminal device is located, determine a guard rate based on the rate threshold, and determine the first switch threshold and the second switch threshold based on the rate threshold and the guard rate.

For example, the guard rate is obtained based on the rate threshold. As an example instead of a limitation, the guard rate may be x times the rate threshold. For example, x may be 0.1.

Still refer to FIG. 3. When the first switch threshold is different from the second switch threshold, optionally, the first switch threshold=the rate threshold−the guard rate, and the second switch threshold=the rate threshold+the guard rate.

When the first switch threshold is the same as the second switch threshold, a switch threshold used to determine whether to disconnect or restore the NR link may be considered as a switch threshold. For example, an obtained rate threshold may be used as the switch threshold, and the guard rate is not required.

Table 1 to Table 4 show relationships between the rate threshold and the signal strength, the cell bandwidth, the duplex mode, and the transmission mode in the LTE network shown in this application. It can be learned that any change in the signal strength, the cell bandwidth, the duplex mode, and the transmission mode affects the rate threshold, so as to affect the switch threshold.

To enable the terminal device to determine a relatively appropriate switch threshold, in a possible implementation, when any one of the foregoing parameters changes, the terminal device may recalculate the switch threshold based on the changed parameter. In another possible implementation, when the cell in which the terminal device is located changes, the terminal device may re-obtain the foregoing four parameters of the terminal device in a current cell, and determine a new switch threshold. It should be understood that when the cell in which the terminal device is located changes, any one of the foregoing parameters may change or may not change.

TABLE 1

| Duplex mode (TDD), cell bandwidth (20 M), transmission mode (downlink) | | | |
|---|---|---|---|
| Signal strength (dB) | Strong field ((5, + ∞)) | Midfield ([−5, 5]) | Weak field ((−15, −5)) | Very weak field ((−∞, −15]) |
| Rate threshold (Mbps) | 10 | 7 | 1.5 | 0.1 |

TABLE 2

| Duplex mode (TDD), cell bandwidth (20 M), transmission mode (uplink) | | | |
|---|---|---|---|
| Signal strength (dB) | Strong field ((5, +∞)) | Midfield ([−5, 5]) | Weak field ((−15, −5)) | Very weak field ((−∞, −15]) |
| Rate threshold (Mbps) | 0.8 | 0.08 | 0.002 | 0.0001 |

TABLE 3

| Duplex mode (FDD), cell bandwidth (20 M), transmission mode (downlink) | | | |
|---|---|---|---|
| Signal strength (dB) | Strong field ((5, + ∞)) | Midfield ([−5, 5]) | Weak field ((−15, −5)) | Very weak field ((−∞, −15]) |
| Rate threshold (Mbps) | 6 | 3 | 1 | 0.1 |

TABLE 4

| Duplex mode (FDD), cell bandwidth (20 M), transmission mode (uplink) | | | |
|---|---|---|---|
| Signal strength (dB) | Strong field ((5, + ∞)) | Midfield ([−5, 5]) | Weak field ((−15, −5)) | Very weak field ((−∞, −15]) |
| Rate threshold (Mbps) | 3 | 1 | 0.02 | 0.0001 |

With reference to Table 5, the following briefly describes a process in which the terminal device disconnects the NR link by using an example in which the first switch threshold changes because the signal strength changes. Changes of the first switch threshold and the second switch threshold that are caused by other factors are similar to this, and examples are not described again.

As shown in Table 5, the user operates the terminal device to load a game service. When the signal strength is relatively good (10 dB), the first switch threshold is relatively large (11 Mbps), which is greater than the service transmission rate (11 Mbps) of the terminal device, the NR link is disconnected, and the LTE link is used for communication. Subsequently, the terminal device is moved to a place with poor signal strength, and the signal strength is 2 dB. It is clearly that the first switch threshold is reduced to 4 Mbps, which is less than the service transmission rate of the terminal device, the NR link is restored, and the LTE link and the NR link are used for communication.

TABLE 5

| Signal strength (dB) | First switch threshold (Mbps) | Service transmission rate (Mbps) | Service | Link |
|---|---|---|---|---|
| 10 | 11 | 8 | Gaming | LTE |
| 2 | 4 | 7 | Gaming | LTE + NR |

Manner 2

Optionally, the first switch threshold and the second switch threshold may be predefined.

In a possible implementation, when the first switch threshold is different from the second switch threshold, an application program (briefly referred to as an application below) may be classified into a plurality of types of applications based on the service transmission rate. Services loaded by any two types of applications have different service transmission rates, each type of application includes at least one application, each type of application corresponds to each group of switch thresholds, each group of switch thresholds includes one first switch threshold and one second switch threshold, and switch thresholds in any two groups of switch thresholds are not totally the same, in other words, one of the any two groups of switch thresholds may be the same, or may be totally different.

For example, applications are classified into two types of applications: an application type A and an application type B. The application type A corresponds to a switch threshold group A, and the application type B corresponds to a switch threshold group B. A service transmission rate of an application in the application type A is greater than a service transmission rate of an application in the application type B. Correspondingly, a first switch threshold in the switch threshold group A is greater than or equal to a first switch threshold in the switch threshold group B, a second switch threshold in the switch threshold group A is greater than a second switch threshold in the switch threshold group B, or the first switch threshold in the switch threshold group A is greater than the first switch threshold in the switch threshold group B, and the second switch threshold in the switch threshold group A is greater than or equal to the second switch threshold in the switch threshold group B.

It should be understood that the service transmission rate of the application described in this application may be understood as a service transmission rate of a service loaded by the application.

For example, during implementation, a group of switch thresholds may be configured for each application, and applications belonging to a same type of application correspond to a same switch threshold. The terminal device may determine, based on an application currently running in the foreground (or being operated by the user), a group of switch thresholds corresponding to the application. Refer to the embodiment described in S310 to S332. The terminal device determines, based on the service transmission rate of the application and the corresponding group of switch thresholds, whether to disconnect or restore the NR link.

In another possible implementation, when the first switch threshold is the same as the second switch threshold, applications may be classified into a plurality of types of applications based on the service transmission rate. Any two types of applications have different service transmission rates, each type of application includes at least one application, each type of application corresponds to one switch threshold, and any two switch thresholds are different.

For example, applications may be classified into two types of applications: an application type A and an application type B. The application type A corresponds to a switch threshold A, and the application type B corresponds to a switch threshold B. A service transmission rate of an application in the application type A is greater than a service transmission rate of an application in the application type B. Correspondingly, the switch threshold A is greater than the switch threshold B.

For example, during implementation, a switch threshold may be configured for each application, and applications belonging to a same type of application correspond to a same switch threshold. The terminal device may determine, based on an application running in the foreground, a switch threshold corresponding to the application. Refer to the embodiment described in S310 to S332. The terminal device determines, based on the service transmission rate of the application and the corresponding switch threshold, whether to disconnect or restore the NR link.

For example, the application type A may include the following applications: a navigation application (for example, AutoNavi Map or Baidu Map), a reading application (for example, WeChat Reading), and a game application (for example, Honor of Kings or a QQ game). The application type B may include the following applications: an application into which a video can be embedded (for example, WeChat, Weibo, or a browser) and a video application (for example, Youku Video or Tencent Video).

The foregoing describes in detail the wireless communications method 300 provided in this application with reference to FIG. 3 to FIG. 6. This application further provides another wireless communications method 400. The following describes the method 400.

A main difference between the method 300 and the method 400 is as follows: In the method 300, applications are not distinguished, and the terminal device can monitor a service transmission rate of any application on the terminal device, to determine, based on the service transmission rate of the terminal device, whether to disconnect or restore the NR link. However, in the method 400, instead of monitoring all applications, the applications may be classified based on service transmission rates. One type of application is an application that needs to be monitored by a terminal device, and a service transmission rate of the application needs to be detected to disconnect or restore an NR link. Generally, an application with a relatively low service transmission rate may be classified into this type of application. For ease of description, this type of application is denoted as a preset type of application, and the preset type of application includes one or more preset applications. Another type of application is an application that does not need to be monitored by the terminal device, and a service transmission rate of the application does not need to be detected. Generally, an application with a relatively high service transmission rate may be classified into this type of application. For ease of description, this type of application is denoted as a non-preset type of application. The non-preset type of application includes one or more non-preset applications.

For example, a service transmission rate of an application in the preset application is less than a service transmission rate of an application in the non-preset application.

For example, the service transmission rate of the preset application is less than a first threshold, and the service transmission rate of the non-preset application is greater than the first threshold.

For the preset type of application, the terminal device monitors the application in the preset type of application, to determine, based on a service transmission rate of the application, whether to disconnect or restore the NR link, so as to reduce power consumption of the terminal device while meeting the user experience requirement as much as possible. For the non-preset type of application, the terminal device may not monitor the application in the non-preset type of application. To be specific, the terminal device may not need to detect the service transmission rate or perform any processing on the NR link, but always uses an LTE link and the NR link for communication, to preferentially ensure a rate requirement of a user for the application in the non-preset type of application as much as possible, without affecting the user experience on 5G communication.

Optionally, the preset type of application may include the following applications: a navigation application, a reading application, a game application, and an application into which a video can be embedded.

Optionally, the non-preset type of application may include the following applications: an application market for downloading software, test software (for example, a speedtest application) for testing performance of the terminal device, and a video application.

It should be understood that the foregoing classification of the preset type of application and the non-preset type of application is merely an example for description, and should not constitute a limitation on this application. Various types of applications in the foregoing examples may be freely grouped and classified based on an actual situation. As an example instead of a limitation, the application into which a video can be embedded may alternatively be classified into the non-preset type of application.

In some embodiments, a switch threshold is also set, and a service transmission rate of an application is compared with the switch threshold to determine whether to disconnect or restore a link. Similar to the description in the method 300, a switch threshold used to determine whether to disconnect the NR link is denoted as a first switch threshold, and a switch threshold used to determine whether to restore the NR link is denoted as a second switch threshold. The first switch threshold and the second switch threshold may be the same or may be different.

In the method, for example, for a manner of determining the first switch threshold and the second switch threshold, refer to the manner 1 and the manner 2 in the method 300. Details are not described herein again.

It should be noted that, when the switch threshold is determined in the foregoing manner 2 in the method 400, an application belonging to a preset type of application is classified.

For example, when the preset type of application may include a navigation application, a reading application, a game application, and an application into which a video can be embedded, optionally, the preset type of application may be classified into three types. An application type A may include the following applications: the navigation application and the reading application, an application type B may include the game application, and an application type C may include the application into which a video can be embedded. Optionally, a group of switch thresholds corresponding to the application type A may be: the first switch threshold is 1 Mbps, and the second switch threshold is 3 Mbps; a group of switch thresholds corresponding to the application type B may be: the first switch threshold is 1 Mbps, and the second switch threshold is 5 Mbps; and a group of switch thresholds corresponding to the application type C may be: the first switch threshold is 2 Mbps, and the second switch threshold is 20 Mbps.

For example, when the preset type of application may include a navigation application, a reading application, and a game application, optionally, the preset type of application may be classified into two types. An application type A may include the following applications: the navigation application and the reading application, and an application type B may include the game application. Optionally, a group of switch thresholds corresponding to the application type A may be: the first switch threshold is 1 Mbps, and the second switch threshold is 3 Mbps; and a group of switch thresholds corresponding to the application type B may be: the first switch threshold is 1 Mbps, and the second switch threshold is 5 Mbps.

In an application running process, to meet requirements at different phases, various timers may be set. For example, a first timer is set, and is denoted as a timer A. When the application is started, the timer A may be started, to avoid a ping-pong effect because the terminal device frequently restores and disconnects the NR link in a short time period. For example, a third timer is set, and is denoted as a timer M. The third timer may correspond to the timer M in step S322 in the method 300. Whether to disconnect the NR link may be determined based on the timer M. For example, a fourth timer is set, and is denoted as a timer N. The fourth timer may correspond to the timer N in step S331 in the method 300. Whether to restore the NR link may be determined based on the timer N. For example, a second timer is set, and is denoted as a timer B. After the NR link is restored, the timer B may be started, so that the terminal device retains the NR link within duration of the timer B, to improve the user experience on 5G communication as much as possible. This can also avoid the ping-pong effect because the terminal device frequently restores and disconnects the NR link in a short time period.

It should be understood that duration of the foregoing timers may be adjusted irregularly based on an actual situation. This is not limited in this application.

Optionally, duration of the timer A is 30 s.

Optionally, duration of the timer M is 3 s.

Optionally, duration of the timer N is 3 s.

Optionally, the duration of the timer B is 30 s.

Figure 7A:
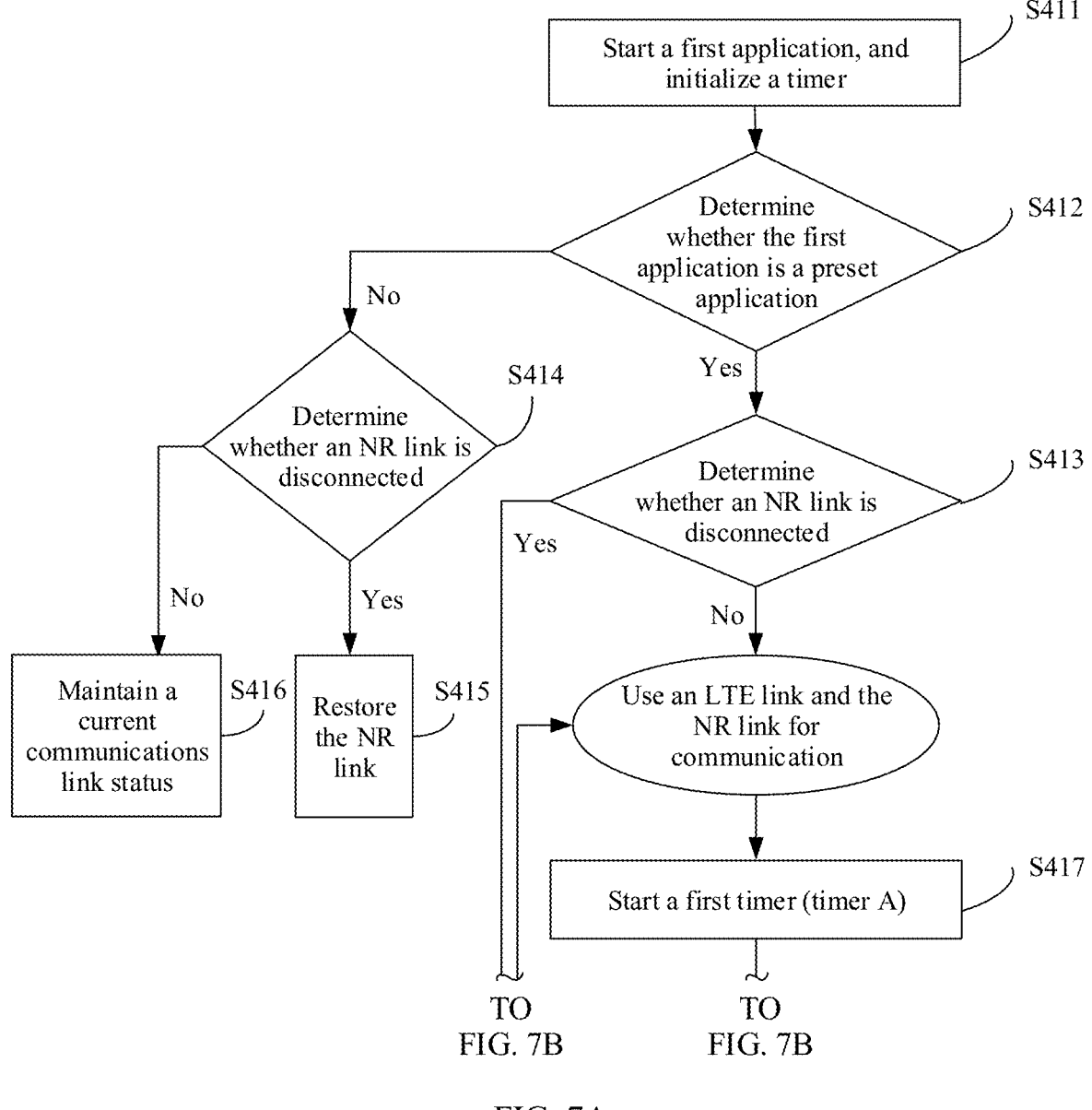
FIG. 7A and FIG. 7B are another schematic flowchart of a wireless communications method according to this application.
Figure 7B:
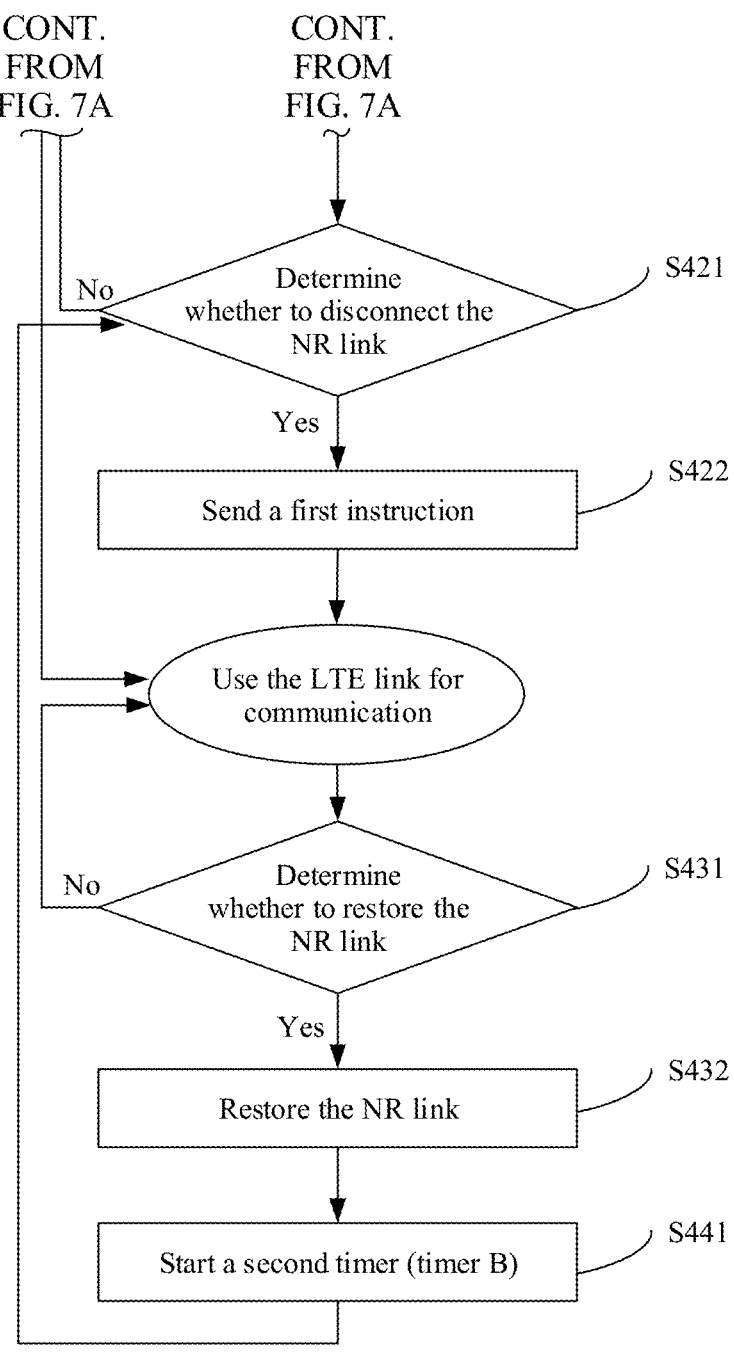
Figure 8:
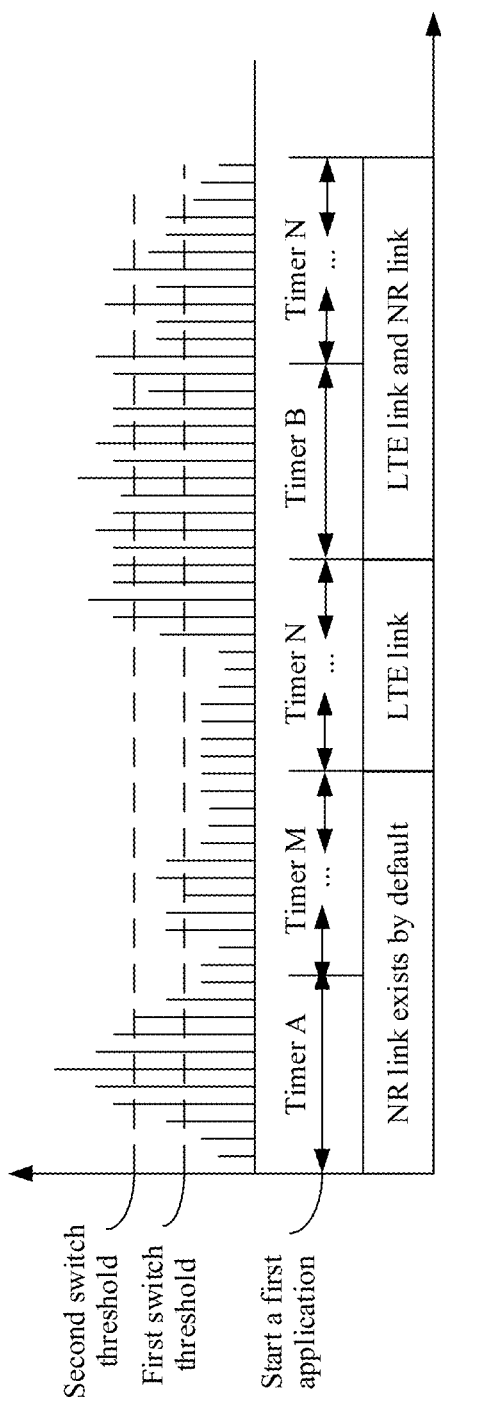
FIG. 8 is another schematic flowchart of a wireless communications method according to this application.

The foregoing describes in detail the another wireless communications method 400 provided in this application with reference to FIG. 7A and FIG. 7B and FIG. 8. FIG. 7A and FIG. 7B are a schematic flowchart of the wireless communications method 400 according to this application. FIG. 8 is another schematic flowchart of the wireless communications method 400 according to this application.

S411: The terminal device starts a first application, and initializes a timer.

The terminal device monitors an application running in the foreground, and detects that the application in the foreground changes and the user starts a new application. The terminal device may initialize all timers that are set for application monitoring, and set the timers to zero, so as to start timing for the started new application, and subsequently disconnect or restore the NR link more accurately. For ease of description, an application currently running in the foreground is denoted as the first application. It should be understood that the application running in the foreground represents an application that is currently operated by the user and that shows a display interface.

It should be understood that this step is an optional step. When the first application is started, the timer may not need to be initialized, and S412 is performed.

During implementation, this step may be performed by a processor of the terminal device.

S412: The terminal device determines whether the first application is the preset type of application.

In the method, only an application belonging to the preset type of application may need to be monitored to determine whether to disconnect or restore the NR link. Therefore, after the first application is started and run, in S412, whether the first application is the preset application in the preset type of application may be further determined. For example, the terminal device may determine, based on an application identifier of the first application, whether the first application is the preset application. For example, the application identifier may be an identifier such as an application programming interface (API), an application program name, or an application program identity (ID).

If the first application is the preset application, S413 is performed, to subsequently determine whether to disconnect the NR link.

If the first application is the non-preset application (that is, the first application is not the preset application), optionally, the terminal device may not need to monitor the first application to disconnect the NR link, and may perform communication by using the LTE link and the NR link. Therefore, the terminal device may perform S414 to determine whether the NR link is disconnected. This mainly considers a case in which the NR link may be disconnected when the user operates an application before the first application. If determining that the NR link is disconnected, the terminal device performs S415 to restore the NR link. For a description of restoring the NR link, refer to the related description of S332 in the method 300. Details are not described herein again. If determining that the NR link is not disconnected, the terminal device performs S416 to maintain a current link status and perform communication by using the LTE link and the NR link. Certainly, if the first application is the non-preset application, S414 may not be performed, and the current link status may be maintained regardless of whether the NR link is disconnected.

In this step, the terminal device may not only determine whether the first application is the preset application, but also further determine whether the terminal device is in a priority mode, to avoid a case that proper running of another service is affected because the NR link is disconnected in a process in which the user operates the first application. Regardless of whether the first application is the preset application, provided that the terminal device is in the priority mode, S413 is not performed, and S414 is performed. For example, the priority mode may include at least one of the following modes: a call mode, a charging mode, a performance optimization mode, and a hotspot sharing mode. The call mode indicates that the terminal device is in a state of processing a call service. The charging mode indicates that the terminal device is being charged. The performance optimization mode indicates that the terminal device is set to be in a state in which the terminal device can be in optimal performance, and the optimal performance state may include a state in which a network transmission rate is relatively high. The hotspot sharing mode indicates that the terminal device is in a mode in which mobile data traffic is shared with another device for use.

If the first application is the preset application, when the terminal device is in the call mode, the terminal device does not monitor the service transmission rate to process the NR link, so as to avoid affecting call quality because of a ping-pong effect caused by frequent NR link disconnection and restoration.

If the first application is the preset application, when the terminal device is in the charging mode, the terminal device does not monitor the service transmission rate to process the NR link. Because the current charging mode can provide sufficient power consumption for the terminal device, the LTE link and the NR link are used for communication, so that transmission efficiency can be improved.

If the first application is the preset application, when the terminal device is in the performance optimization mode and/or the hotspot sharing mode, the terminal device does not monitor the service transmission rate to process the NR link. This can ensure the performance optimization mode, and preferentially meet a user requirement to improve transmission efficiency.

If the first application is the preset application, when the terminal device is in the hotspot sharing mode, the terminal device does not monitor the service transmission rate to process the NR link, so that requirements of a plurality of devices for transmission rates can be met.

With reference to the preset application and the priority mode, the terminal device determines whether the first application is the preset application and whether the terminal device is in the priority mode. If the terminal device determines that the first application is the preset application and the terminal device is not in the priority mode, S413 is performed; otherwise, S414 is performed or the current link status is maintained.

It should be understood that steps S411 and S412 may be performed simultaneously, or S411 may be performed before S412. This is not limited in this application.

During implementation, this step may be performed by the processor of the terminal device.

S413: The terminal device determines whether the NR link is disconnected.

Considering a case in which the NR link is disconnected when the application before the first application is operated on the terminal device and the NR link is forcibly disconnected due to an exception (for example, excessively poor signal strength), optionally, after the terminal device determines that the first application is the preset application, in S413, the terminal device determines whether the NR link is disconnected. If the NR link is not disconnected, it indicates that the terminal device is in a NSA network, and S414 or S421 may be performed. If the NR link is disconnected, S414 or S421 is not performed, and the LTE link continues to be used for communication. In addition, S431 may be performed to determine whether to restore the NR link. When it is determined that the NR link can be restored, NR link is restored through interaction with an access network device.

In this way, this step can avoid a signaling waste because the terminal device still needs to determine, when the NR link is disconnected, whether to disconnect the NR link and the terminal device sends the first instruction to a 5G access network device when determining that the NR link needs to be disconnected, and can reduce signaling overheads.

It should be understood that the terminal device may not need to perform S413, but may directly perform S414 or S421. This may cause a signaling waste.

During implementation, this step may be performed by the processor and a mobile communications module of the terminal device. For example, the mobile communications module may send signaling to the processor to indicate whether the NR link is disconnected, and the processor determines, based on the signaling, whether the NR link is disconnected.

S417: The terminal device starts the timer A.

The terminal device considers that the terminal device may further determine whether to disconnect the NR link. Before determining whether to disconnect the NR link, optionally, the terminal device performs S417 to start the timer A. Within the duration of the timer A, the terminal device continues to use a link in a current status for communication, and does not perform any determining processing on the NR link, to avoid a ping-pong effect caused by the user when disconnecting and restoring the NR link within a short time period before and after switching applications.

The link in the current status represents a link obtained after the first application is started. For example, when the first application is started, the NR link is disconnected, and the terminal device continues to use the LTE link for communication. Generally, this case usually occurs when the NR link is disconnected when the application before the first application is operated on the terminal device, and also occurs when the NR link is forcibly disconnected due to an exception (for example, excessively poor signal strength). For another example, when the first application is started, the NR link is not disconnected, and the LTE link and the NR link continue to be used for communication. Generally, this case mostly occurs when the NR link is not disconnected when the application before the first application is operated on the terminal device.

It should be understood that a sequence of steps S413 and S417 may be interchanged. S413 may be performed before S417, or S417 may be performed before S413. This is not limited in this application.

During implementation, this step may be performed by the processor of the terminal device.

S421: The terminal device determines whether to disconnect the NR link.

Similar to the method 300, the terminal device may set the switch threshold, and compare a service transmission rate of the first application with a corresponding switch threshold, to determine whether to disconnect the NR link. For ease of description, the switch threshold used to determine whether to disconnect the NR link is also denoted as the first switch threshold. If the preset type of application is classified into a plurality of types, the first application belongs to a type of application in the preset type of application, as described in the method 300, a corresponding switch threshold (for example, the first switch threshold and the second switch threshold) may be configured for each application, and a type of application corresponds to a same switch threshold. For the first application, the terminal device may determine a corresponding first switch threshold based on the first application, and determine, based on the service transmission rate of the first application and the corresponding first switch threshold, whether to disconnect the NR link.

Optionally, if N service transmission rates are less than the first switch threshold, the terminal device determines to disconnect the NR link, uses the LTE link for communication, and may perform S421, where N is an integer greater than or equal to 1. Correspondingly, it may be specified that if at least one of the N service transmission rates is greater than or equal to the first switch threshold, the terminal device determines not to disconnect the NR link, retains the NR link, maintains a current link status, and continues to perform communication by using the NR link and the LTE link. In addition, a case in which the N service transmission rates are the same as the first switch threshold may be set as a condition for determining to disconnect the NR link, or may be set as a condition for determining not to disconnect the NR link. This may be specifically determined based on an actual situation, and is not limited in this application.

For descriptions of the N service transmission rates, refer to related descriptions of step S322 in the method 300. Details are not described again.

In this step, based on a value of N, for further description of the embodiments in two cases: N=1 and N>1, refer to the case A1 and the case A2 in step S322 in the method 300. Details are not described herein again.

When N>1, the terminal device may determine, based on the timer M, whether to disconnect the NR link. For descriptions, refer to S3221 and S3222 in S322. Details are not described again. It should be understood that an action of starting the timer M by the terminal device may be performed after the duration of the timer A in S414 ends, or may be performed after S412 in the embodiment excluding S413 and S417, or may be performed after S413 in the embodiment excluding S417. This is not limited in this application.

During implementation, this step may be performed by the processor of the terminal device.

S422: The terminal device sends the first instruction.

For descriptions of this step, refer to related descriptions of step S323 in the method 300. Details are not described again.

S431: The terminal device determines whether to restore the NR link.

After S422, the terminal device continues to detect the service transmission rate of the first application, obtains a service transmission rate within each monitoring periodicity, and determines, based on the service transmission rate and the switch threshold, whether to restore the NR link. For ease of description, a switch threshold used to determine whether to restore the NR link is also denoted as a second switch threshold.

Optionally, if M service transmission rates are greater than the second switch threshold, the terminal device determines to restore the NR link, uses the LTE link and the NR link for communication, and may perform S432, where M is an integer greater than or equal to 1. Correspondingly, it may be specified that if at least one of the M service transmission rates is greater than or equal to the second switch threshold, the terminal device determines not to restore the NR link, maintains the current link status, and continues to perform communication by using the LTE link. In addition, a case in which the M service transmission rates are the same as the second switch threshold may be set as a condition for determining to restore the NR link, or may be set as a condition for determining not to restore the NR link. This may be specifically determined based on an actual situation, and is not limited in this application.

For descriptions of the M service transmission rates, refer to related descriptions of step S331 in the method 300. Details are not described again.

In this step, based on a value of M, for further description of the embodiments in two cases: M=1 and M>1, refer to the case B1 and the case B2 in step S331 in the method 300. Details are not described herein again.

When M>1, the terminal device determines, based on the timer N, whether to restore the NR link. For descriptions, refer to S3311 and S3312 in S322. Details are not described again. It should be understood that an action of starting the timer N by the terminal device may be performed after S422, or may be performed synchronously with S422. This is not limited in this application.

During implementation, this step may be performed by the processor of the terminal device.

S432: The terminal device restores the NR link.

For descriptions of this step, refer to related descriptions of step S332 in the method 300. Details are not described again.

S441: The terminal device starts the timer B.

After S432 or when S432 is performed, the terminal device starts the timer B, and does not perform, within the duration of the timer B, an action of determining whether to disconnect the NR link. First, time may be reserved to restore the NR link as much as possible through interaction between the terminal device and the access network device. Second, the terminal device is enabled to experience 5G communication within specific duration as much as possible. Third, the ping-gong effect can also be avoided.

After the duration of the timer B ends, the terminal device continues to perform S421 and subsequent steps, and repeatedly performs the foregoing possible steps. As an example instead of a limitation, the terminal device may alternatively first perform S413 and subsequent steps.

During implementation, this step may be performed by the processor of the terminal device.

It should be noted that, in any one of the foregoing steps, optionally, if the terminal device exits the first application and the NR link is disconnected, the terminal device exchanges information with a 4G access network device and the 5G access network device to restore the NR link. Optionally, if the terminal device exits the first application and the NR link is not disconnected, the terminal device maintains the current link status, and uses the LTE link and the NR link for communication.

It should be understood that, that the terminal device exits the first application may be that the terminal device closes the first application, or may be that the terminal device exits the first application running in the foreground and runs the first application in the background.

With reference to FIG. 8, the following describes NR link disconnection and restoration performed by using four timers in a possible implementation of the method 400.

The terminal device starts the first application and determines the first application as the preset application. The terminal device starts the timer A. In addition, regardless of the current link status, the terminal device may consider by default that the NR link exists in a system. After the duration of the timer A ends, the terminal device starts the timer M. The duration of the timer M is equal to a product of duration of a monitoring periodicity and N. Starting from a start moment of the timer M, the terminal device determines whether N service transmission rates in N monitoring periodicities meet a condition of being less than the first switch threshold. If yes, the terminal device disconnects the NR link, and starts the timer N. If no, the terminal device restarts the timer M, and continues to determine whether the condition is met. The process is repeatedly performed until the condition is met, the NR link is disconnected, and the timer N is started. The terminal device starts the timer N. The duration of the timer N is equal to a product of the duration of the monitoring periodicity and M. Starting from a start moment of the timer N, the terminal device determines whether M service transmission rates in M monitoring periodicities meet a condition of being greater than the second switch threshold. If yes, the terminal device restores the NR link, and starts the timer B. If no, the terminal device restarts the timer N, and continues to determine whether the condition is met. This process is repeatedly performed until the condition is met, the NR link is restored, and the timer B is started. The terminal device starts the timer B. Within the duration of the timer B, the NR link is not disconnected when there is no exception, and the terminal device may perform communication by using the LTE link and the NR link.

It should be understood that a process of each step in the method 400 is merely an example for description. During implementation, functions and internal logic of some or all of the foregoing steps may be performed based on an actual situation.

For example, in the method 400, any other steps that can be combined may be added when steps S412, S421, S422, S431, and S432 are included. For example, the method 400 may include steps S412, S417, S421, S422, S431, and S432. For another example, the method 400 may include steps S412, S413, S417, S421, S422, S431, and S432. For another example, the method 400 may include steps S412, S413, S417, S421, S422, S431, S432, and S441.

It should be further understood that, sequence numbers of the foregoing processes in the method 400 do not mean execution sequences. The execution sequences of the processes should be determined based on functions and internal logic of the processes, and should not be construed as any limitation on the implementation processes of the embodiments of this application.

For example, S411 and S412 may be performed simultaneously, or S411 may be performed before S412. For another example, S432 and S441 may be performed simultaneously, or S432 may be performed before S441.

The foregoing describes in detail the wireless communications method in this application with reference to FIG. 3 to FIG. 8. It should be understood that the method 300 and the method 400 may be implemented separately, or may be implemented in combination, provided that the method 300 and the method 400 can be implemented logically. This is not limited in this application. For example, in the method 300, the timer B may be alternatively set, and the timer B is started in a process in which the terminal device restores the NR link, to restore the NR link as much as possible and enable the user to experience 5G communication within the duration of the timer B.

The following further describes the wireless communications method provided in this application with reference to possible schematic scenario diagrams provided in FIG. 9(a) to FIG. 17(d) by using an example in which a mobile phone is used as the terminal device.

In a case, when a system link changes, a mobile network identifier displayed on the mobile phone also changes. For example, when the mobile phone uses the LTE link for communication, a mobile network displayed on the mobile phone is 4G, and when the mobile phone uses the LTE link and the NR link for communication, the mobile network displayed on the mobile phone is 5G.

It should be noted that an existing protocol does not clearly define a display rule of a 5G icon in NSA networking. GSMA defines several states and an icon display scheme in each state based on different coverage and combinations of different states of 4G and NR networks. As a reference, Table 6 shows various possible configurations of a network in different states. Each state has four configuration manners, and an operator may negotiate with a terminal manufacturer to use a configuration manner. Configuration D is relatively radical. There is a high probability of NSA display. Even if the user is not registered with a core network, the 5G icon can be displayed on any 5G terminal. Configuration A is relatively conservative. The foregoing scheme is only a recommendation of GSMA, and there is no related content on the 3GPP currently.

TABLE 6

| State | Configuration A | Configuration B | Configuration C | Configuration D |
|---|---|---|---|---|
| IDLE in an LTE cell that does not support NS A networking or IDLE connected to the LTE cell | 4G | 4G | 4G | 4G |
| IDLE in an LTE cell that supports NS A networking and that is not detected in an NR coverage area or IDLE connected to the LTE cell | 4G | 4G | 4G | 5G |
| Connect to LTE only in an LTE cell that supports NS A networking and that is detected in an NR coverage area | 4G | 4G | 5G | 5G |
| IDLE in an LTE cell that supports NS A networking and that is detected in an NR coverage area | 4G | 5G | 5G | 5G |
| Connect to LTE and NR in an LTE cell that supports NS A networking | 5G | 5G | 5G | 5G |
| IDLE in an NG RAN when connecting to 5GC or IDLE connected to the NG RAN | 5G | 5G | 5G | 5G |

With reference to the foregoing cases, the following describes switching between 4G and 5G in the scenarios shown in FIG. 9(a) to FIG. 16(d).

Figure 9A:
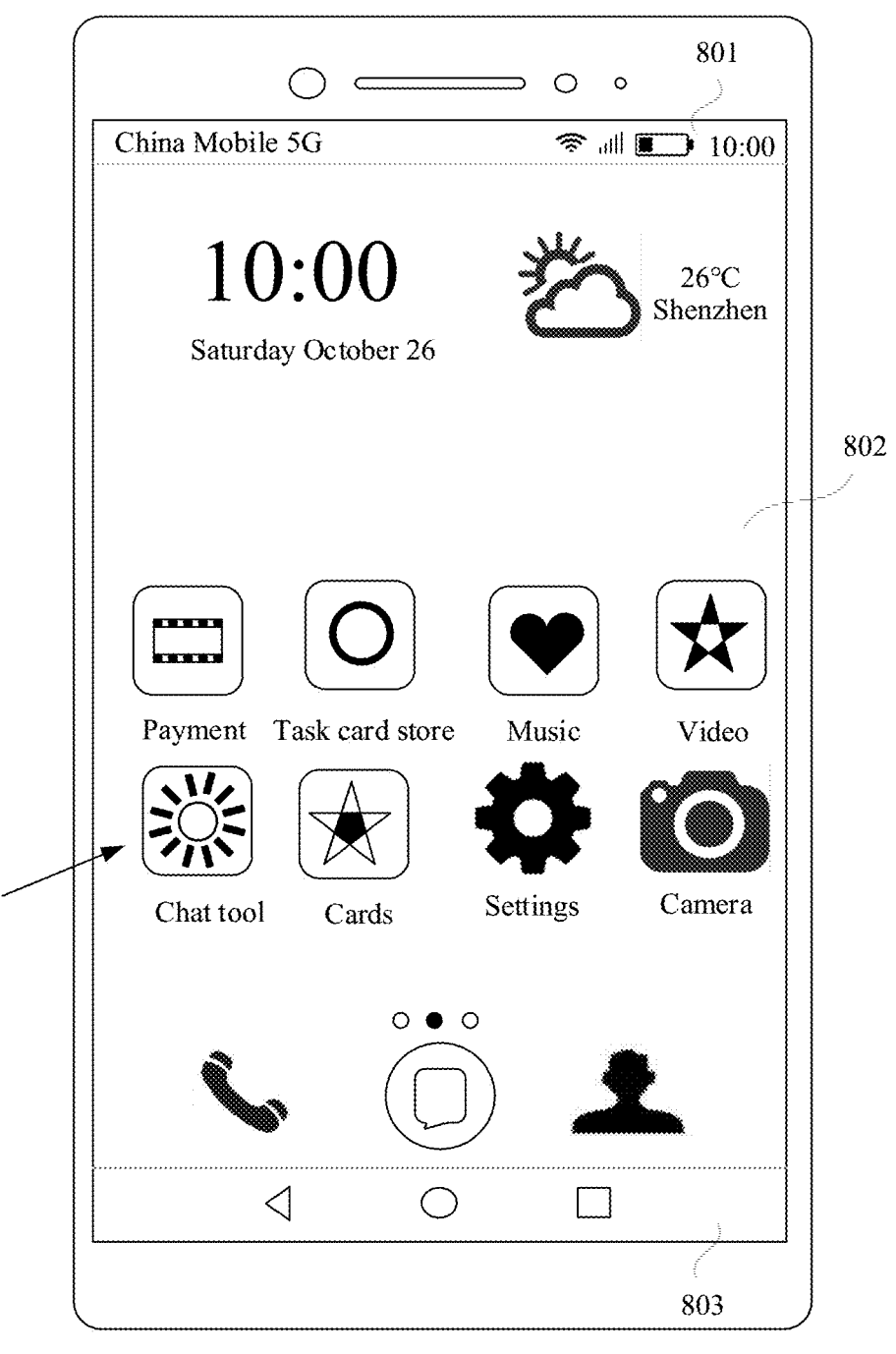
FIG. 9(a) to FIG. 17(d) are schematic diagrams of various possible application scenarios of a wireless communications method according to this application.
Figure 9C:
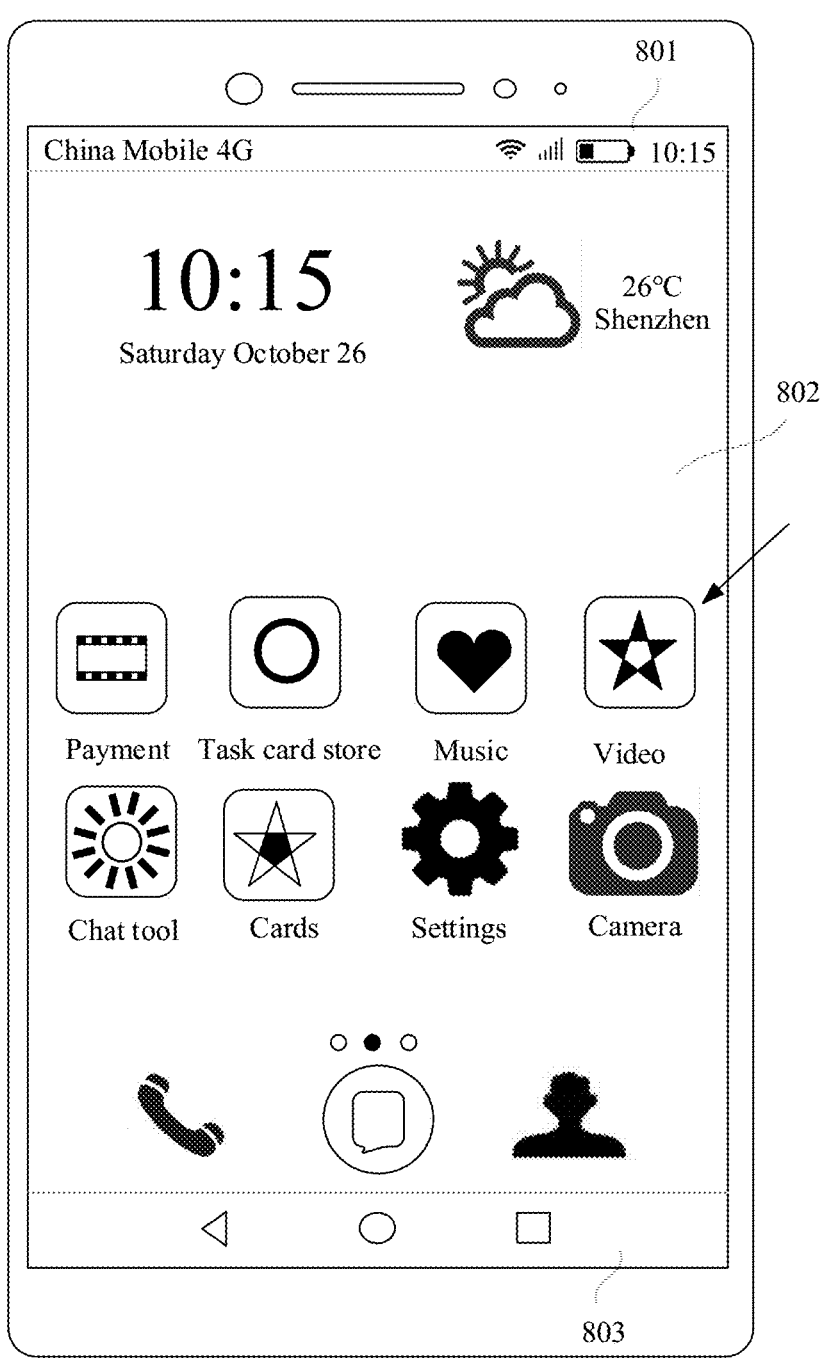
Figure 9D:
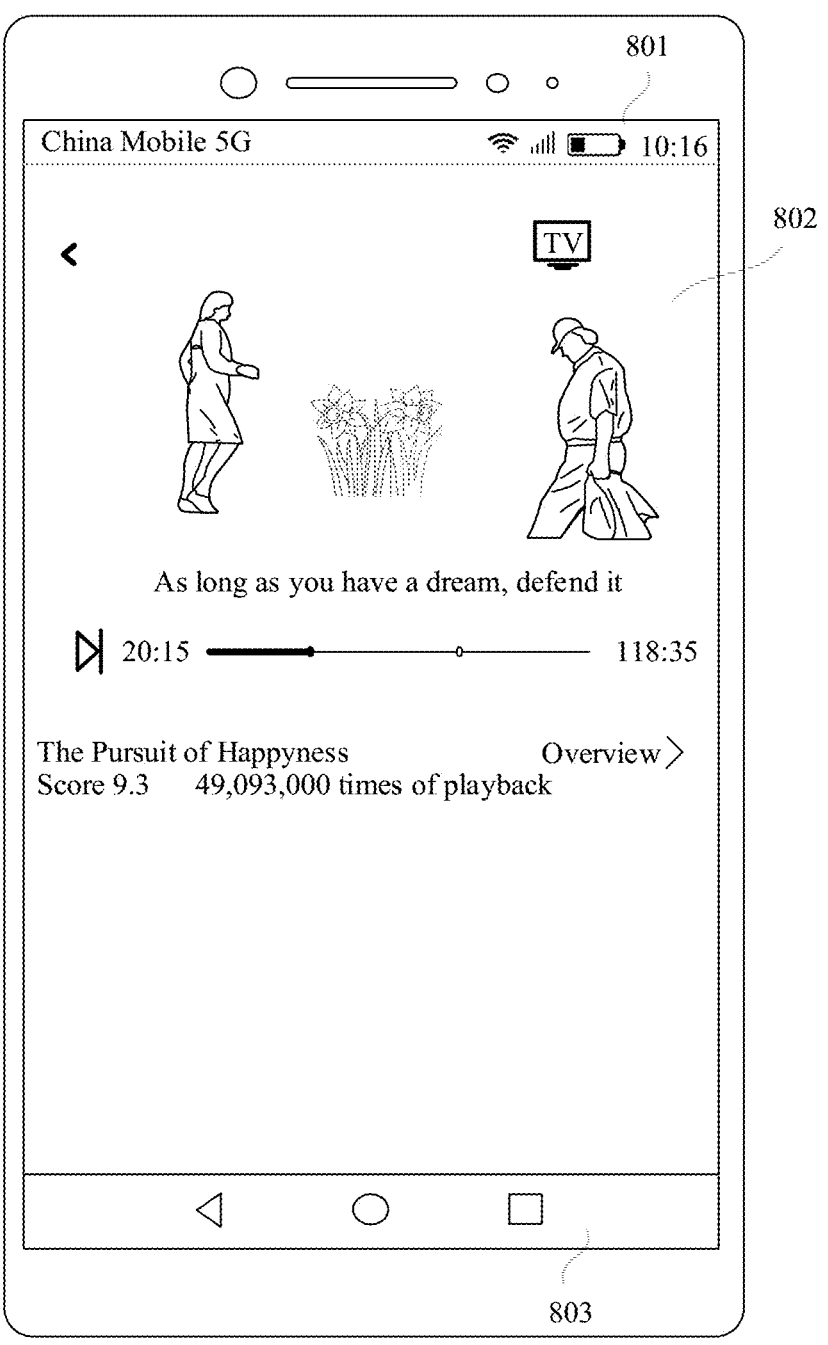

FIG. 9(a) to FIG. 9(d) are a schematic diagram of a possible scenario according to this application. FIG. 9(a) to FIG. 9(d) are a schematic diagram of a scenario in which a mobile network switches between 4G and 5G in a process in which a user operates a terminal device to load different services. As shown in FIG. 9(a), a screen display system of a mobile phone displays a possible display interface. The display interface includes an upper interface 801 located above the display interface, a main interface 802 located in a middle position of the display interface, and a lower interface 803 located below the display interface. For example, the upper interface 801 may display information such as an operator, a mobile network (4G or 5G) in which the mobile phone is currently located, a current wireless network status of the mobile phone, and a remaining battery level and time of the mobile phone. For example, the main interface 802 may display a plurality of third-party applications, such as a payment tool, a task card store, Video, Music, a chat tool, Cards, Settings, and Camera. The lower interface 803 may display various convenient operation buttons, for example, a back button, a home button, and a menu button. In the display interface in FIG. 9(a), the mobile network of the mobile phone displayed in the upper interface 801 is 5G, indicating that the mobile phone is in a dual connectivity state and uses an NR link and an LTE link for communication. In addition, the user prepares to start the chat tool, shown by the arrow in FIG. 9(a). The interface may be a display interface on which dual connectivity is implemented for the first time after the mobile phone is powered on, or may be a display interface on which dual connectivity is implemented in any state of the mobile phone. In FIG. 9(b), the user has started the chat tool, and the main interface 802 changes to an interface of the chat tool.

A service transmission rate for browsing the interface of the chat tool is relatively low, and the NR link may be disconnected. The mobile network displayed in the upper interface 801 changes to 4G, which means that the mobile phone uses the LTE link for communication. In FIG. 9(*c*), the user exits the chat tool and prepares to start Video, shown by the arrow. A current service transmission rate is relatively low, and the LTE link continues to be used for communication. The mobile network displayed in the upper interface 801 is still 4G. In FIG. 9(*d*), the user starts Video, the main interface 802 displays a video image, a service transmission rate is relatively high, the NR link is restored, and the mobile network displayed in the upper interface 801 changes to 5G.

In a possible design, only after receiving information indicating that duration for which the user starts an application exceeds a specific time threshold, the terminal device determines, based on a current transmission rate, whether to disable the NR link or enable the NR link.

Figure 10A:
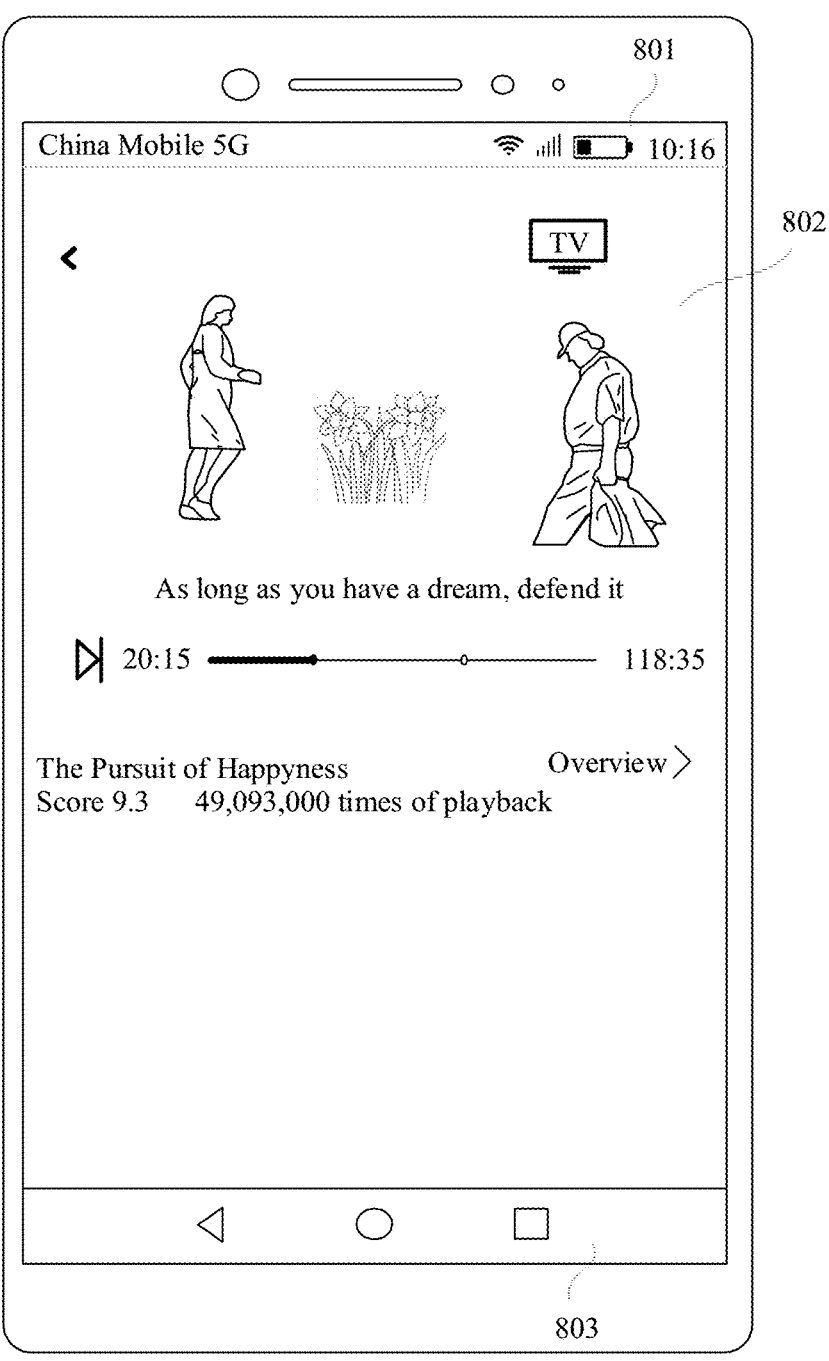
Figure 10B:
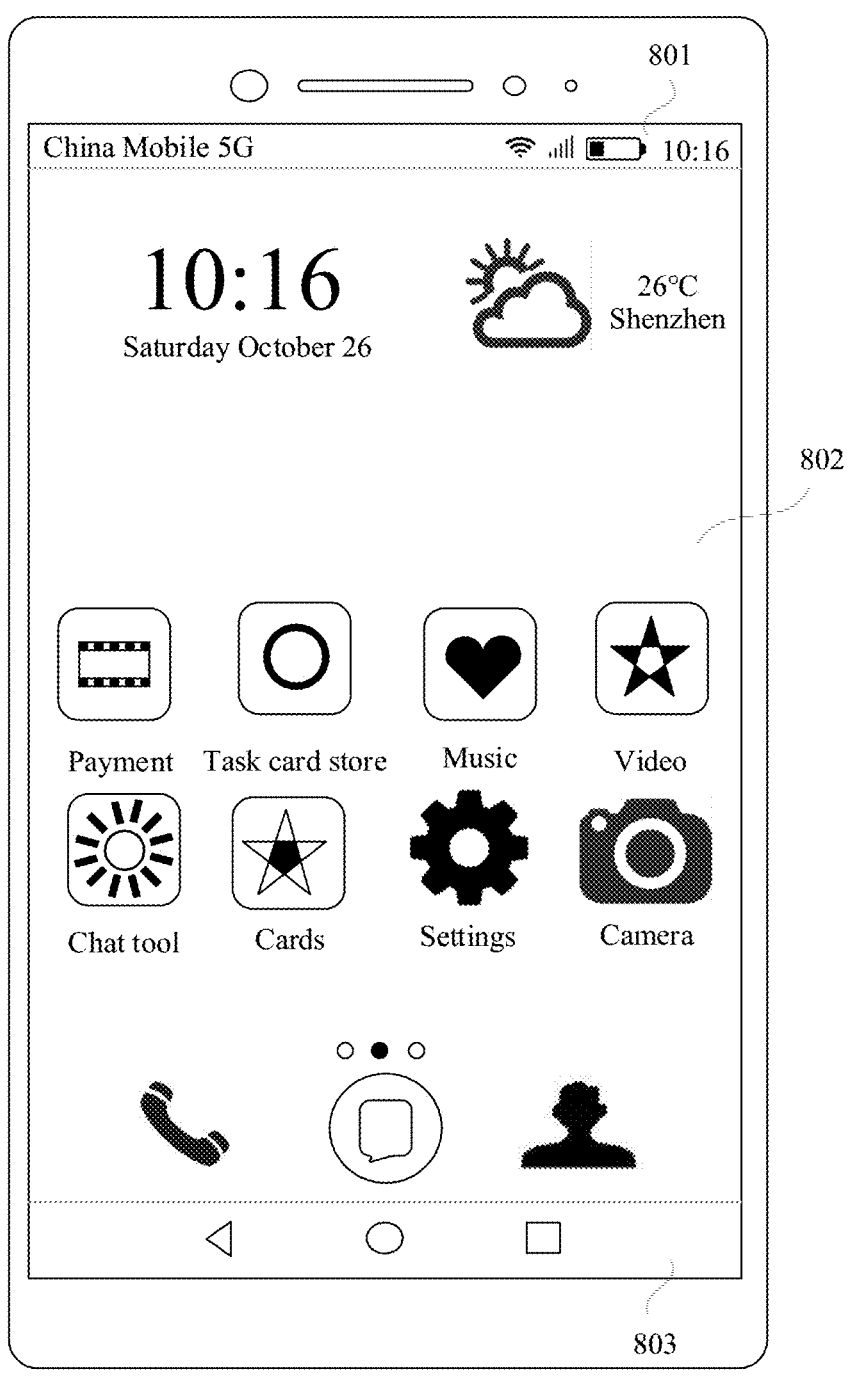
Figure 10C:
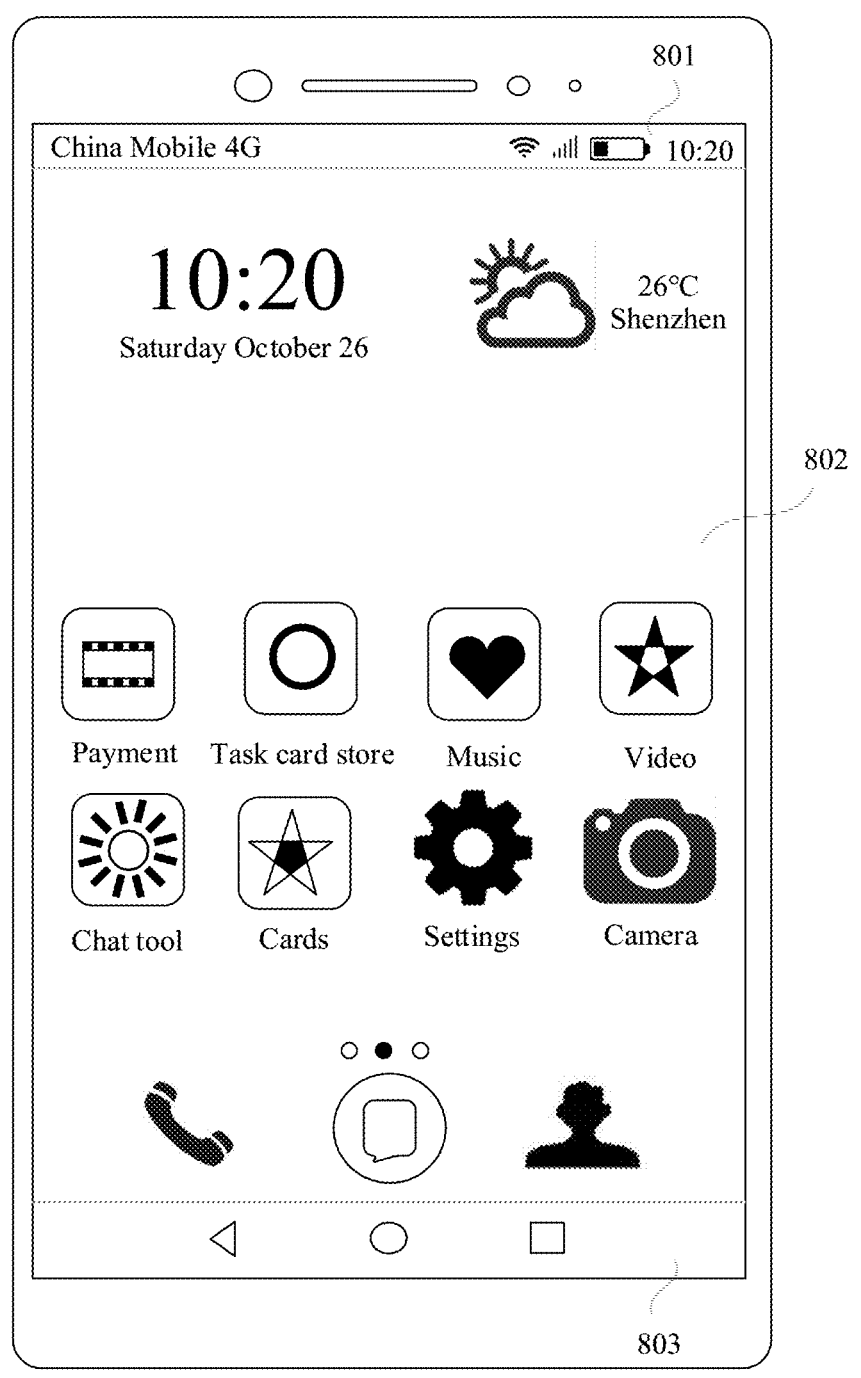
Figure 11A:
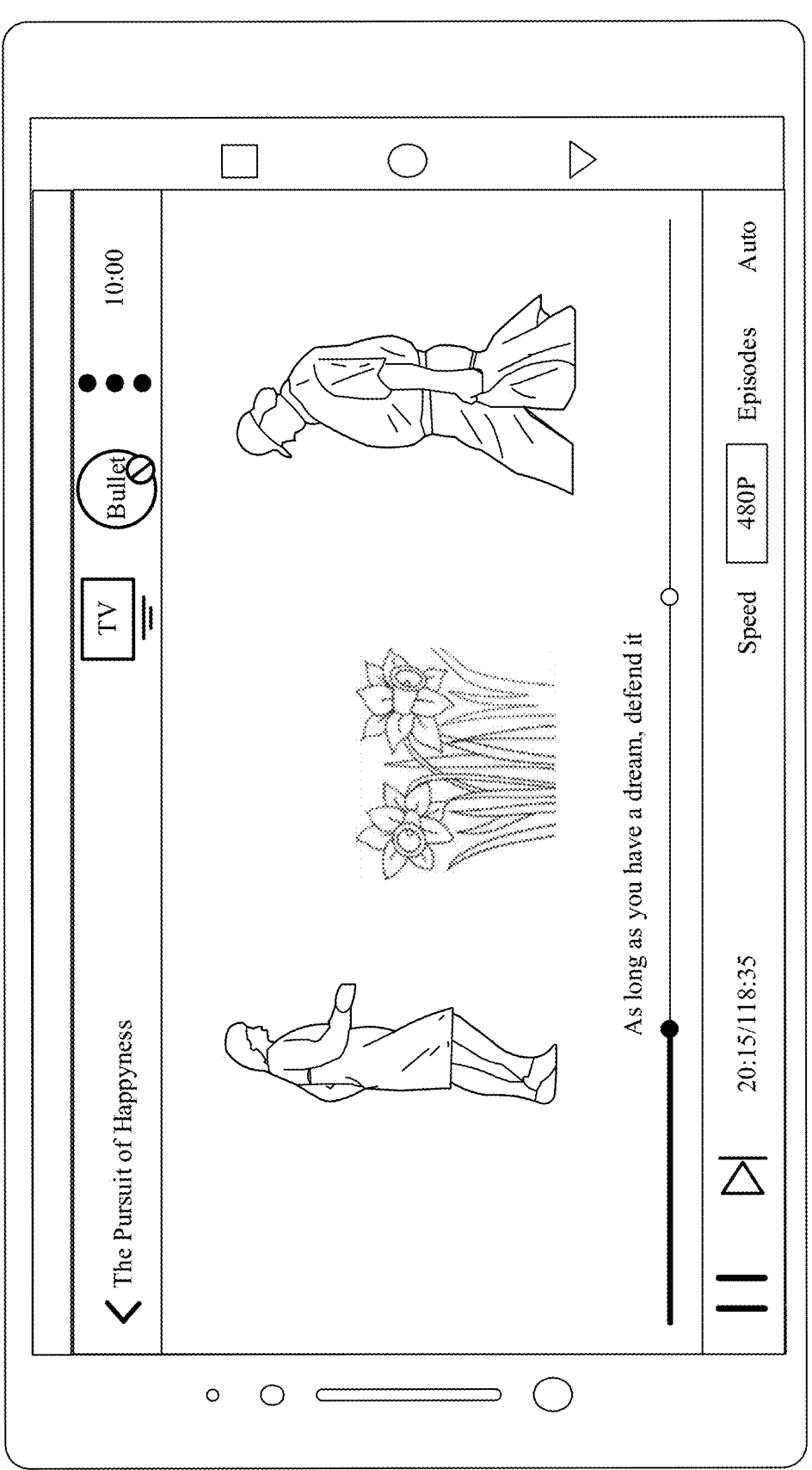
Figure 11B:
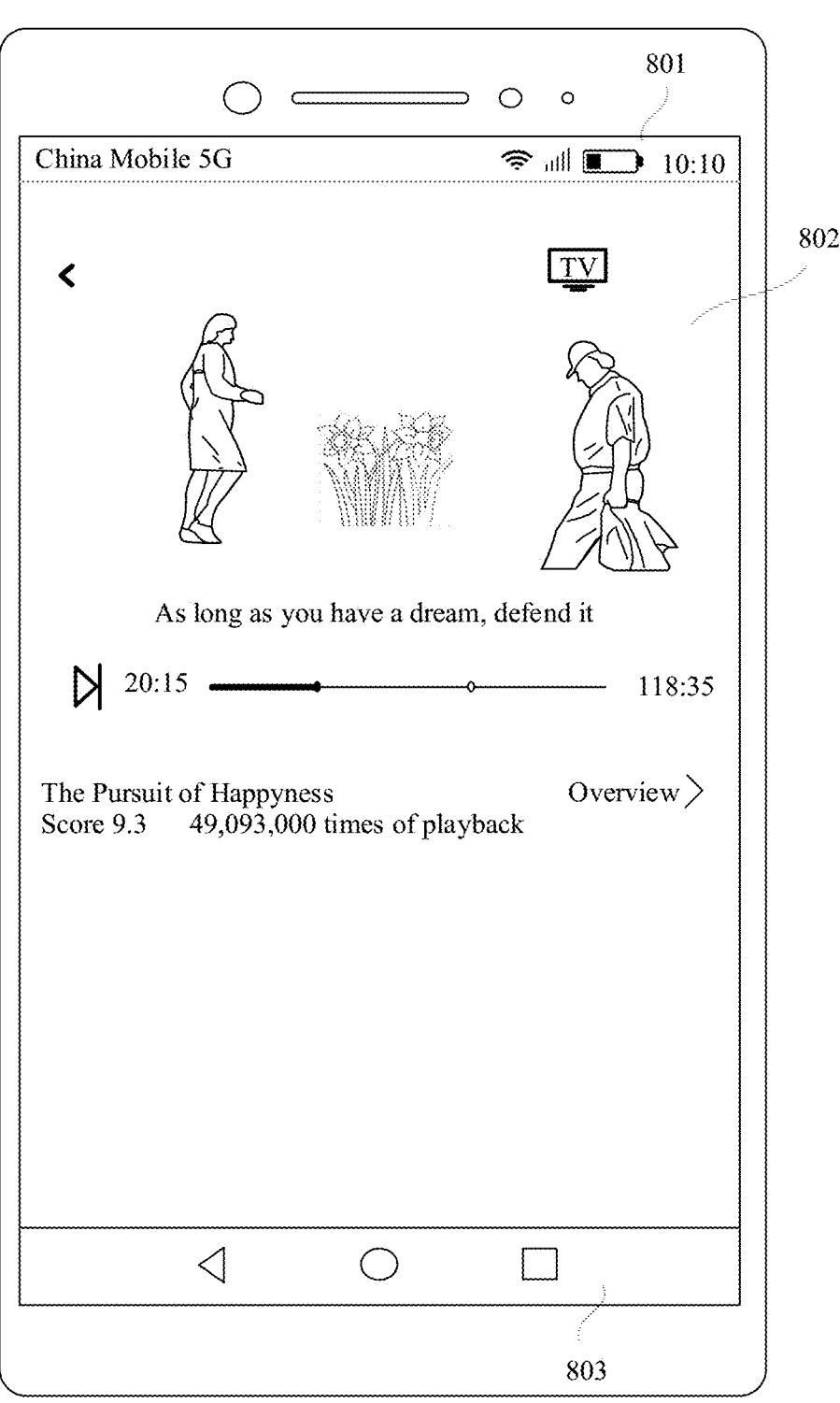
Figure 11C:
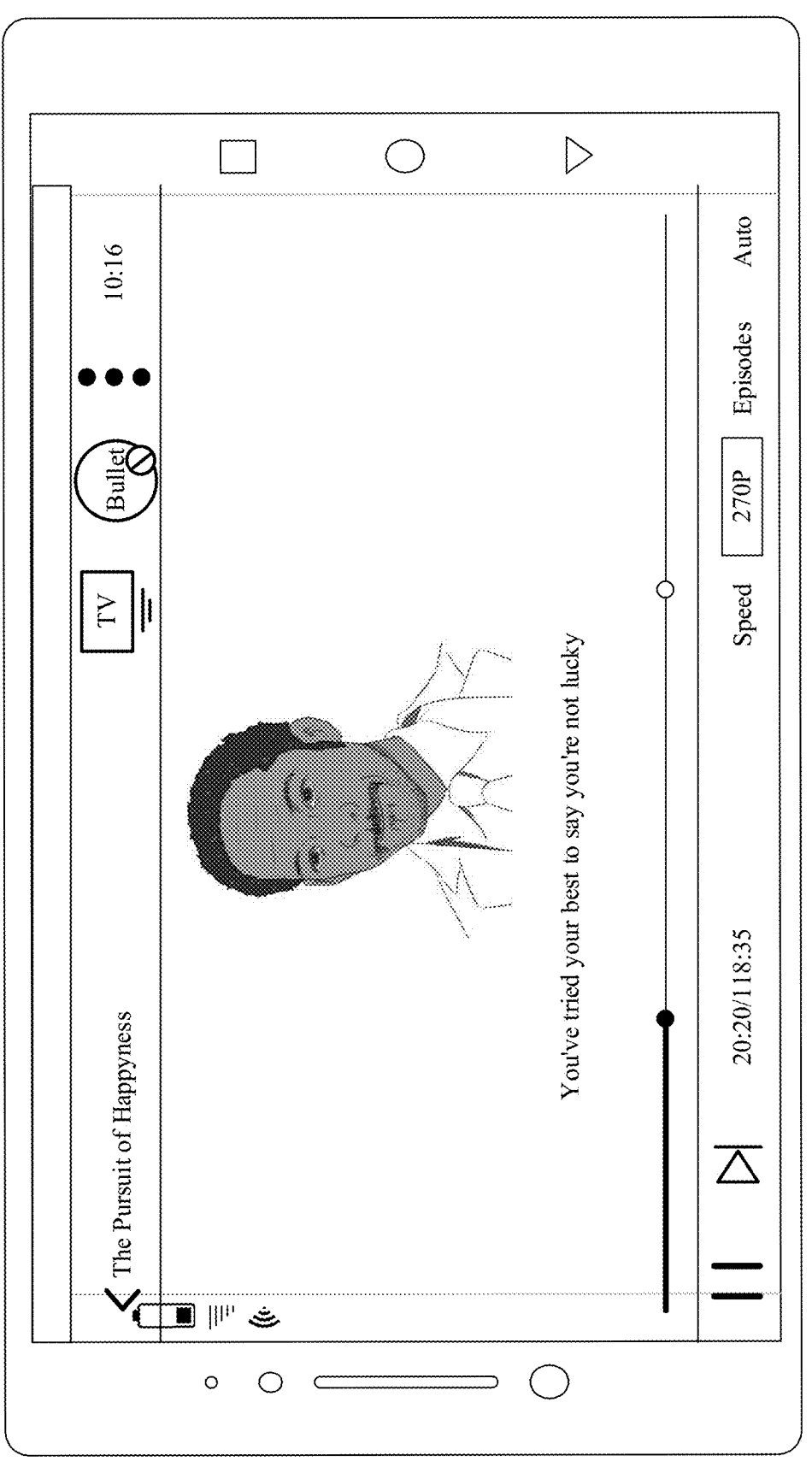
Figure 11D:
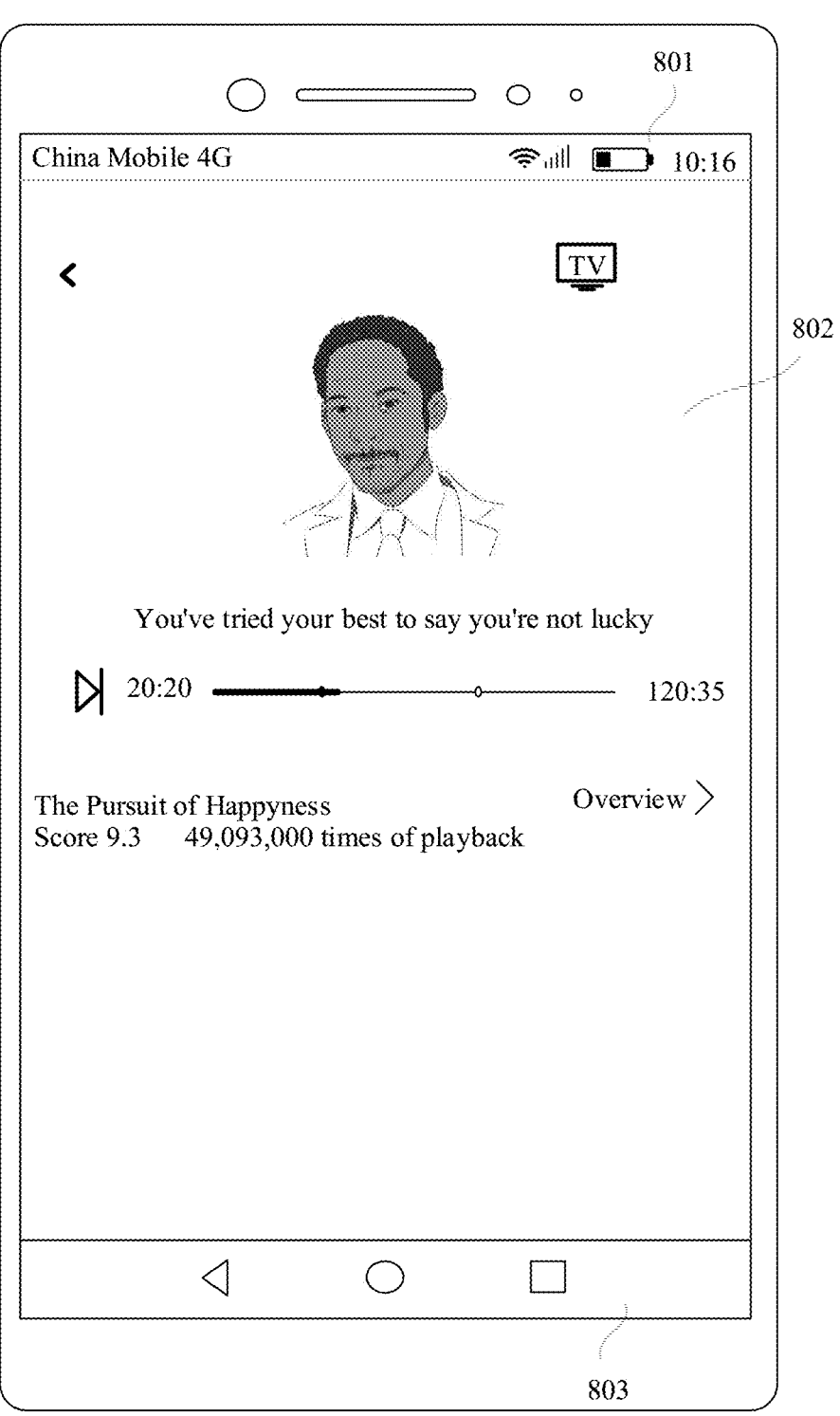
Figure 12A:
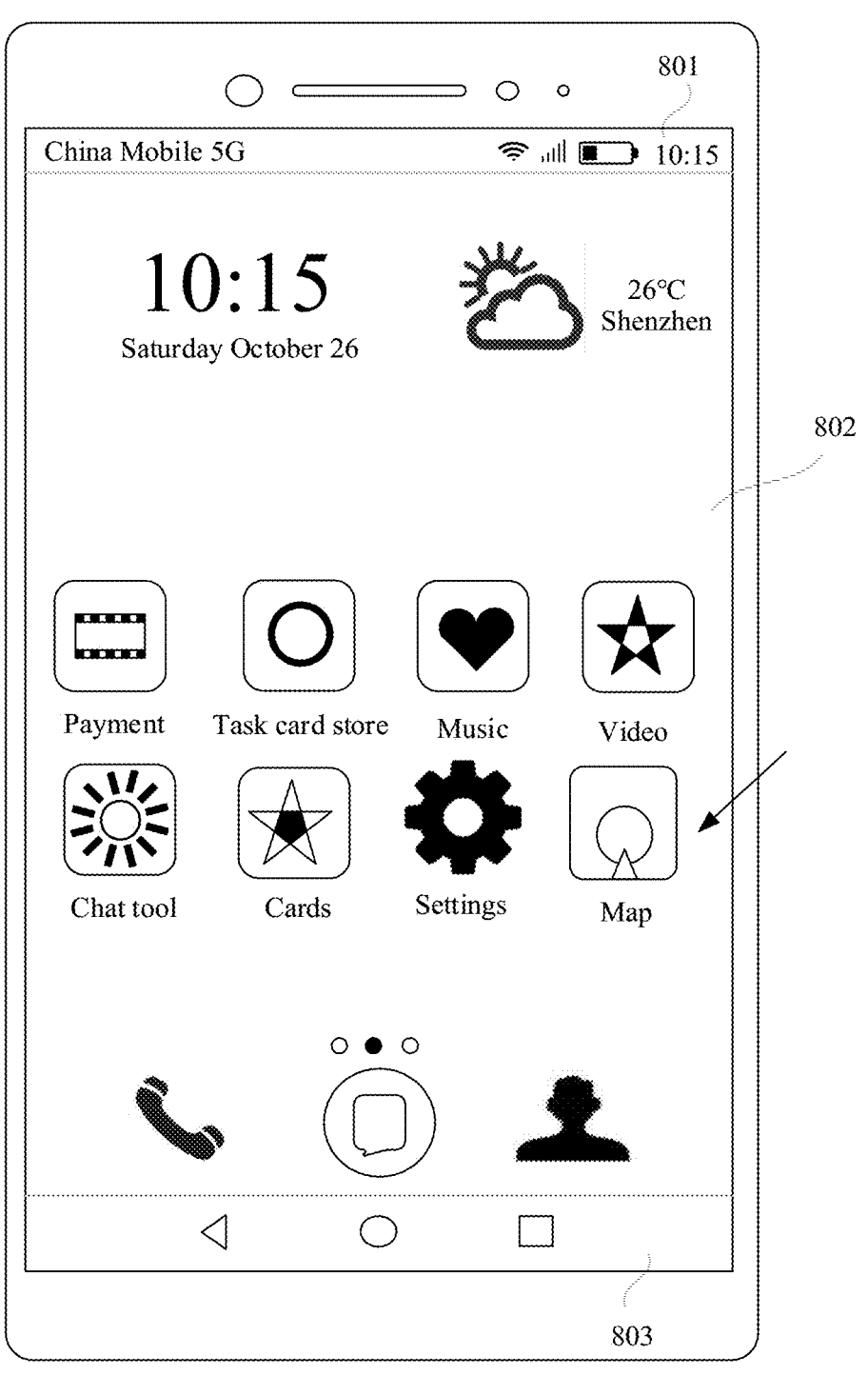
Figure 12B:
Figure 12C:
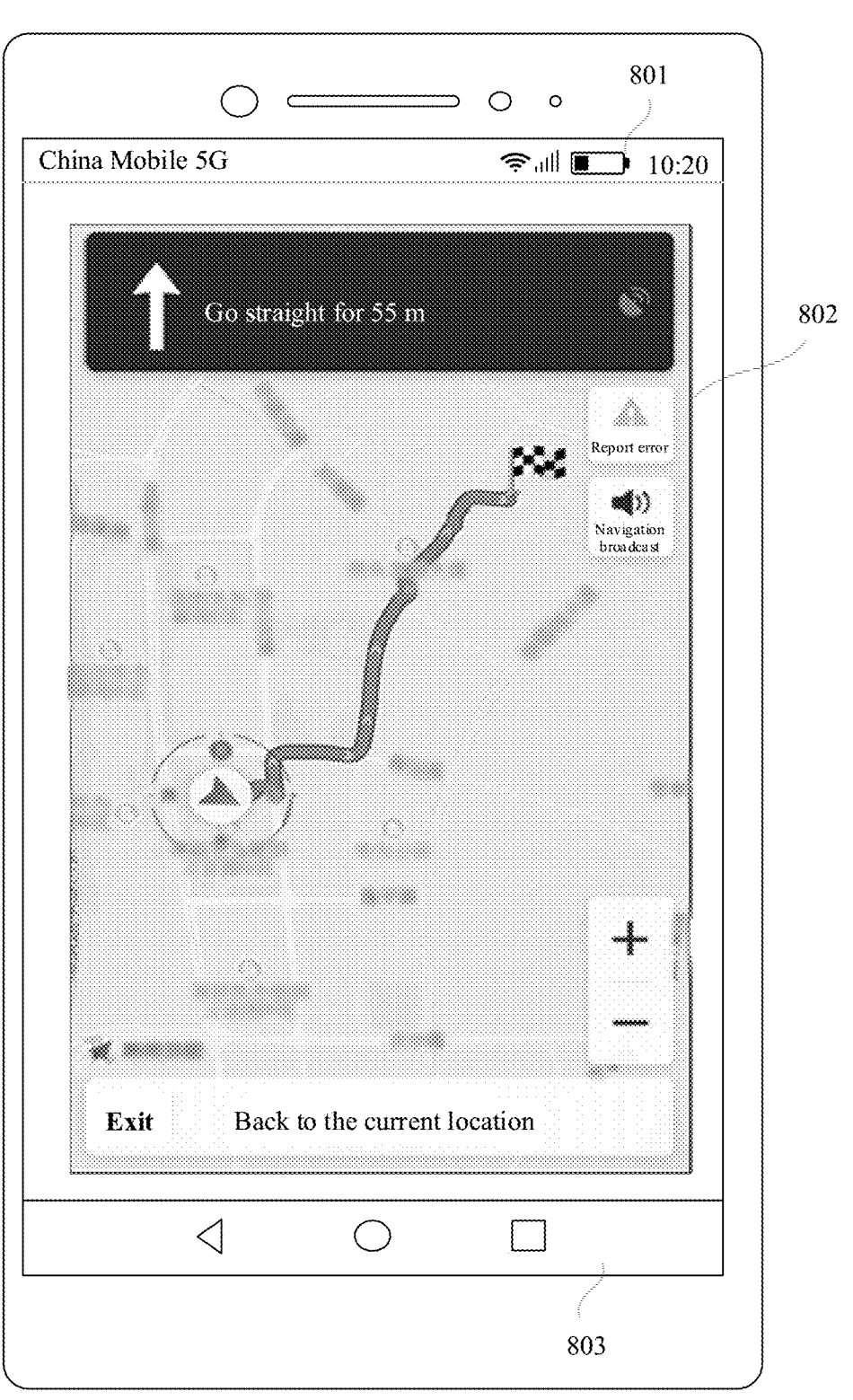
Figure 12D:
Figure 13A:
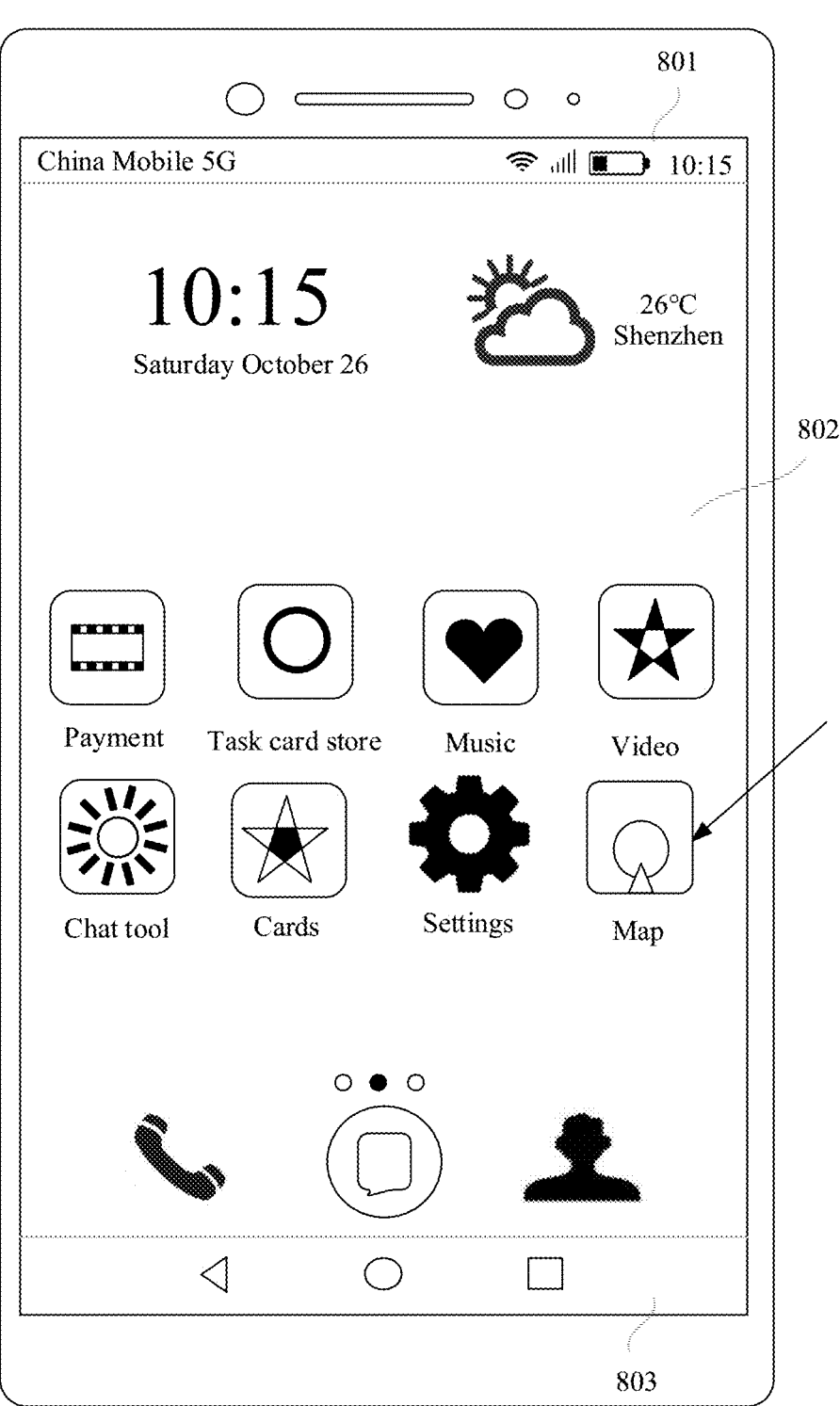
Figure 13B:
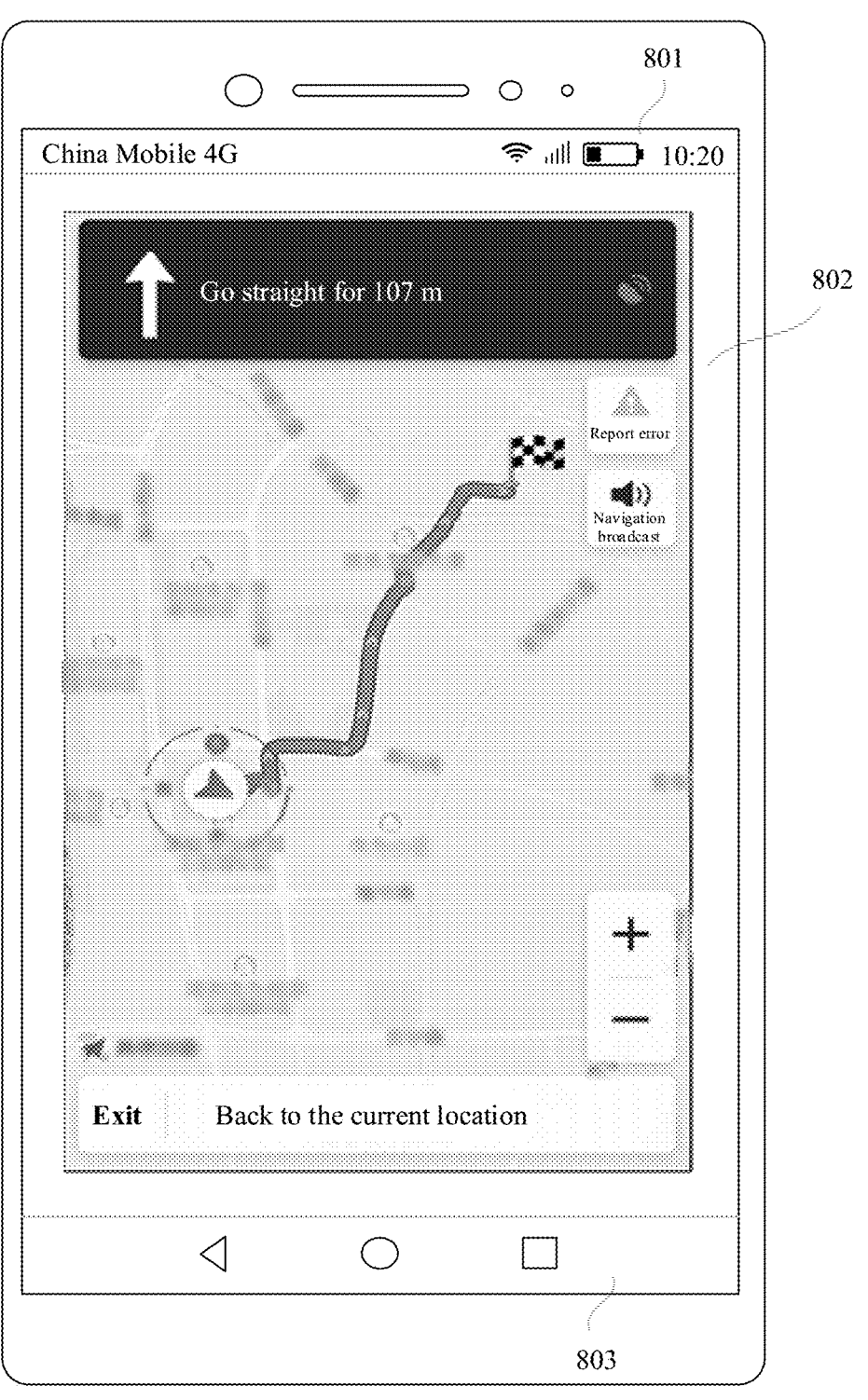
Figure 13C:
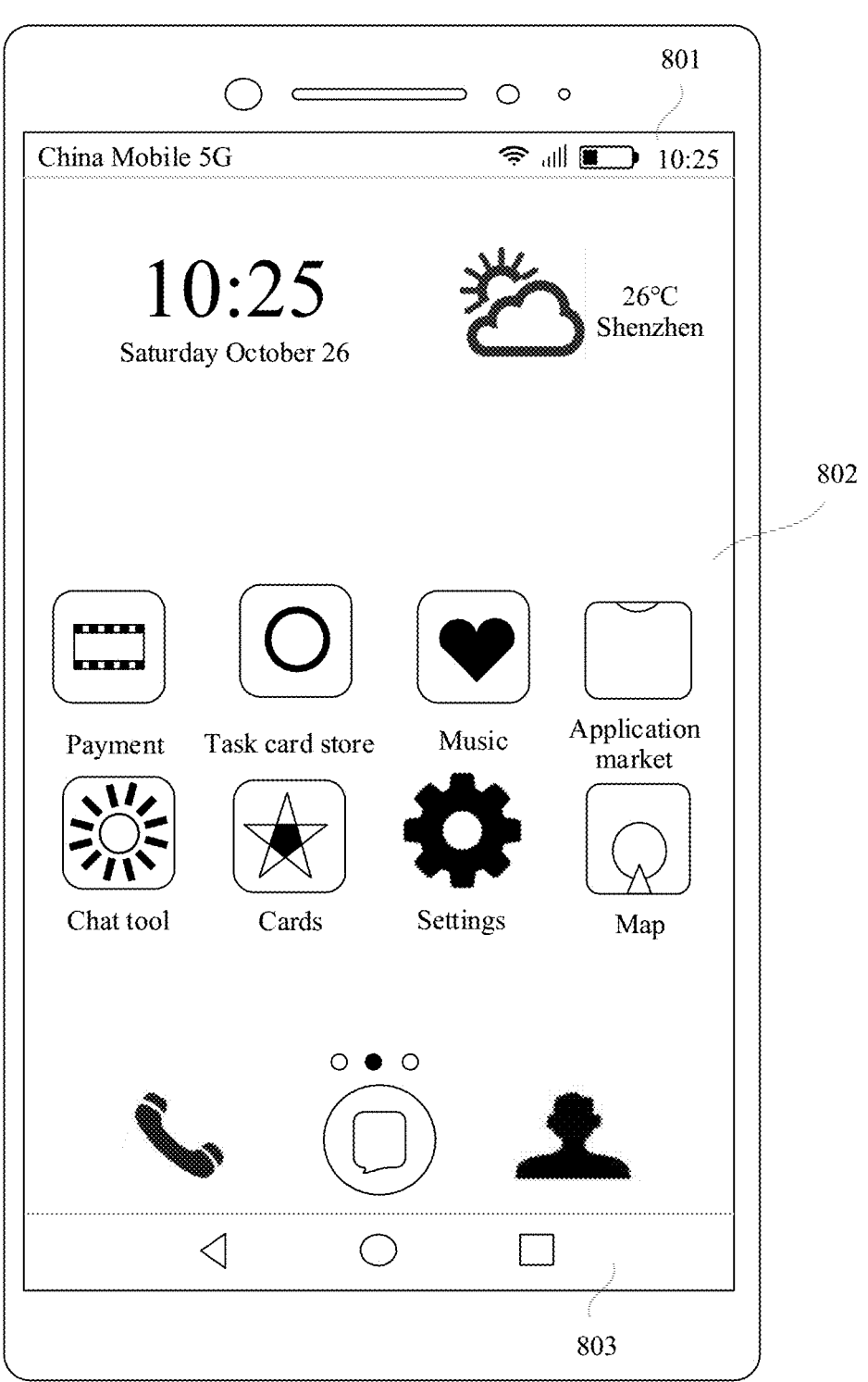
Figure 13D:
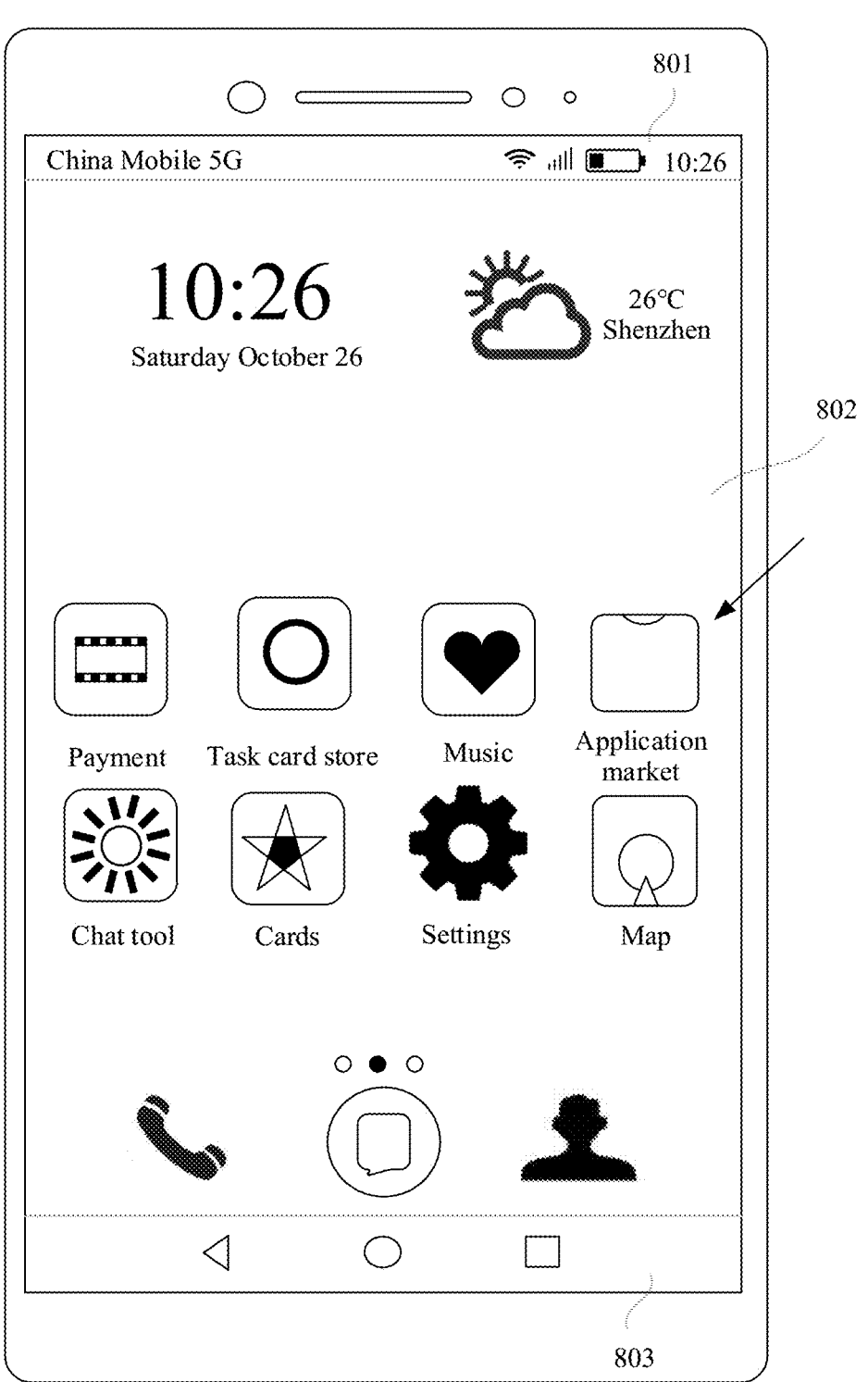
Figure 13E:
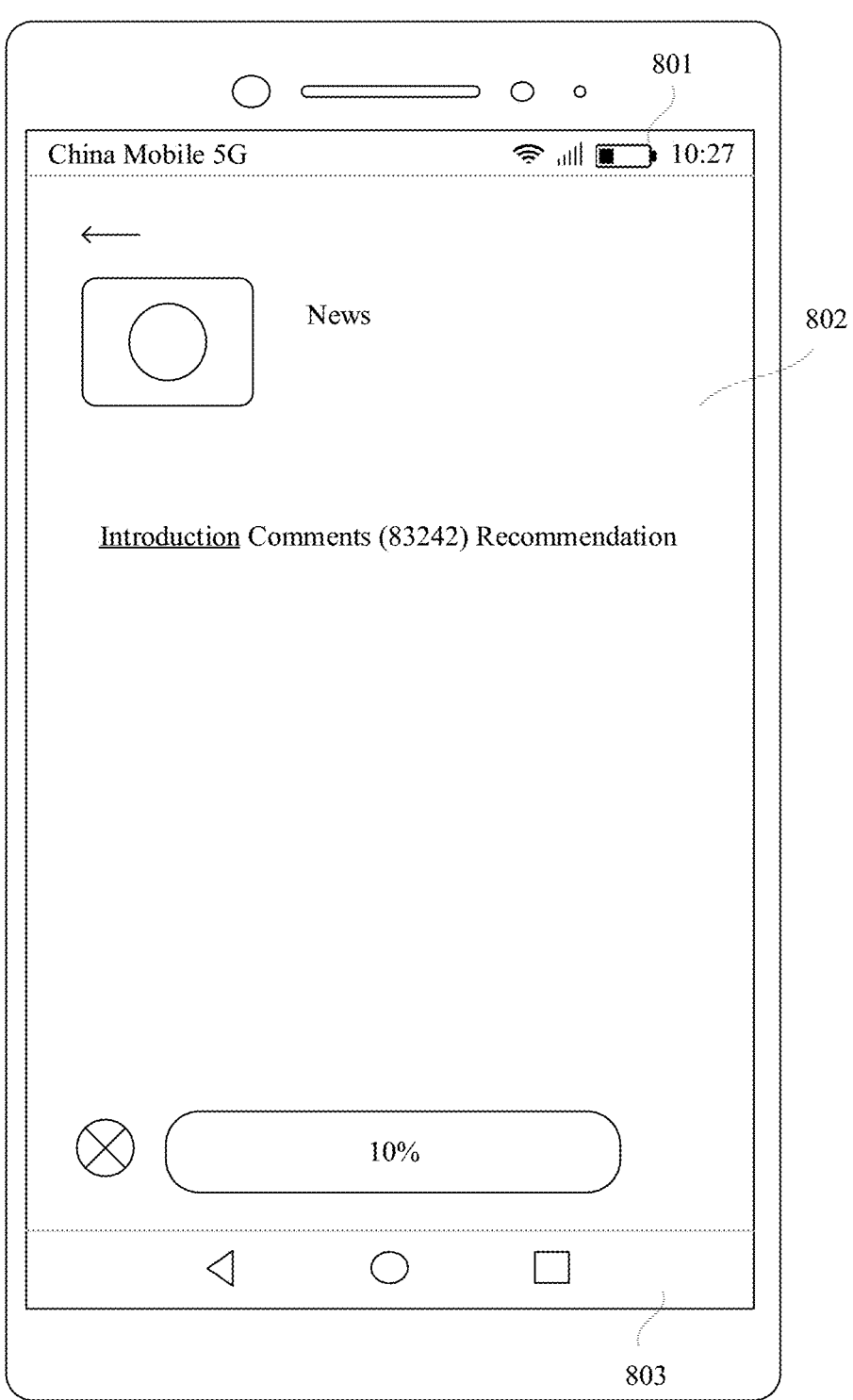

It should be noted that, when the mobile phone interacts with an access network device to disconnect or restore the NR link, it may take time to disconnect or restore the NR link. Although a service transmission rate of the mobile phone is relatively low within the time period, a previous NR network may still be displayed, or although the service transmission rate of the mobile phone is relatively high within the time period, a previous LTE network may still be displayed. An example in which the NR link is disconnected is used. Refer to FIG. 10(*a*) to FIG. 10(*c*). In FIG. 10(*a*), the mobile phone loads a video, the service transmission rate is relatively high, and the mobile network displayed in the upper interface 801 is 5G. In FIG. 10(*b*), the user exits the video, and the service transmission rate is relatively low. However, because time is very short, and the NR link is not disconnected, the mobile network displayed in the upper interface 801 is still 5G. In FIG. 10(*c*), time is sufficient, and the NR link has been disconnected. Therefore, the mobile network displayed in the upper interface 801 changes to 4G.

FIG. 11(*a*) to FIG. 11(*d*) are a schematic diagram of another possible scenario according to this application, and may correspond to the embodiment of the method 300. FIG. 11(*a*) to FIG. 11(*d*) are a schematic diagram of a scenario in which a mobile network switches between 4G and 5G in a process in which a user operates a terminal device to load different services. In FIG. 11(*a*) and FIG. 11(*b*), FIG. 11(*b*) is a minimized interface of FIG. 11(*a*). The user opens a video and watches a high-definition video (as shown in FIG. 11(*a*)), a service transmission rate is relatively high, and a mobile network displayed in the upper interface 801 is 5G. In FIG. 11(*c*) and FIG. 11(*d*), FIG. 11(*d*) is a minimized interface of FIG. 11(*c*). The user switches from the high-definition video to a standard-definition video (as shown in FIG. 11(*c*)), the service transmission rate is relatively low, and the mobile network displayed in the upper interface 801 is 4G.

FIG. 12(*a*) to FIG. 12(*d*) are a schematic diagram of another possible scenario according to this application, and may correspond to the embodiment of the method 300. FIG. 12(*a*) to FIG. 12(*d*) are a schematic diagram of a scenario in which a mobile network switches between 4G and 5G in a process in which a user operates a same service under different signal strength. In FIG. 12(*a*), a mobile network displayed in the upper interface 801 is 5G, indicating that a mobile phone is in a dual connectivity state and uses an NR link and an LTE link for communication, and signal strength displayed in the upper interface 801 is relatively good. In addition, the user prepares to open Map, shown by the arrow in FIG. 12(*a*). In FIG. 12(*b*), the user has opened the Map and displays map content, a service transmission rate is relatively low, the NR link is disconnected, the mobile network displayed in the upper interface 801 changes to 4G, and the signal strength displayed in the upper interface 801 is relatively good. In FIG. 12(*c*), the signal strength displayed in the upper interface 801 becomes very poor. Based on this, both a first switch threshold and a second switch threshold that are obtained by the mobile phone through calculation decrease. For a same navigation service, it may be understood that when a signal is weak, an NR network is needed to increase a speed. Therefore, the NR link may be restored to meet user experience requirement, and the mobile network displayed in the upper interface 801 changes to 5G. In FIG. 12(*d*), the signal strength displayed in the upper interface 801 becomes better. Based on this, the first switch threshold and the second switch threshold that are obtained by the mobile phone through calculation increase. For the same navigation service, it may be understood that when the signal is relatively good, an LTE network totally meets a requirement, an NR link may be disconnected, and the mobile network displayed in the upper interface 801 changes to 4G.

FIG. 13(*a*) to FIG. 13(*e*) are a schematic diagram of another possible scenario according to this application, and may correspond to the embodiment of the method 400. FIG. 13(*a*) to FIG. 13(*e*) are a schematic diagram of a scenario in which a mobile network switches between 4G and 5G in a process in which a user uses a preset application and exits the application. For example, Map is the preset application, and an application market is a non-preset application. In FIG. 13(*a*), a mobile network displayed in the upper interface 801 is 5G, indicating that a mobile phone is in a dual connectivity state and uses an NR link and an LTE link for communication. In addition, the user prepares to open the Map, shown by the arrow in FIG. 13(*a*). In FIG. 13(*b*), the user starts to use the Map for navigation, and Map is the preset application. The terminal device monitors a service transmission rate of the Map. The service transmission rate is relatively low, and the mobile network displayed in the upper interface 801 changes to 4G. In FIG. 13(*c*), the user exits the Map, the NR link may be restored, and the mobile network displayed in the upper interface 801 changes to 5G. In FIG. 13(*d*), the user prepares to open the application market, shown by the arrow, to download an application. The mobile network displayed in the upper interface 801 is still 5G, and the mobile phone does not need to monitor the service transmission rate. In FIG. 13(*e*), the user downloads Tencent News. Because the mobile phone does not monitor the service transmission rate and does not need to process the NR link, the mobile network displayed in the upper interface 801 is still 5G.

Figure 14A:
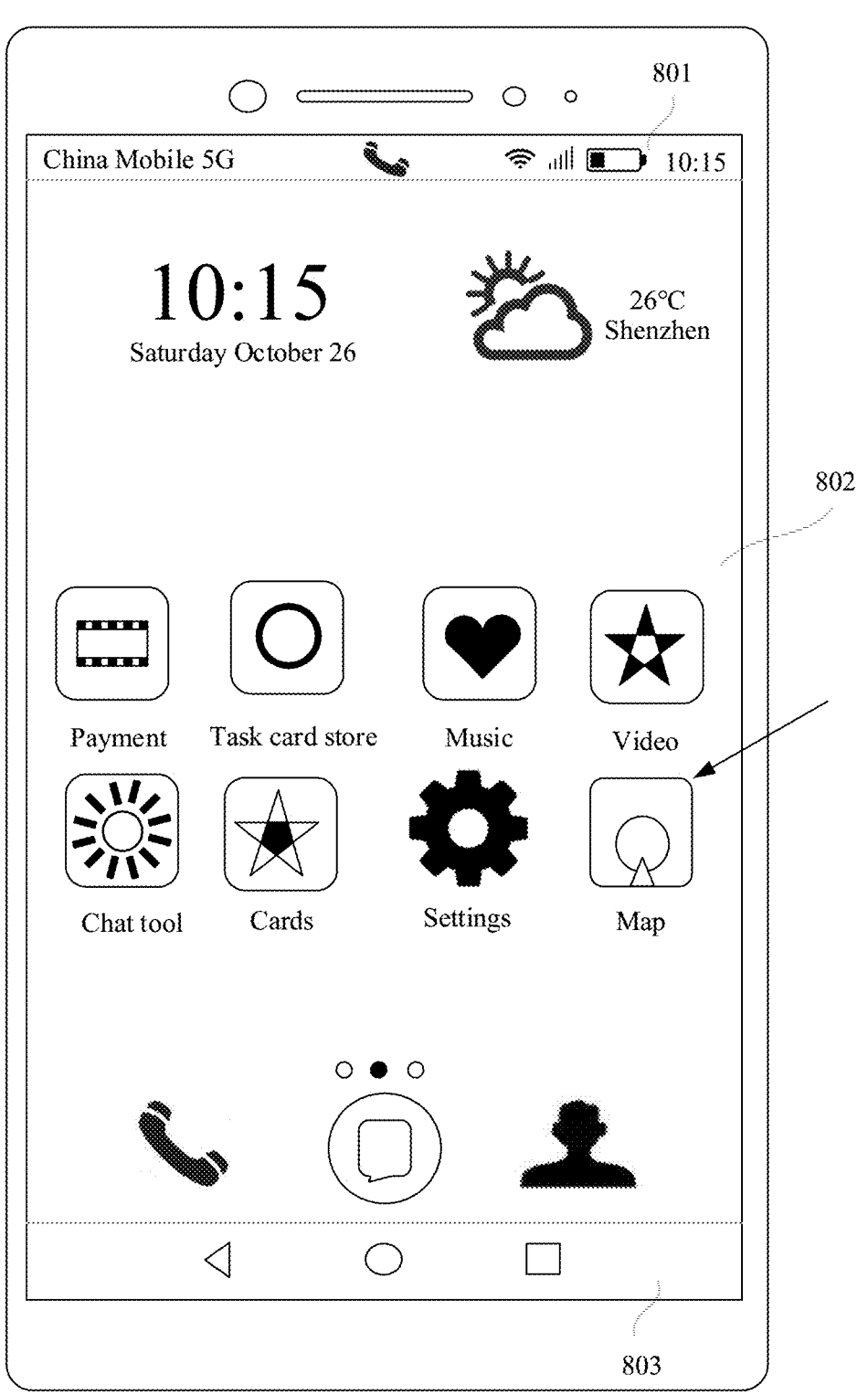
Figure 14B:
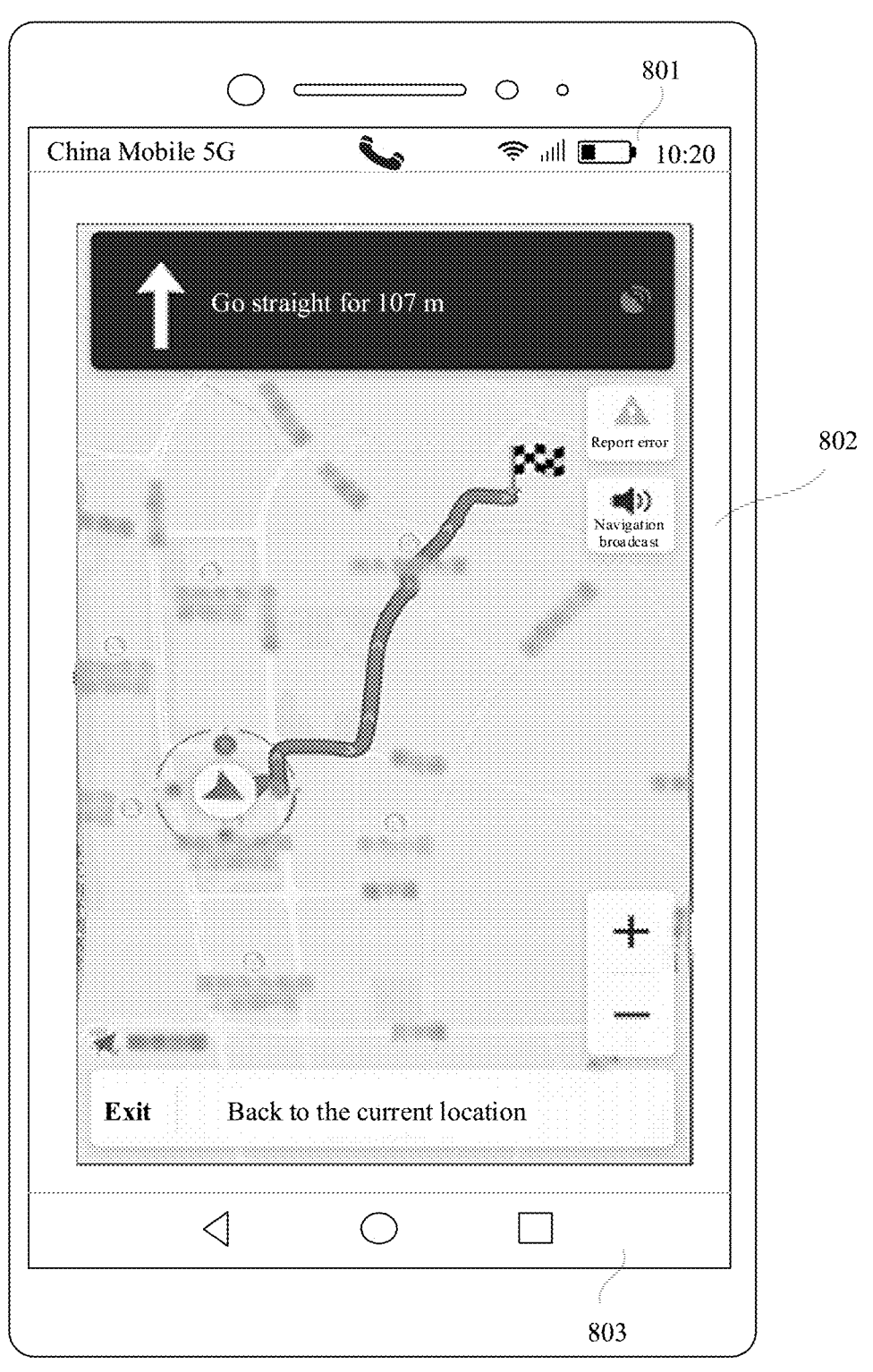

FIG. 14(*a*) and FIG. 14(*b*) are a schematic diagram of another possible scenario according to this application, may correspond to the embodiment of the method 400, and may be compared with FIG. 13(*b*). FIG. 14(*a*) and FIG. 14(*b*) are a schematic diagram of a scenario of a state of a mobile network when a user uses a preset application and a mobile phone is in a call mode. For example, Map is the preset application. In FIG. 14(*a*), the mobile network displayed in the upper interface 801 is 5G, indicating that the mobile phone is in a dual connectivity state and uses an NR link and an LTE link for communication. The upper interface 801 displays information indicating that the mobile phone is in the call mode, and the user prepares to open the Map for navigation, shown by the arrow in FIG. 14(*a*). In FIG. 14(*b*), the user starts to use the Map for navigation. Although the Map is the preset application, the mobile phone is in the call mode, the mobile phone does not monitor a service transmission rate, and the mobile network displayed in the upper interface 801 is still 5G. This may be compared with FIG. 13(*b*). In FIG. 13(*b*), the mobile phone is not in the call mode, the service transmission rate is relatively low, and the mobile network changes to 4G.

Figure 15A:
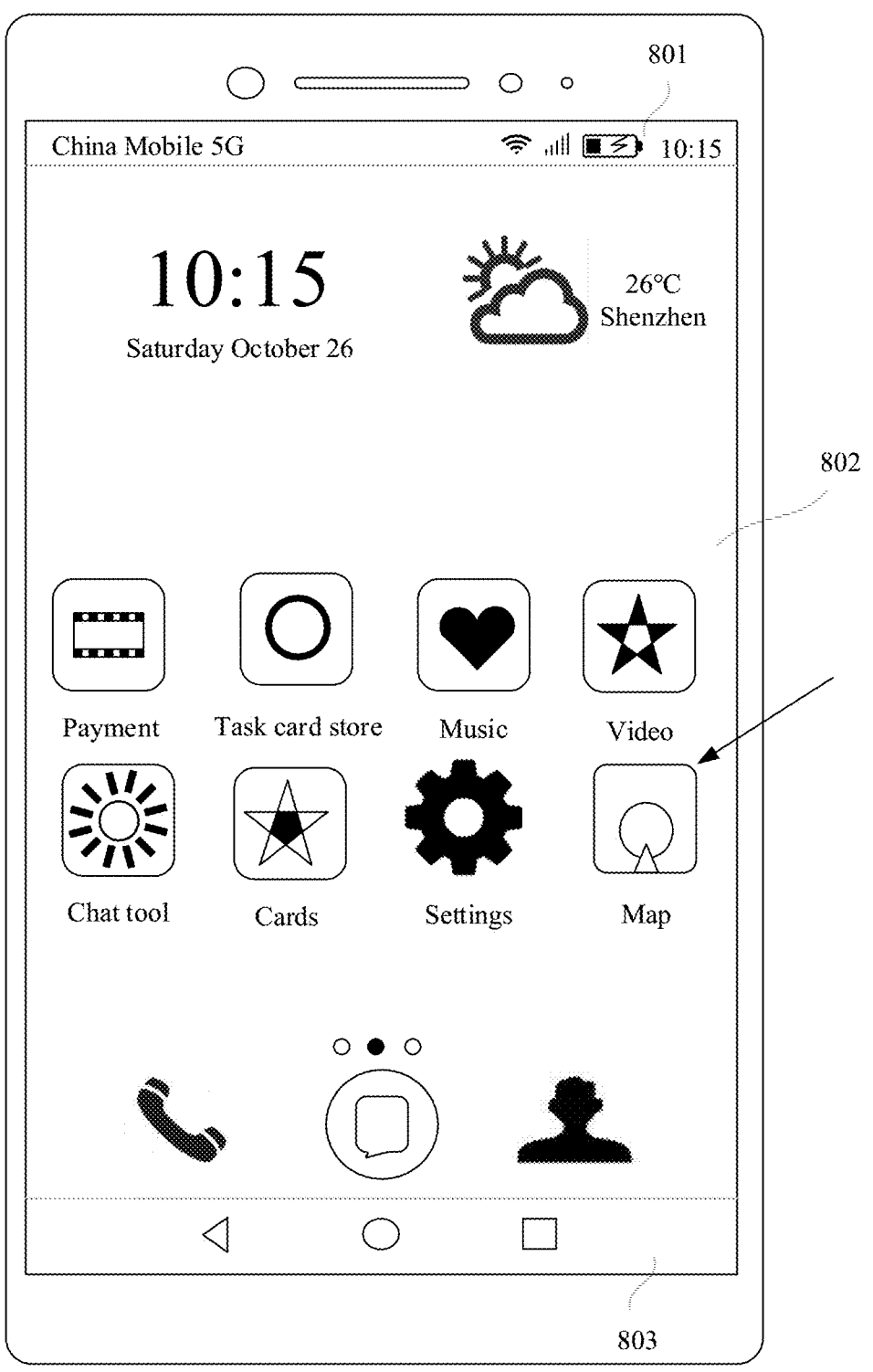
Figure 15B:
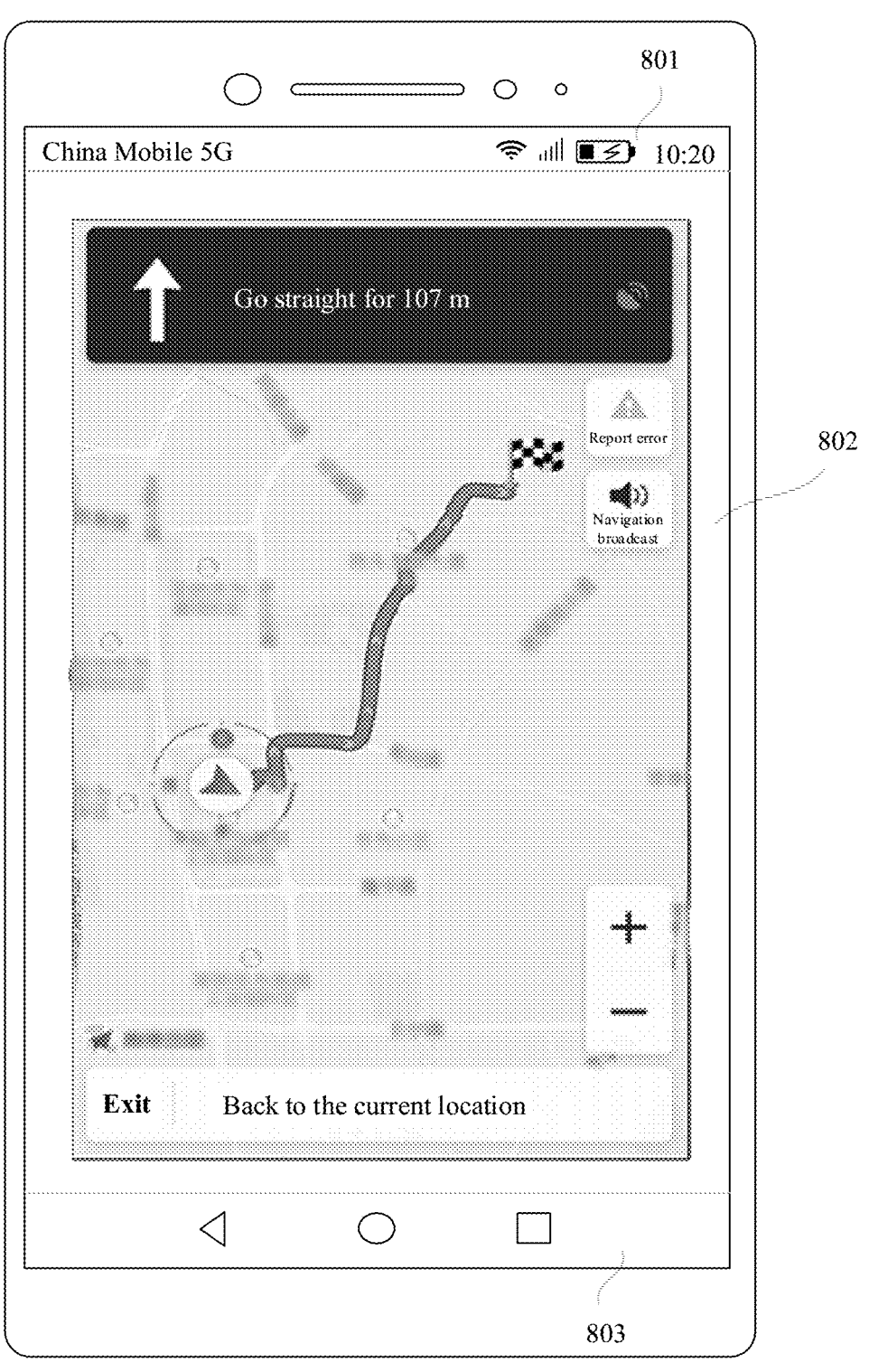
Figure 16A:
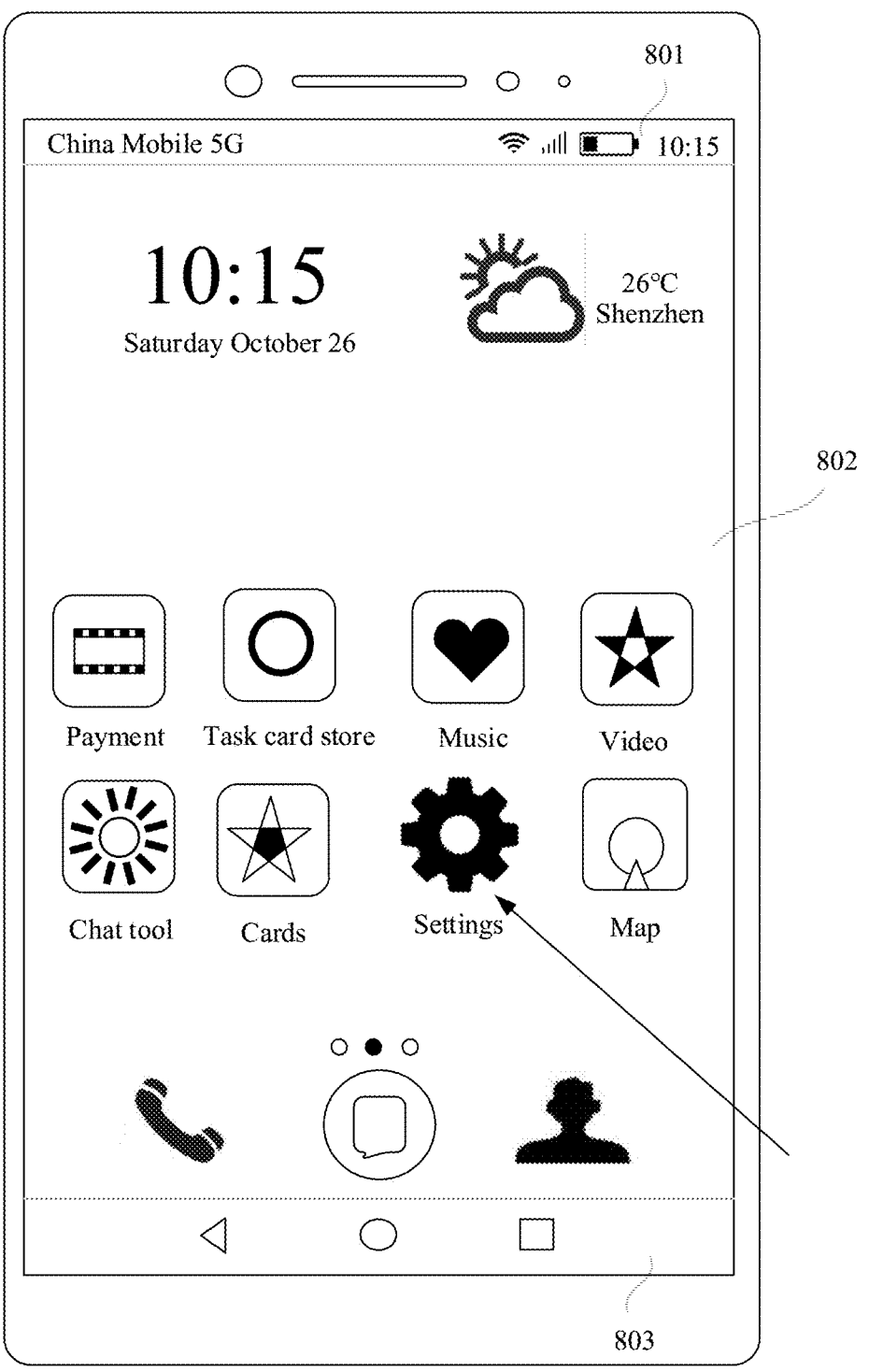
Figure 16B:
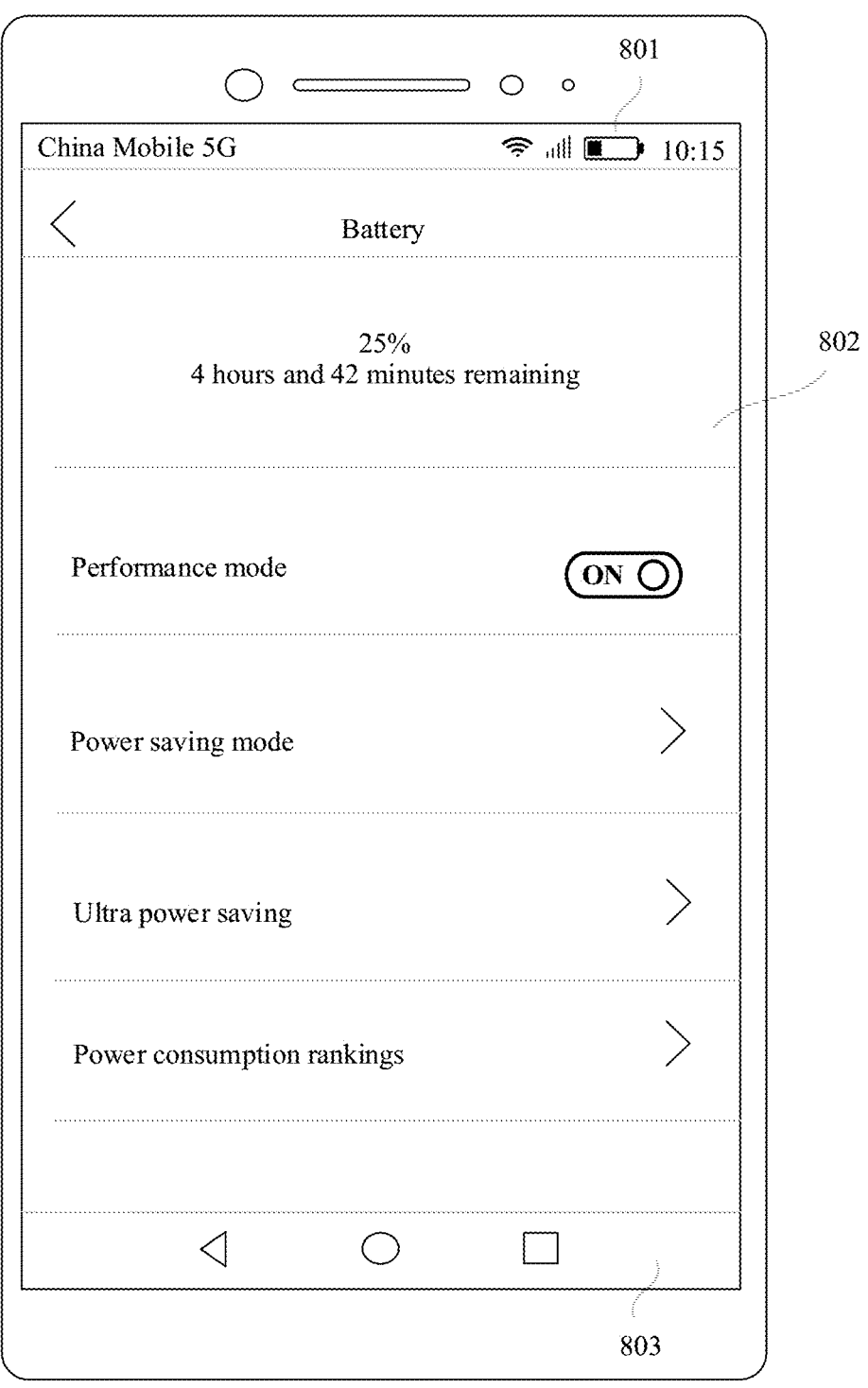
Figure 16C:
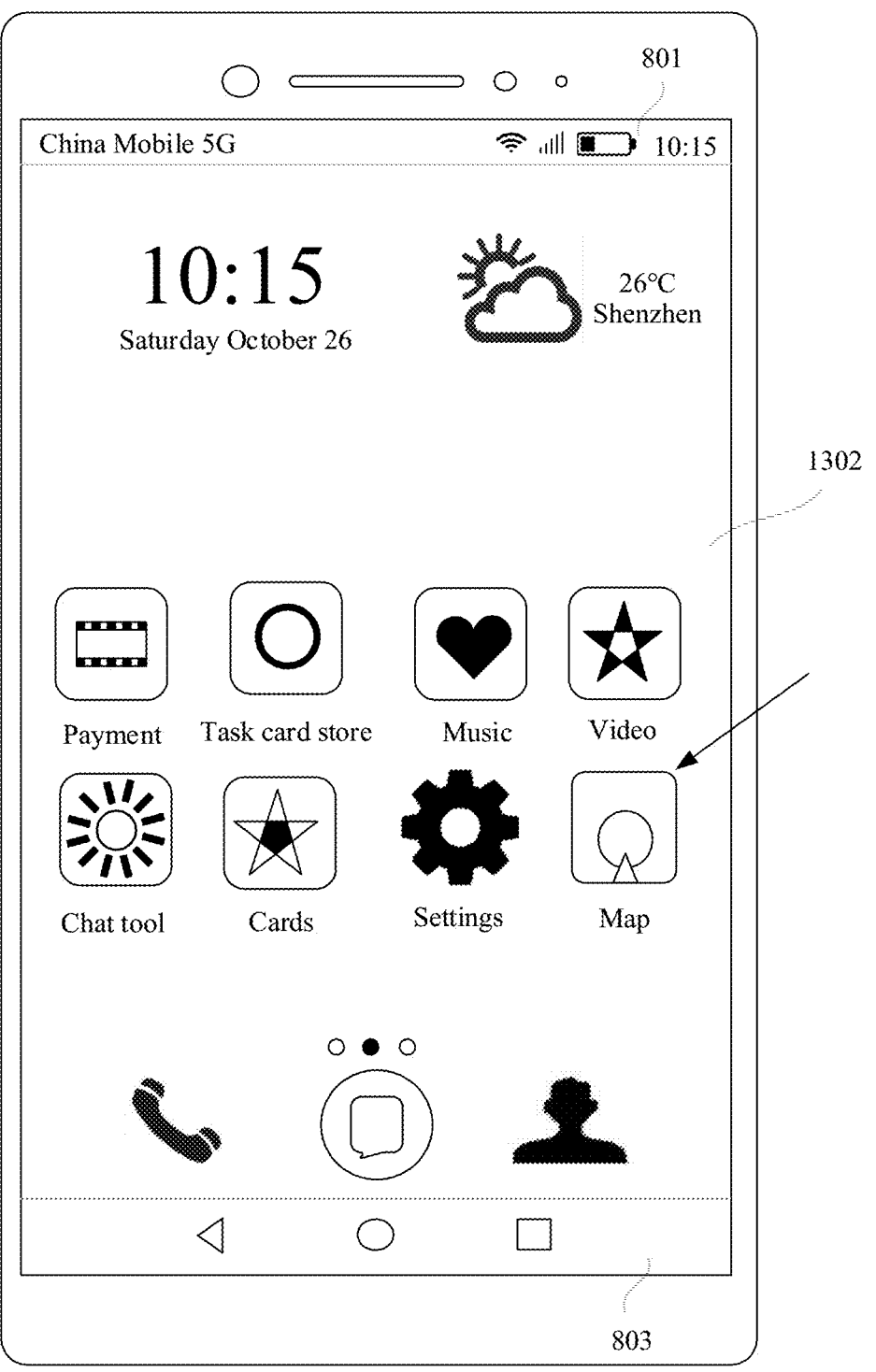
Figure 16D:
Figure 17A:
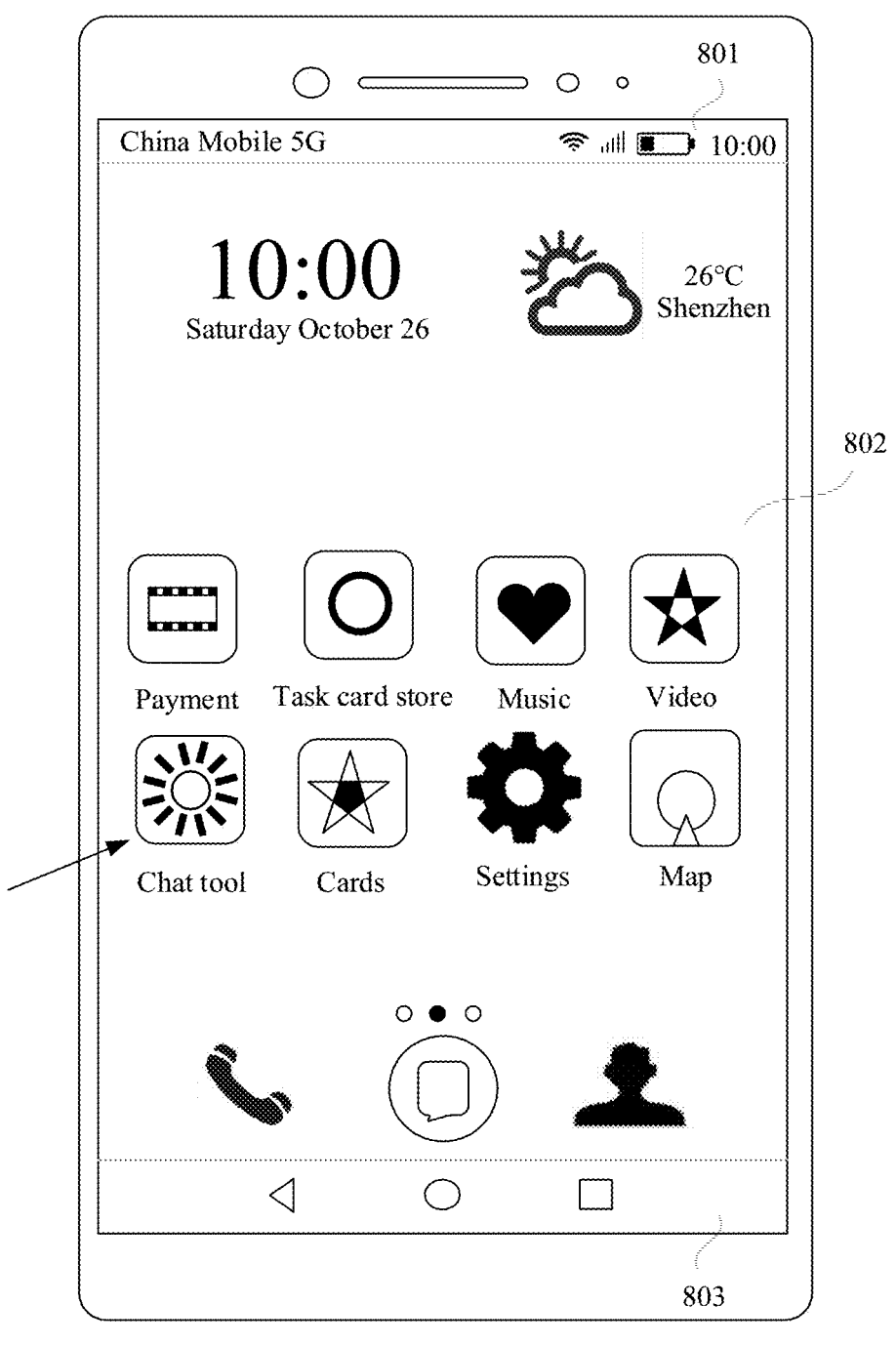
Figure 17B:
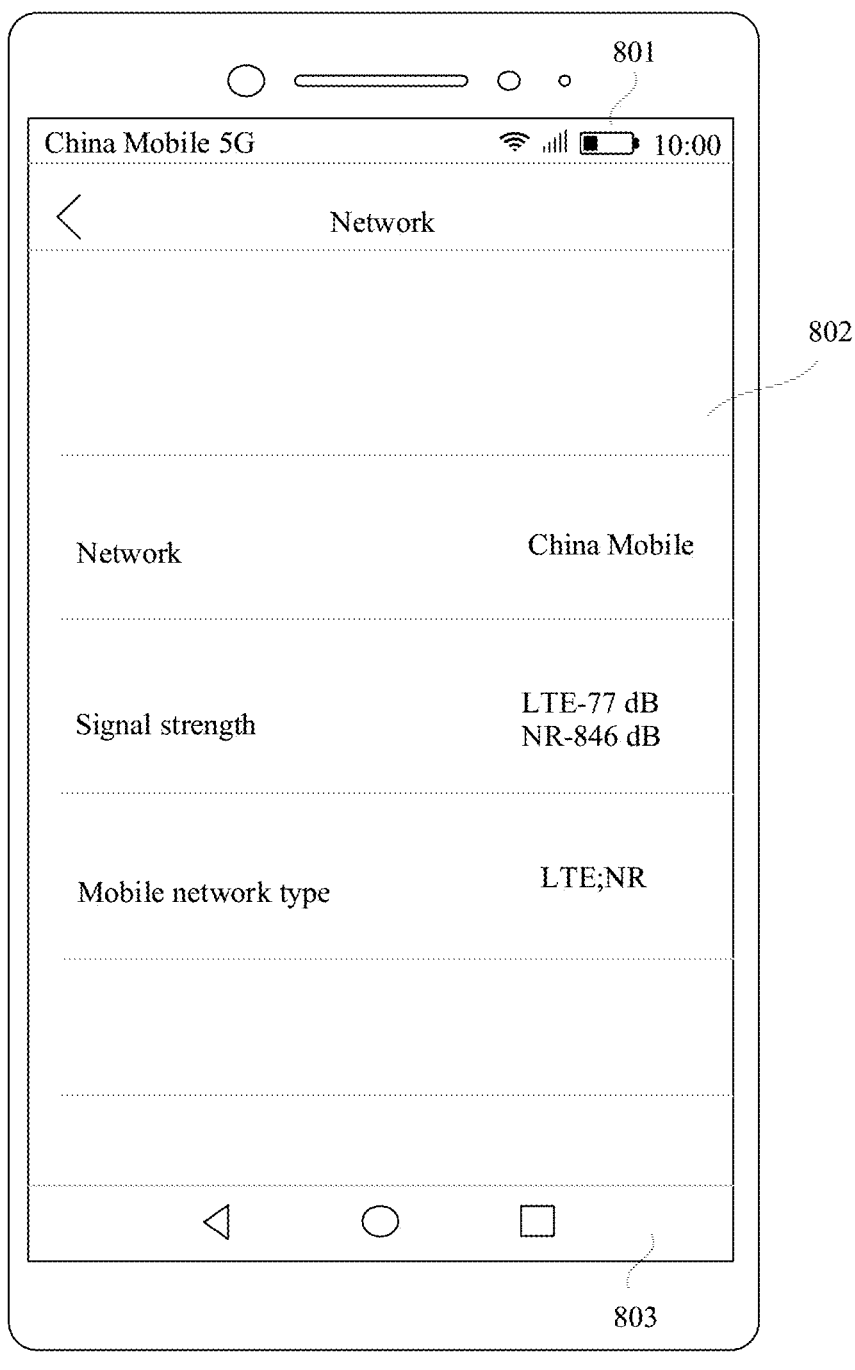
Figure 17C:
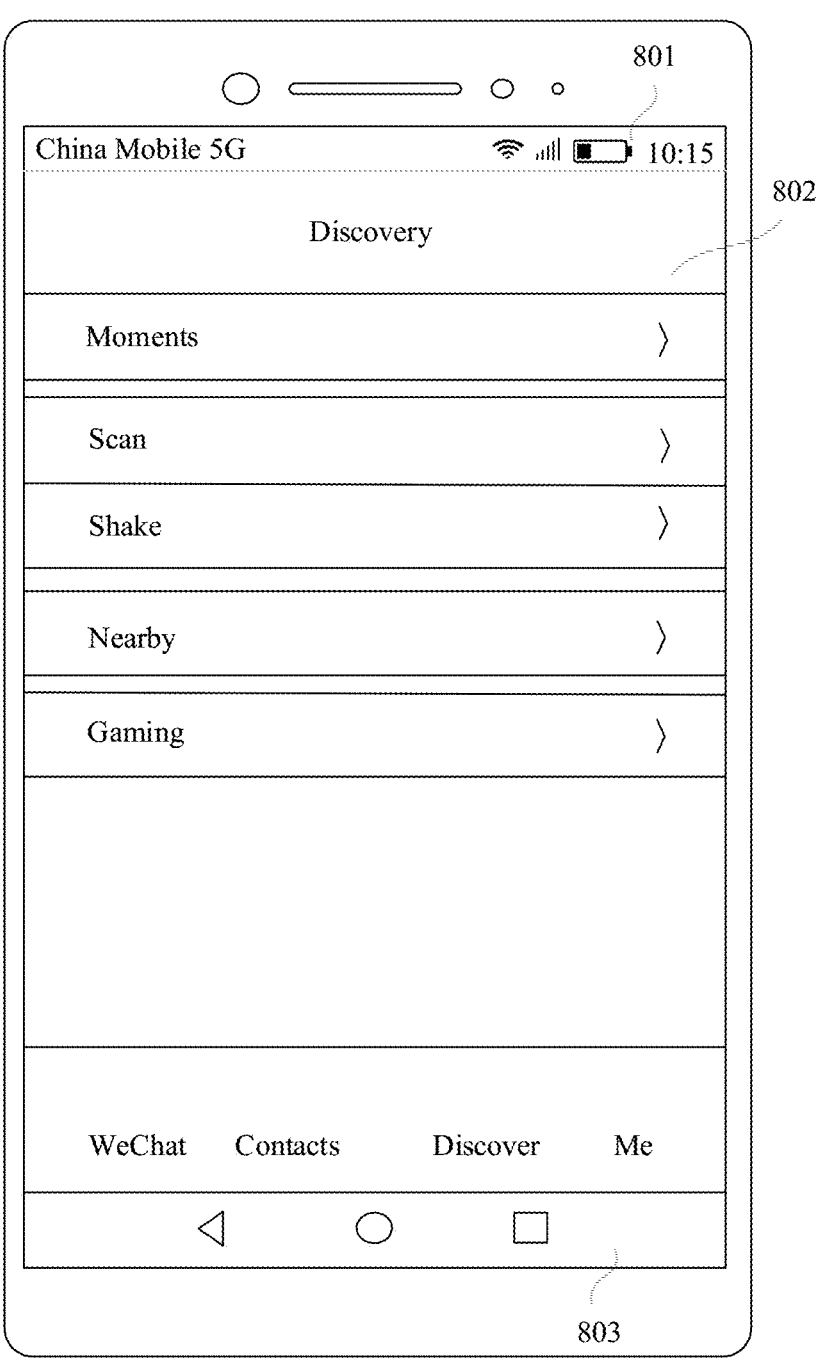
Figure 17D:
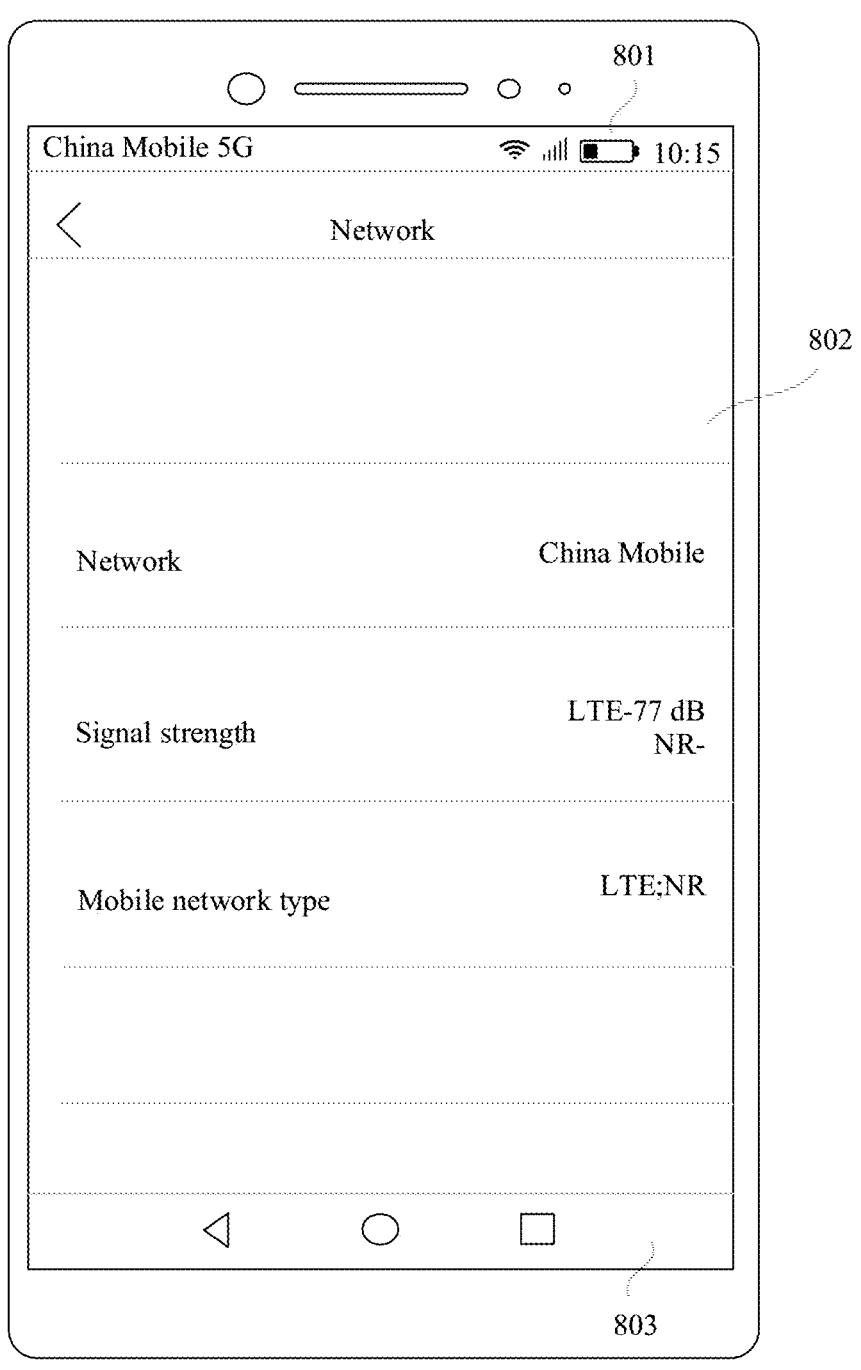

FIG. 15(*a*) and FIG. 15(*b*) are a schematic diagram of another possible scenario according to this application, may correspond to the embodiment of the method 400, and may be compared with FIG. 13(*b*). FIG. 15(*a*) and FIG. 15(*b*) are a schematic diagram of a scenario of a state of a mobile network when a user uses a preset application and a mobile phone is in a charging mode. For example, Map is the preset application. In FIG. 15(*a*), the mobile network displayed in the upper interface 801 is 5G, indicating that the mobile phone is in a dual connectivity state and uses an NR link and an LTE link for communication. The upper interface 801 displays information indicating that the mobile phone is in the charging mode, and the user prepares to open the Map for navigation. In FIG. 15(*b*), the user starts to use the Map, shown by the arrow in FIG. 15(*a*) for navigation. Although the Map is the preset application, the mobile phone is in the charging mode, the mobile phone does not monitor a service transmission rate, and the mobile network displayed in the upper interface 801 is still 5G. This may be compared with FIG. 13(*b*). In FIG. 13(*b*), the mobile phone is not in the charging mode, the service transmission rate is relatively low, and the mobile network changes to 4G.

FIG. 16(*a*) to FIG. 16(*d*) are a schematic diagram of another possible scenario according to this application, may correspond to the embodiment of the method 400, and may be compared with FIG. 13(*b*). FIG. 16(*a*) to FIG. 16(*d*) are a schematic diagram of a scenario of a state of a mobile network when a user uses a preset application and a mobile phone is in a performance optimization mode. For example, Map is the preset application. In FIG. 16(*a*), the mobile network displayed in the upper interface 801 is 5G, indicating that the mobile phone is in a dual connectivity state and uses an NR link and an LTE link for communication. In addition, the user prepares to open Settings, shown by the arrow in FIG. 16(*a*). In FIG. 16(*b*), the user enables the performance optimization mode of a battery option in the Settings, so that the mobile phone is in a mode with optimal performance. In this way, regardless of any application subsequently started by the user, the service transmission rate is not monitored to disconnect the NR link. In FIG. 16(*c*) and FIG. 16(*d*), the user exits the Settings and opens Map, shown by the arrow in FIG. 16(*c*) for navigation. Although the Map is the preset application, the mobile phone is in the performance optimization mode, the mobile phone does not monitor the service transmission rate, and the mobile network displayed in the upper interface 801 is still 5G. This may be compared with FIG. 13(*b*). In FIG. 13(*b*), the mobile phone is not in the performance optimization mode, the service transmission rate is relatively low, and the mobile network changes to 4G.

In some other possible cases, provided that the mobile phone supports an NR network, the mobile network displayed on the mobile phone is always 5G regardless of whether the mobile phone uses the LTE link or uses the LTE link and the NR link for communication when the mobile phone is running. However, whether a current actual network is an LTE network or the NR network can be checked on another interface. With reference to the foregoing cases, the following briefly describes switching between an LTE network and an NR network by using a scenario shown in FIG. 17(*a*) to FIG. 17(*d*) as an example. In other scenarios similar to those shown in FIG. 9(*a*) to FIG. 17(*d*), an icon of a mobile network displayed in this case is always 5G. For an actual network, refer to the example in FIG. 17(*a*) to FIG. 17(*d*). Therefore, the scenarios shown in FIG. 9(*a*) to FIG. 16(*d*) are not described again.

It should be understood that an interface that is shown in FIG. 17(*a*) to FIG. 17(*d*) and that is used to display a current actual network is merely an example for description, and should not constitute a limitation on this application.

FIG. 17(*a*) to FIG. 17(*d*) are a schematic diagram of another possible scenario according to this application. FIG. 17(*a*) may correspond to FIG. 9(*a*), and FIG. 17(*c*) may correspond to FIG. 9(*b*). In FIG. 17(*a*), a mobile network of a mobile phone displayed in the upper interface 801 is 5G, and in the main interface 802, a user prepares to open a chat tool, shown by the arrow. Correspondingly, at a same time point, for example, in Settings, in a description about a network, a display interface that describes the network shown in FIG. 17(*b*) is opened. In a description about signal strength, it can be seen that both a 4G (namely, LTE) network and a 5G (namely, NR) network have signals, indicating that the mobile phone is in a dual connectivity state and uses an NR link and an LTE link for communication. In FIG. 17(*c*), the user has opened an interface of the chat tool, and the main interface 802 changes to an interface of the chat tool. A service transmission rate for browsing the interface of the chat tool is relatively low, and the NR link may be disconnected. The mobile network displayed in the upper interface 801 is still 5G. Correspondingly, at a same time point, for example, in the Settings, in the description about the network, a display interface that describes the network shown in FIG. 17(*d*) is opened. In the description about the signal strength, it can be learned that only the 4G (namely, LTE) network has a signal, and the 5G (namely, NR) network does not have a signal, indicating that the mobile phone currently uses only the LTE link for communication.

Figure 18:
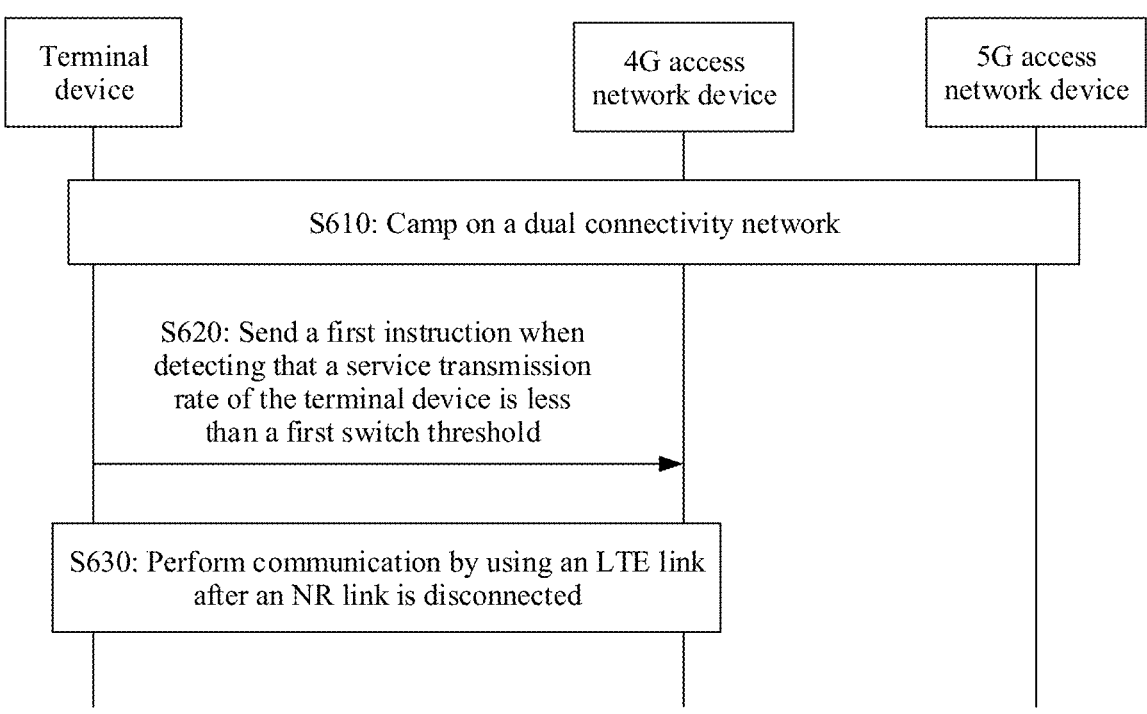
FIG. 18 is a schematic interaction diagram of a wireless communications method according to this application.

With reference to the foregoing embodiments and related accompanying drawings, this application further provides another wireless communications method. The method may be implemented in the terminal device (for example, a mobile phone or a tablet computer) shown in FIG. 2. FIG. 18 is a schematic interaction diagram of a wireless communications method according to this application. The following describes steps of the method shown in FIG. 18.

S610: Camp on a dual connectivity network, where the dual connectivity network includes a long term evolution (LTE) link and a new radio (NR) link.

The camping on a dual connectivity network may be understood as that a terminal device is communicatively connected to a 4G access network device and a 5G access network device, and uses the LTE link and the NR link for communication.

For example, the dual connectivity network may be an ENDC network, or may be an NEDC network.

S620: Send a first instruction when detecting that a service transmission rate of the terminal device is less than a first switch threshold, where the first instruction is used to release the NR link, and the service transmission rate is related to an actual transmission rate.

For example, the first instruction may be SCG failure information.

In a possible implementation, the service transmission rate may be a detected actual transmission rate of the terminal device.

In another possible implementation, the service transmission rate may alternatively be a rate obtained after the actual transmission rate is processed. For example, the service transmission rate may be a rate obtained after smoothing the actual transmission rate.

Optionally, the terminal device may send the first instruction when detecting that one or a plurality of service transmission rates of the terminal device is or are less than the first switch threshold.

S620 may correspond to steps S322 and S323 in the method 300. For descriptions, refer to related descriptions of S322 and S323.

Optionally, the first switch threshold is related to at least one of the following parameters of the terminal device in an LTE network, where the LTE network includes the LTE link:

signal strength of a cell in which the terminal device is located; or cell bandwidth of the cell in which the terminal device is located; or a duplex mode used by the terminal device for communication, where the duplex mode includes a time division duplex (TDD) mode or a frequency division duplex (FDD) mode; or a transmission mode used by the terminal device for communication, where the transmission mode includes uplink transmission or downlink transmission.

For descriptions, refer to related descriptions of the manner 1 in the manners of determining the first switch threshold and the second switch threshold in the method 300.

It should be understood that the first switch threshold may alternatively be a threshold preconfigured by a first application. Specific descriptions do not refer to related descriptions of the manner 2 in the manners of determining the first switch threshold and the second switch threshold in the method 300.

Optionally, before S620, the method further includes: running the first application in the foreground, where the first application is a preset application.

In other words, when the first application running in the foreground is the preset application, the terminal device detects the service transmission rate, and subsequently sends the first instruction when detecting that the service transmission rate is less than the first switch threshold.

Correspondingly, when the first application running in the foreground is a non-preset application, the terminal device does not detect the service transmission rate, and uses the LTE link and the NR link for communication.

Optionally, the first application is any one of the following applications: a navigation application, a reading application, a game application, and an application into which a video can be embedded.

Optionally, the terminal device is not in a priority mode, and the priority mode includes at least one of the following: a call mode, a charging mode, a performance optimization mode, or a hotspot sharing mode.

In other words, when the first application running in the foreground by the terminal device is the preset application and the terminal device is not in the priority mode, the terminal device detects the service transmission rate, and subsequently sends the first instruction when detecting that the service transmission rate is less than the first switch threshold.

For a description that the first application running in the foreground is the preset application, refer to the related description of step S412 in the method 400.

Optionally, the method further includes:

starting a first timer after running the first application in the foreground; and detecting the service transmission rate of the terminal device after the first timer expires.

In other words, after the first application is run in the foreground, the first timer is started. After the first timer expires, the service transmission rate of the terminal device is detected. Subsequently, when it is detected that the service transmission rate is less than the first switch threshold, the first instruction is sent.

Optionally, the method further includes:

exiting the first application from the foreground;

accessing a cell configured by a network device for the terminal device, to restore the NR link; and performing communication by using the LTE link and the NR link after the NR link is restored.

In other words, after the first application is exited from the foreground, the NR link is restored, and the LTE link and the NR link are used for communication.

Optionally, the method further includes:

running a second application in the foreground, where the second application is a non-preset application; and continuing to perform communication by using the LTE link and the NR link.

S630: Perform communication by using the LTE link after the NR link is disconnected.

Optionally, after S630, the method further includes:

after sending the first instruction, when detecting that the service transmission rate of the terminal device is greater than a second switch threshold, accessing the cell configured by the network device for the terminal device, to restore the NR link; and performing communication by using the LTE link and the NR link after the NR link is restored.

The network device may be the 5G access network device.

In other words, after disconnecting the NR link, the terminal device continues to detect the service transmission rate of the terminal device. When detecting that the service transmission rate of the terminal device is greater than the second switch threshold, the terminal device exchanges information with the 4G access network device and the 5G access network device to restore the NR link.

In a possible implementation, the second switch threshold is greater than the first switch threshold.

In another possible implementation, the second switch threshold is equal to the first switch threshold.

For descriptions of restoring the NR link, refer to related descriptions of steps S331 and S332 in the method 300.

Optionally, before accessing the cell configured by the network device for the terminal device, a second instruction is sent. The second instruction is used to restore the NR link.

Therefore, according to the wireless communications method provided in this application, when the terminal device is in the dual connectivity network, the terminal device may determine, based on the service transmission rate related to the actual transmission rate, whether to disconnect the NR link, and when the service transmission rate of the terminal device is less than the first switch threshold, send the first instruction to disconnect the NR link. In this way, power consumption of the terminal device can be effectively reduced without affecting the user experience on transmission rate, the user experience on power consumption is improved, and the user experiences on transmission rate and power consumption are balanced to some extent.

In addition, the preset application is set, and when the first application is the preset application, the service transmission rate of the terminal device is detected to determine whether to disconnect the NR link, to disconnect the NR link when the service transmission rate is less than the first switch threshold. This can effectively reduce power consumption of the terminal device without affecting the user experience on transmission rate. Correspondingly, when the first application is the non-preset application, the service transmission rate of the terminal device may not be detected, and the LTE link and the NR link are used for communication. In this way, a rate requirement of a user for the non-preset application is preferentially ensured as much as possible, and the user experience on 5G communication is not affected.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

It may be understood that, to implement the foregoing functions, the terminal device includes corresponding hardware and/or software modules for performing the functions. Algorithm steps in examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In some embodiments, function modules of the terminal device may be obtained through division based on the foregoing method examples. For example, the function modules may be obtained through division based on the functions, or two or more functions may be integrated into one processing module. The integrated module may be implemented in a form of hardware. It should be noted that, in some embodiments, division into modules is an example and is merely logical function division. During actual implementation, there may be another division manner.

Figure 19:
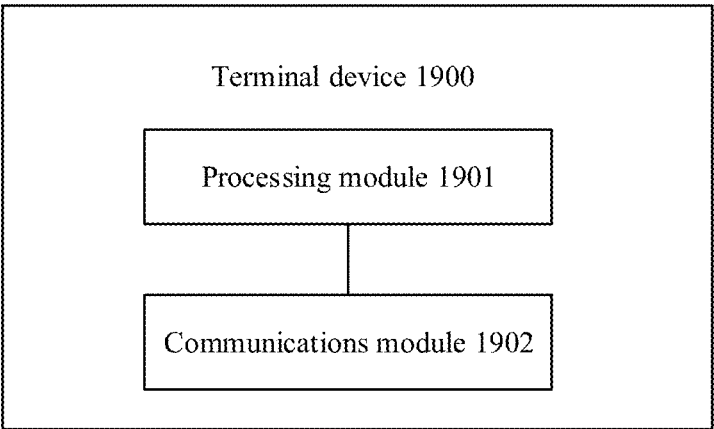
FIG. 19 is a schematic diagram of a possible structure of a terminal device according to this application.

FIG. 19 is a schematic diagram of a possible structure of a terminal device 1900 in the foregoing embodiments. As shown in FIG. 19, the terminal device 1900 may include a processing module 1901 and a communications module 1902. The processing module may be configured to control and manage an action of the terminal device. The communications module may be configured to support communication between the terminal device and another device.

The communications module 1902 may be configured to support the terminal device 1900 in performing the foregoing steps 610, 630, and the like, and/or another process of the technology described in this specification, for example, sending a first instruction or a second instruction through the communications module 1902.

The processing module 1901 may be configured to support the terminal device in detecting a service transmission rate of the terminal device, determining whether to disconnect an NR link or restore an NR link, and/or another process of the technology described in this specification, for example, running a first application in the foreground, for another example, starting a first timer.

It should be noted that all related content of the steps in the foregoing method embodiments may be cited in function description of corresponding function modules. Details are not described herein again.

The terminal device provided in some embodiments is configured to perform the foregoing wireless communications method. Therefore, an effect the same as the effect of the foregoing implementation methods can be achieved.

The processing module may be a processor or a controller. The processing module may implement or execute various example logical blocks, modules, and circuits described with reference to content disclosed in this application. The processor may alternatively be a combination, for example, a combination including one or more microprocessors or a combination of digital signal processing (DSP) and a microprocessor, for implementing a computing function. A storage module may be a memory. The communications module may be a radio frequency circuit, a Bluetooth chip, a Wi-Fi chip, or another device that interacts with another terminal device.

In an embodiment, when the processing module is a processor, the terminal device may be a device having a structure shown in FIG. 2. In this structure, the communications module may be the mobile communications module shown in FIG. 1. In some embodiments, the communications module and the processing module may be integrated into one processor. In some other embodiments, the communications module and the processing module may be two processors, respectively implementing functions of the communications module and the processing module.

This application further provides an apparatus. The apparatus may be a chip, a component, or a module. The apparatus may include a processor, a memory, and a communications module that are connected to each other. The memory is configured to store computer-executable instructions. When the apparatus runs, the processor may execute the computer-executable instructions stored in the memory, to enable the chip to perform the wireless communications method in the foregoing method embodiments.

An embodiment further provides a computer storage medium. The computer storage medium stores computer instructions. When the computer instructions are run on a terminal device, the terminal device is enabled to perform the foregoing related method steps, to implement the wireless communications method in the foregoing embodiments.

An embodiment further provides a computer program product. When the computer program product runs on a computer, the computer is enabled to perform the foregoing related steps, to implement the wireless communications method in the foregoing embodiments.

The terminal device, the computer storage medium, the computer program product, and the chip provided in the embodiments are all configured to perform a corresponding method provided above. Therefore, for beneficial effects that can be achieved by the terminal device, the computer storage medium, the computer program product, or the chip, refer to beneficial effects of the corresponding method provided above. Details are not described herein again.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

It should be understood that the processor in embodiments of this application may be an integrated circuit chip, and has a signal processing capability. In the implementation process, the steps in the foregoing method embodiment may be completed by using a hardware integrated logic circuit in the processor or by using instructions in a form of software. The foregoing processor may be a general purpose processor, a digital signal processor (DSP), an application specific integrated circuit (ASIC), a field programmable gate array (FPGA) or another programmable logic device, a discrete gate or transistor logic device, or a discrete hardware component.

The technologies described in this application may be implemented in various manners. For example, the technologies may be implemented by hardware, software, or a combination thereof. For hardware implementation, a processing unit configured to perform these technologies at a communications apparatus (for example, a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a volatile memory or a nonvolatile memory, or may include both the volatile memory and the nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external high-speed cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories in the system and method described in this specification include but are not limited to these memories and any memory of another suitable type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that "an embodiment" mentioned in the entire specification means that particular features, structures, or characteristics related to the embodiments are included in at least one embodiment of this application. Therefore, embodiments in the entire specification do not necessarily refer to a same embodiment. Moreover, the particular features, structures, or characteristics may be combined in one or more embodiments in any proper manner. It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

A person of ordinary skill in the art may understand that various numerals such as "first" and "second" in this application are merely used for differentiation for ease of description, and are not used to limit the scope of embodiments of this application or represent a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural.

The character "l" generally represents an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B, and C exist. A may be singular or plural, B may be singular or plural, and C may be singular or plural.

It should be understood that in embodiments of this application, "B corresponding to A" indicates that B is associated with A, and B may be determined based on A. However, it should be further understood that determining B based on A does not mean that B is determined based only on A. That is, B may also be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communications apparatus, and values or representation manners of the parameters may alternatively be other values or representation manners that can be understood by the communications apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division, and may be another manner of division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, to be specific, may be located in one position, or may be distributed on a plurality of network units. Some or all of the units may be selected based on an actual requirement, to achieve the objectives of the solutions in embodiments.

In addition, function units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, a network device, or the like) to perform all or some of the steps in the method described in embodiments of this application. The foregoing storage medium includes any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in the embodiments, unless otherwise specified or a logical conflict occurs, terms and/or descriptions are consistent and may be mutually referenced between different embodiments and between the implementations/implementation methods in the embodiments. Technical features in the different embodiments and the implementations/implementation methods in the embodiments may be combined to form a new embodiment, implementation, or implementation method according to an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device, wherein the terminal device comprises:

a processor; and a computer storage medium, wherein the computer storage medium stores instructions, and when the processor executes the instructions, the terminal device performs:

camping on a dual connectivity network, wherein the dual connectivity network comprises a long term evolution (LTE) link and a new radio (NR) link;

sending, to an LTE network device, a first instruction when detecting that a service transmission rate of the terminal device is less than a first switch threshold, wherein the first instruction is used to release the NR link, and the service transmission rate is related to an actual transmission rate; and performing communication by using the LTE link after the NR link is disconnected.

2. The terminal device according to claim 1, wherein when the processor executes the instructions, the terminal device further performs:

running a first application in the foreground before sending the first instruction, wherein the first application is a preset application.

3. The terminal device according to claim 2, wherein the terminal device is not in a priority mode, and the priority mode comprises at least one of the following: a call mode, a charging mode, a performance optimization mode, or a hotspot sharing mode.

4. The terminal device according to claim 2, wherein when the processor executes the instructions, the terminal device further performs the following actions:

exiting the first application from the foreground after sending the first instruction;

accessing a cell configured by a first network device for the terminal device, to restore the NR link; and performing communication by using the LTE link and the NR link after the NR link is restored.

5. The terminal device according to claim 4, wherein when the processor executes the instructions, the terminal device further performs the following action:

running a second application in the foreground, wherein the second application is a non-preset application; and continuing to perform communication by using the LTE link and the NR link.

6. The terminal device according to claim 2, wherein when the processor executes the instructions, the terminal device further performs the following actions:

starting a first timer after running the first application in the foreground; and detecting the service transmission rate of the terminal device after the first timer expires.

7. The terminal device according to claim 2, wherein the first application is any one of the following applications: a navigation application, a reading application, a game application, and an application into which a video is embedded.

8. The terminal device according to claim 1, wherein the first switch threshold is related to at least one of the following parameters of the terminal device in an LTE network, wherein the LTE network comprises the LTE link:

signal strength of a cell in which the terminal device is located; or cell bandwidth of the cell in which the terminal device is located; or a duplex mode used by the terminal device for communication, wherein the duplex mode comprises a time division duplex (TDD) mode or a frequency division duplex (FDD) mode; or a transmission mode used by the terminal device for communication, wherein the transmission mode comprises uplink transmission or downlink transmission.

9. The terminal device according to claim 1, wherein when the processor executes the instructions, the terminal device is enabled to further perform the following actions:

after sending the first instruction, when detecting that the service transmission rate of the terminal device is greater than a second switch threshold, accessing a cell configured by a first network device for the terminal device, to restore the NR link; and performing communication by using the LTE link and the NR link after the NR link is restored.

10. The terminal device according to claim 9, wherein when the processor executes the instructions, the terminal device is enabled to further perform the following action:

sending a second instruction before accessing the cell configured by the first network device for the terminal device, wherein the second instruction is used to restore the NR link.

11. The terminal device according to claim 9, wherein the second switch threshold is greater than the first switch threshold.

12. The terminal device according to claim 1, wherein when the processor executes the instructions, the terminal device further performs the following actions:

before sending the first instruction, determining whether the NR link is disconnected; and detecting the service transmission rate of the terminal device when the NR link is not disconnected.

13. A wireless communications method, applied to a terminal device, wherein the method comprises:

camping on a dual connectivity network, wherein the dual connectivity network comprises a long term evolution (LTE) link and a new radio (NR) link;

sending, to an LTE network device, a first instruction when detecting that a service transmission rate of the terminal device is less than a first switch threshold, wherein the first instruction is used to release the NR link, and the service transmission rate is related to an actual transmission rate; and performing communication by using the LTE link after the NR link is disconnected.

14. The method according to claim 13, wherein before the sending the first instruction, the method further comprises:

running a first application in the foreground, wherein the first application is a preset application.

15. The method according to claim 14, wherein the terminal device is not in a priority mode, and the priority mode comprises at least one of the following: a call mode, a charging mode, a performance optimization mode, or a hotspot sharing mode.

16. The method according to claim 14, wherein after the sending the first instruction, the method further comprises:

exiting the first application from the foreground;

accessing a cell configured by a first network device for the terminal device, to restore the NR link; and performing communication by using the LTE link and the NR link after the NR link is restored.

17. The method according to claim 16, wherein the method further comprises:

running a second application in the foreground, wherein the second application is a non-preset application; and continuing to perform communication by using the LTE link and the NR link.

18. The method according to claim 14, wherein the method further comprises:

starting a first timer after running the first application in the foreground; and detecting the service transmission rate of the terminal device after the first timer expires.

19. The method according to claim 14, wherein the first application is any one of the following applications: a navigation application, a reading application, a game application, and an application into which a video can be embedded.

20. The method according to claim 13, wherein the first switch threshold is related to at least one of the following parameters of the terminal device in an LTE network, wherein the LTE network comprises the LTE link:

signal strength of a cell in which the terminal device is located; or cell bandwidth of the cell in which the terminal device is located; or a duplex mode used by the terminal device for communication, wherein the duplex mode comprises a time division duplex (TDD) mode or a frequency division duplex (FDD) mode; or a transmission mode used by the terminal device for communication, wherein the transmission mode comprises uplink transmission or downlink transmission.

* * * * *